(12) United States Patent
Montero, Jr. et al.

(10) Patent No.: US 12,444,140 B2
(45) Date of Patent: Oct. 14, 2025

(54) VIRTUAL WALKTHROUGH EXPERIENCE GENERATION BASED ON NEURAL RADIANCE FIELD MODEL RENDERINGS

(71) Applicant: Google LLC, Mountain View, CA (US)

(72) Inventors: Carlos Montero, Jr., Brier, WA (US); Marcos Seefelder de Assis Araujo, London (GB); Cardin Everett Moffett, Denver, CO (US); Charles Goran, Lafayette, CO (US)

(73) Assignee: GOOGLE LLC, Mountain View, CA (US)

( * ) Notice: Subject to any disclaimer, the term of this patent is extended or adjusted under 35 U.S.C. 154(b) by 95 days.

(21) Appl. No.: 18/517,455

(22) Filed: Nov. 22, 2023

(65) Prior Publication Data

US 2025/0166311 A1    May 22, 2025

(51) Int. Cl.
*G06T 19/00* (2011.01)
*G06F 16/787* (2019.01)
*G06T 7/10* (2017.01)
*H04N 13/354* (2018.01)

(52) U.S. Cl.
CPC .......... *G06T 19/003* (2013.01); *G06F 16/787* (2019.01); *G06T 7/10* (2017.01); *H04N 13/354* (2018.05)

(58) Field of Classification Search
None
See application file for complete search history.

(56) References Cited

U.S. PATENT DOCUMENTS

| | | | | |
|---|---|---|---|---|
| 11,868,672 | B1* | 1/2024 | Dehkordi | G06F 9/451 |
| 12,328,569 | B2* | 6/2025 | Taylor | H04S 7/305 |
| 2007/0198951 | A1 | 8/2007 | Frank | |
| 2007/0282792 | A1 | 12/2007 | Bailly et al. | |
| 2013/0097197 | A1 | 4/2013 | Rincover et al. | |
| 2020/0302241 | A1 | 9/2020 | White et al. | |
| 2024/0202987 | A1* | 6/2024 | Sadr | G06T 11/00 |
| 2024/0404191 | A1* | 12/2024 | Liu | G06T 7/70 |
| 2025/0086896 | A1* | 3/2025 | Litany | G06V 10/25 |
| 2025/0088617 | A1* | 3/2025 | Iwao | G06T 7/194 |
| 2025/0106370 | A1* | 3/2025 | Chen | H04N 21/816 |
| 2025/0131642 | A1* | 4/2025 | Yang | G06T 15/06 |

OTHER PUBLICATIONS

Yao, Mingyuan, et al. "Neural radiance field-based visual rendering: a comprehensive review." arXiv preprint arXiv:2404.00714 (2024). (Year: 2024).*

(Continued)

*Primary Examiner* — Nurun Flora
(74) *Attorney, Agent, or Firm* — DORITY & MANNING P.A.

(57) ABSTRACT

Systems and methods for generating and providing a virtual walkthrough interface can include generating a virtual walkthrough video based on view synthesis renderings generated by neural radiance field model. The neural radiance field model can be trained based on a plurality of images of an environment and may generate the view synthesis renderings based on processing positions along a determined walkthrough path. The generated virtual walkthrough video can then be scrubbed through to provide the virtual walkthrough interface.

22 Claims, 36 Drawing Sheets

(56) References Cited

OTHER PUBLICATIONS

Xu, Linning, et al. "VR-NeRF: High-fidelity virtualized walkable spaces." SIGGRAPH Asia 2023 Conference Papers. 2023. (Year: 2023).*
Alley et al., "Neural Point-Based Graphics", arXiv:1906.08240v3, Apr. 5, 2020, 16 pages.
Bojanowski et al., "Optimizing the Latent Space of Generative Networks.", Thirty-Fifth International Conference on Machine Learning, Stockholm, Sweden, Jul. 10-15, 10 pages.
Brooks et al., "Unprocessing Images for Learned Raw Denoising", arXiv:1811.11127v1, Nov. 27, 2018, 9 pages.
Buehler et al., "Unstructured Lumigraph Rendering.", Twenty-eighth Conference on Computer Graphics and Interactive Techniques, Los Angeles, California, United States, Aug. 12-17, 2001, pp. 425-432
Chen et al., "Rethinking Atrons Convolution for Semantic Image Segmentation.", arXiv:1706.05587v3, Jun. 17, 2017, 14 pages.
Flynn et al., "DeepStereo: Learning to Predict New Views from the World's Imagery.", Institute of Electrical and Electronics Engineers Conference on Computer Vision and Pattern Recognition, Las Vegas, Nevada, United States, Jun. 27-30, 2016, pp. 5515-5524.
Flyan et al., "DeepView: View Synthesis with Learned Gradient Descent.", Institute of Electrical and Electronics Engineers/CVF Conference on Computer Vision and Pattern Recognition, Long Beach, California, United States, Jun. 16-20, 2019, pp. 2362-2371.
Frahm et al., "Building Rome on a Cloudless Day.", Eleventh European Conference on Computer Vision, Crete, Greece, Sep. 5-11, 2010, pp. 368-381.
Hartley et al., "Multiple View Geometry in Computer Vision.", Cambria ty Press, New York, New York, United States, 2003, 673 pages.
Isola et al., "Image-to-Image Translation with Conditional Adversarial Networks.", Institute of Electrical and Electronics Engineers Conference on Computer Vision and Pattern Recognition, Honolulu, Hawaii, United States, Jul. 21-26, 2017, pp. 5967-5976.
Jin et al., "Image Matching Across Wide Baselines: From Paper to Practice.", arXiv:2003.01587v5, Feb. 11, 2021, 27 pages.
Johnson et al., "Perceptual Losses for Real-Time Style Transfer and Super-Resolution.", Fourteenth European Conference on Computer Vision, Amsterdam, Netherlands, Oct. 8-16, 2016, 17 pages.
Kendall et al., "What Uncertainties Do We Need in Bayesian Deep Learning for Computer Vision?", arXiv:1703.04977v2, Oct. 5, 2017, 12 pages.
Kingma, "Adam: A Method for Stochastic Optimization", arXiv:1412.6980v9, Jan. 30, 2017, 15 pages.
Laffont et al., "Coherent Intrinsic Images from Photo Collections.", Association for Computing Machinery Transactions on Graphics, vol. 31, Issue 6, No. 2012, 13 pages.
Levoy et al., "Light Field Rendering.", Twenty-third Annual Conference on Computer Graphics and Interactive Techniques, New Orleans, Lousiana, United States, Aug. 4-9, 1996, 12 pages.
Li et al., "Crowdsampling the Plenoptic Function.", Sixteenth European Conference on Computer Vision, Virtual, Aug. 23-28, 2020, 18 pages.
Lombardi et al., "Neural Volumes: Learning Dynamic Renderable Columes from Images.", Association for Computing Machinery Transactions on Graphics, vol. 28, No. 4, Jul. 2019, pp. 1-14.
Martin-Brualla et al. "LookinGood: Enhancing Performance Capture with Real-time Nural Re-Rendering", arXiv:1811.05029v1, Nov. 12, 2018, 14 pages.
Max, "Optical Models for Direct Volume Rendering.", Institute of Electrical and Electronics Engineers Transactions on Visualization and Computer Graphics, vol. 1, Issue 2, Jun. 1995, pp. 99-108.
Pappas et al., "Perceptual Criteria for Image Quality Evaluation.", Hanbook of Image and Video Processing, Academic Press, 2000, 974 pages.
Price et al., "Augmentin Crowd-Sourced 3D Reconstructions using Semantic Detections.", Institute of Electrical and Electronics Engineers/ CVP Conference on Computer Vision and Pattern Recognition, Salt Lake City, Utah, United States, Jun. 18-23, 2018, pp. 1926-1935.
Schonberger et al., "Structure-from-Motion Revisited.", Institute of Electrical and Electronics Engineers Conference on Computer Vision and Pattern Recognition, Las Vegas, Nevada, United States, Jun. 27-30, 2016, pp. 4104-4113. .
Shan et al., "The Visual Turing Test for Scene Reconstruction.", International Conference on 3D Vision, Seattle, Washington, United States, Jun. 29-Jul. 1, 2013, 8 pages.
Sinim, "Image Based Rendering.", Springer Scientific+Business Media LLC, New York, New York, United States, 2007, 425 pages.
Sitzmann et al., "DeepVoxels: Learning Persistent 3D Feature Embeddings.", Institute of Electrical and Electronics Engineers/ CVF Conference on Computer Vision and Pattern Recognition, Long Beach, California, United States, Jun. 16-20, 2019, pp. 2437-2446.
Sitzmang et al., "Seene Representation Networks: Continuons 3D-Structure-Aware Neural Scene Representations.", Thirty-third Conference on Neural Information Processing Systems, Vancouver, Canada, Dec. 8-14, 2019, 12 pages.
Snavely et al., "Photo Tourism: Exploring Collections in 3D", Association for Computing Machinery's Transactions on Graphics, vol. 25, Issue 3, Jul. 1, 2006, pp. 835-846.
Talebi et al., "NIMA: Neural Image Assessment", axXiv:1709.05424v2, Apr. 26, 2018, 15 pages.
Tancik et al., "Fourier Features Let Networks Learn High Frequency Functions in Low Dimensional Domains.", Thirty-fourth Conference on Neural Information Processing Systems, Vancouver, Canada, Dec. 6-12, 2020, 11 pages.
Tewari et al., "State of the Art on Neural Rendering", arXiv:2004.03805v1 Apr. 8, 2020, 27 pages.
Thies et al., Deferred Neural Rendering: Image Synthesis using Neural Textures, arXiv:1904.12356v1, Apr. 28, 2019, 12 pages.
Thung, "A Survey of Image Quality Measures", 2009 International Conference for Technical Postgraduates, Kuala Lumpur, Malaysia, Dec. 14-15, 2009, 5 pages.
Triggs et al., "Bundle Adjustment—A Modern Synthesis.", International Workshop on Vision Algorithms, Corfu, Greece, Sep. 21-22, 1999, 72 pages.
Wang et al., "Multi-Scale Structural Similarity for Image Quality Assessment.", Thirty-seventh Institute of Electrical and Electronics Engineer's Asilomar Conference on Signals, Systems, and Computer, Pacific Grove, California, United States, Nov. 9-12, 2003, 5 pages.
Wang et al., "A Universal Image Quality Index.", Institute of Electrical and Electronics Engineers Signal Processing Letters, vol. 9, No. 3, Mar. 2002, 4 pages.
Invitation to Pay Additional Fees for Application No. PCT/US2024/052794, mailed Jan. 27, 2025, 5 pages.
Rematas et al., "Urban Radiance Fields", IEEE/ CVF Conference on Computer Vision and Pattern Recognition (CVPR), 2022, 11 pages.
Tancik et al., "Block-NeRF: Scalable Large Scene Neural View Synthesis", IEEE/CVF Conference on Computer Vision and Pattern Recognition (CVPR), 2022, 11 pages.
Xie et al., "S-NERF: Neural Radiance Fields For Street Views", arXiv:2303.00749v1, 24 pages.
International Search Report and Written Opinion for Application No. PCT/US2024/052794, mailed Mar. 20, 2025, 23 pages.
Artificial Intelligence, "Block NeRF: Scalable Large Scene Neural View Synthesis | CVPR 2022", YouTube, Jun. 30, 2022, Retrieved from: https://www.youtube.com/watch?v=sibCaWMaDx8.

* cited by examiner

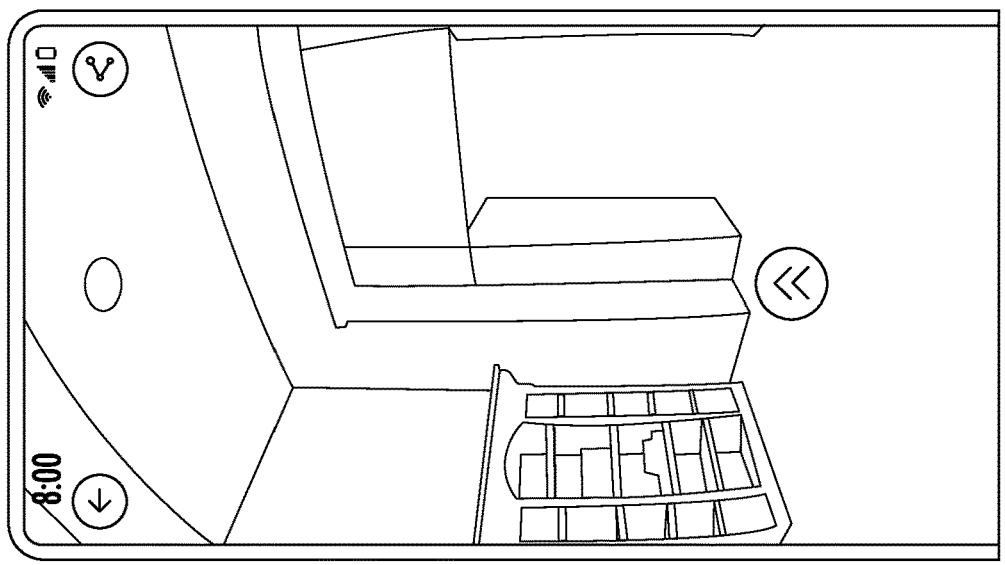
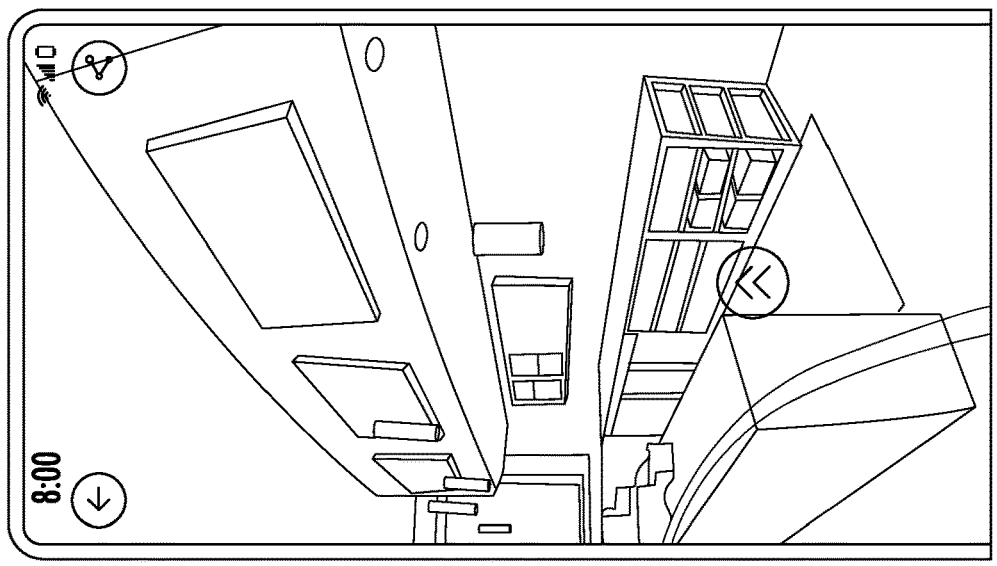
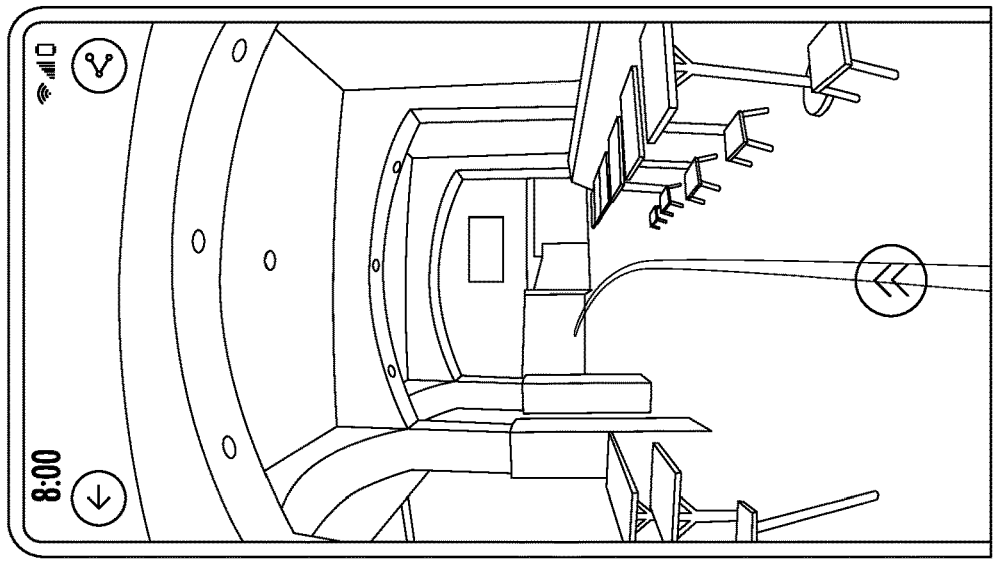
FIG. 4D

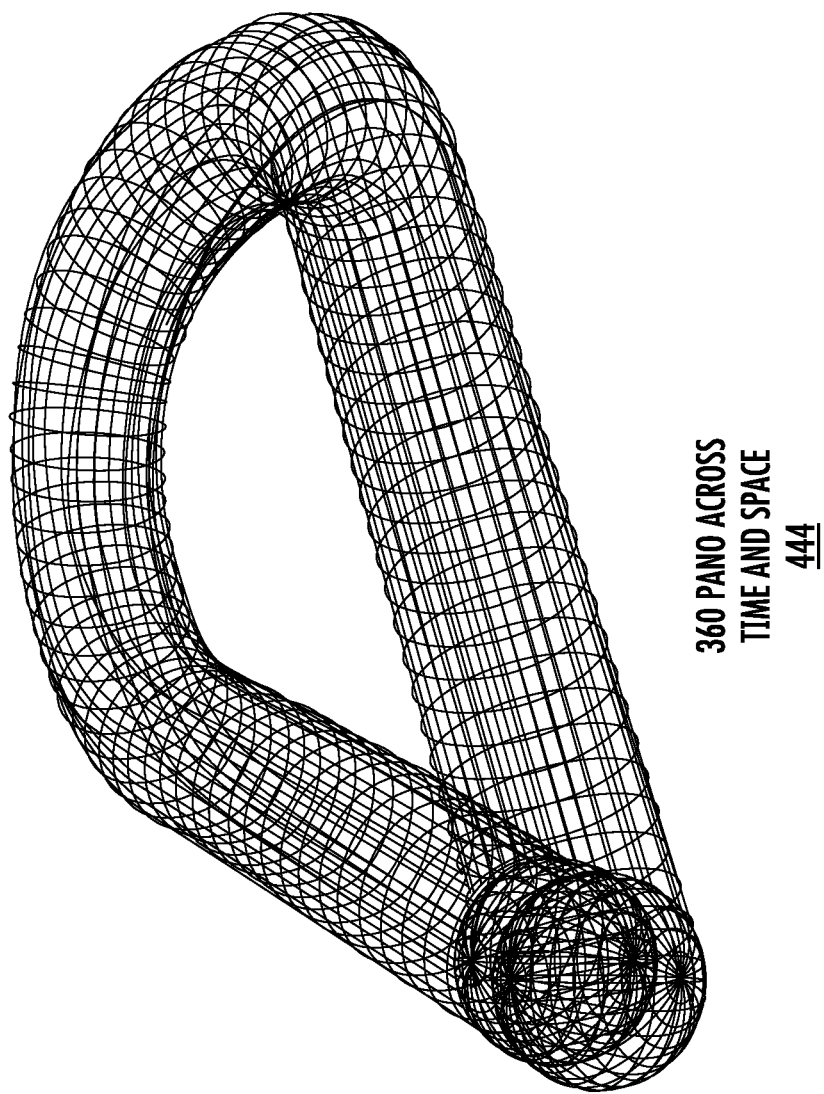
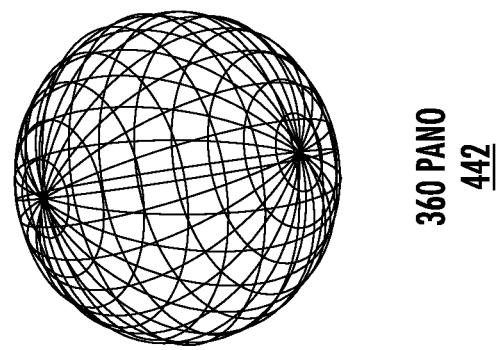
FIG. 4E

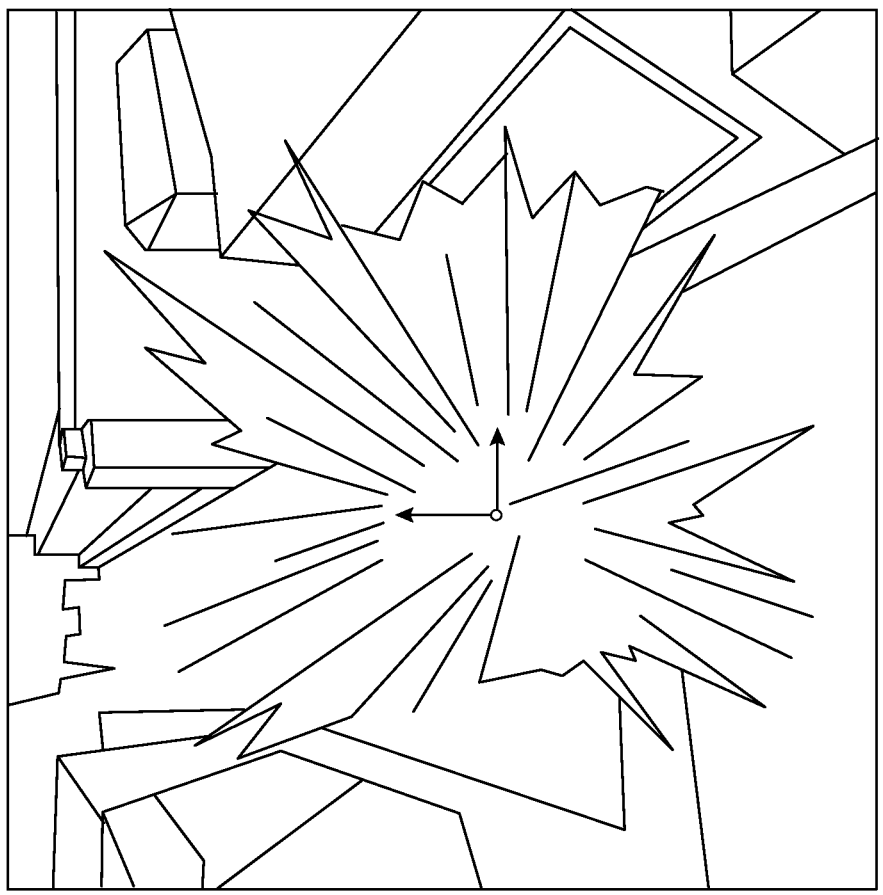
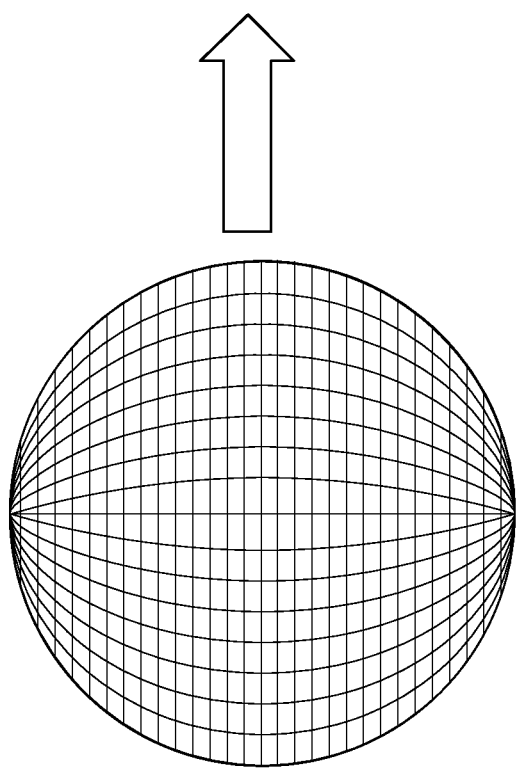
FIG. 5D

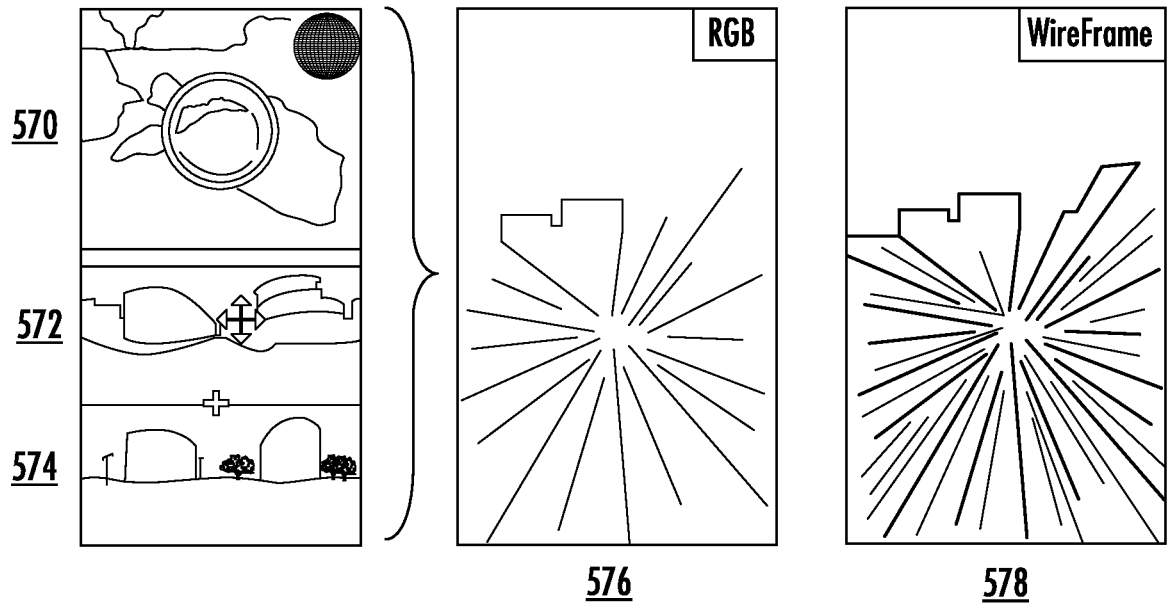
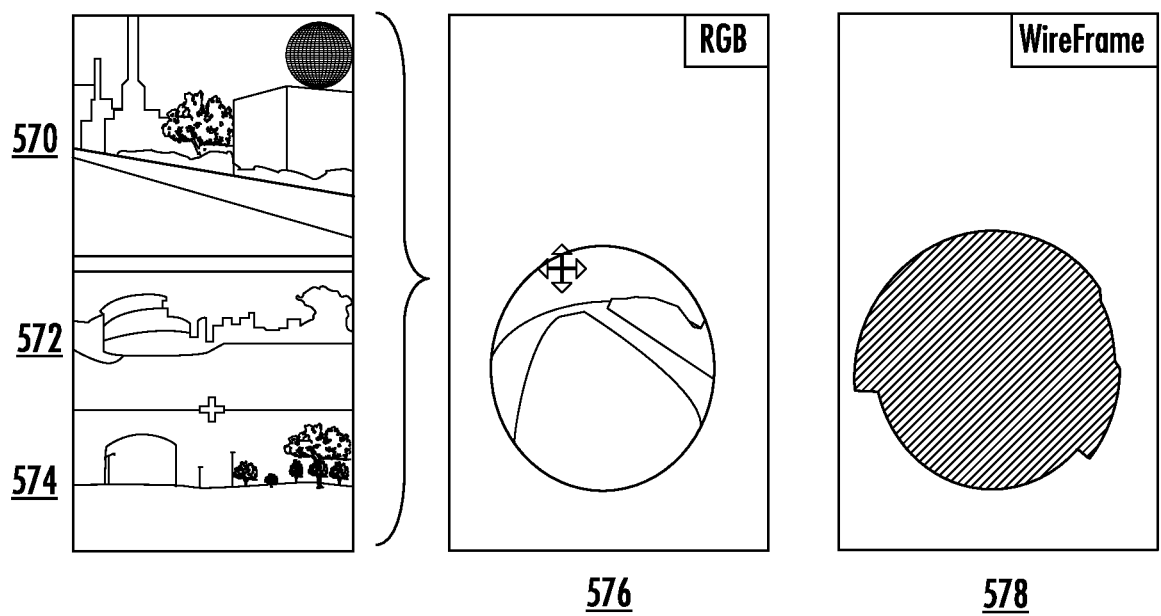
FIG. 5E (a) TRAINING  (b) TESTING (a) mip-NeRF 360  (b) OUR APPROACH

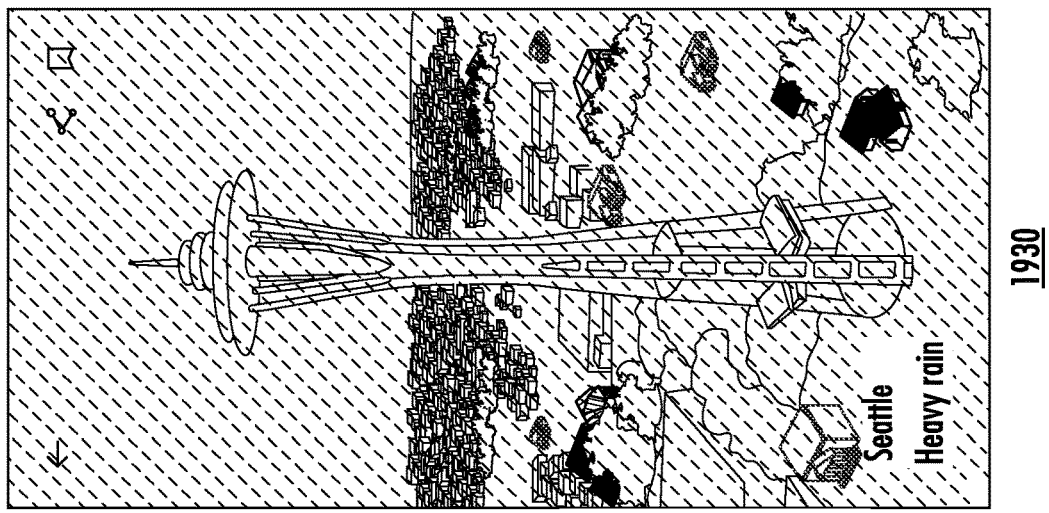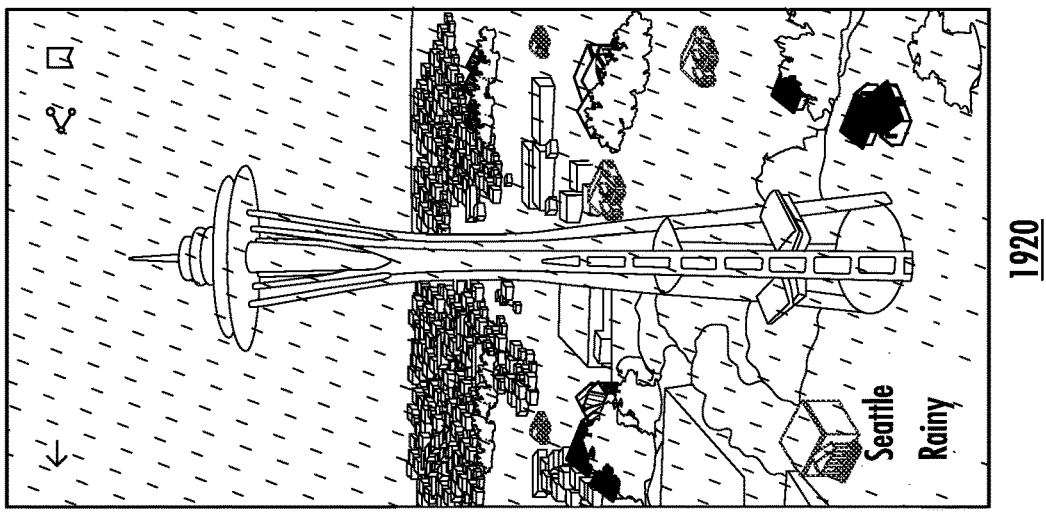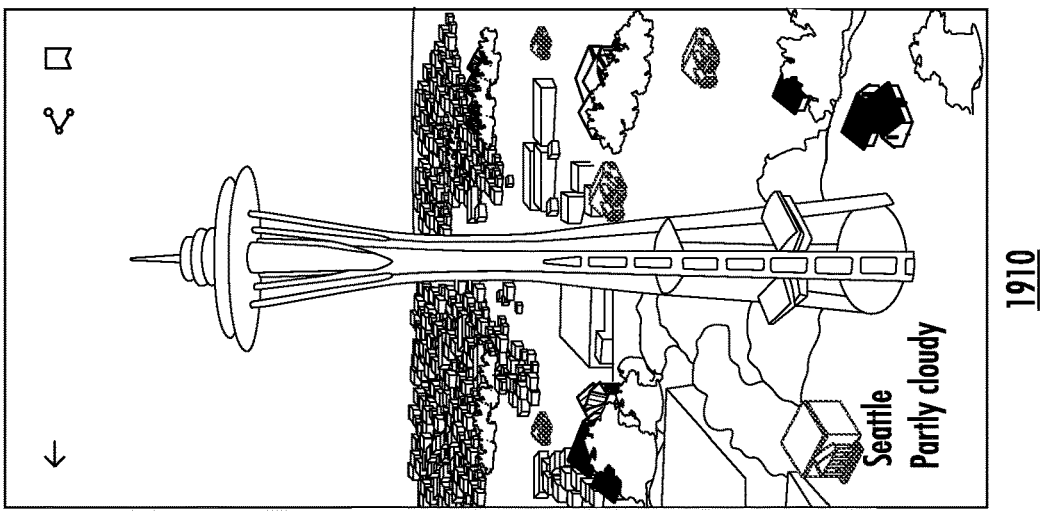
FIG. 19

VIRTUAL WALKTHROUGH EXPERIENCE GENERATION BASED ON NEURAL RADIANCE FIELD MODEL RENDERINGS

FIELD

The present disclosure relates generally to generating and providing virtual walkthrough videos of an environment. More particularly, the present disclosure relates to training a neural radiance field model on images of an environment, generating a plurality of view synthesis renderings of the environment with the trained neural radiance field model, and generating the virtual walkthrough video based on the plurality of view synthesis renderings.

BACKGROUND

When searching for locations via a search engine, certain existing systems can return results in the form of hyperlinks and/or a generated graphic that can include a textual snippet, a photograph, or a map. These results can fail to depict the actual look, depth, cohesion, and/or aesthetic of an environment. Moreover, images can provide a perspective of what the location may look like, but images alone can fail to capture the dimensionality of the location. In particular, the search results lack interactivity, which can make finding different aspects of the location difficult (e.g., context on the location or different perspective views of the location). For example, trying to find close-ups of different perspectives or looking at different portions of the location can require tedious searching instead of being provided in an intuitive, interactive interface.

Rendering engine interfaces may rely on extensive and tedious inputs by an experienced user to generate the assets for rendering a scene, and the generated assets may lack photorealism and/or depth accuracy. Additionally, the reliance on time consuming modeling by skilled users can limit scaling.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for generating a virtual walkthrough video. The method can include obtaining, by a computing system including one or more processors, one or more neural radiance field models associated with an environment. The one or more neural radiance field models may have been trained to generate view renderings of the environment. In some implementations, the environment can be associated with a geographic location. The method can include processing, by the computing system, a plurality of positions with the one or more neural radiance field models to generate a plurality of view synthesis renderings of the environment. The plurality of positions can be associated with a plurality of locations within the environment. The plurality of view synthesis renderings can be descriptive of the environment from the plurality of positions. The method can include generating, by the computing system, a virtual walkthrough video based on the plurality of view synthesis renderings of the environment. The virtual walkthrough video can be descriptive of a sequence of views of the environment. The method can include storing, by the computing system, the virtual walkthrough video in a database. Storing the virtual walkthrough video can include indexing the virtual walkthrough video with the geographic location associated with the environment.

In some implementations, the method can include obtaining, by the computing system, a search query; determining, by the computing system, the search query is associated with the geographic location; and in response to determining the search query is associated with the geographic location, obtaining, by the computing system, the virtual walkthrough video from the database based on the geographic location. The method can include providing, by the computing system, the virtual walkthrough video for display. In some implementations, the search query can include a text string. The text string can be associated with one or more entities. Determining the geographic location associated with the virtual walkthrough video is associated with the search query can include determining the one or more entities is associated with the geographic location.

In some implementations, the method can include providing, by the computing system, a map interface for display. The map interface can include map information associated with the geographic location. The method can include obtaining, by the computing system, a selection of a virtual walkthrough user interface element; determining, by the computing system, the virtual walkthrough video is associated with the geographic location; and providing, by the computing system, the virtual walkthrough video for display. In some implementations, generating, by the computing system, the virtual walkthrough video based on the plurality of view synthesis renderings of the environment can include generating, by the computing system, a first rendering video based on rendering the sequence of views of the environment in a first direction; generating, by the computing system, a second rendering video based on rendering the sequence of views of the environment in a second direction; and generating, by the computing system, the virtual walkthrough video by combining the first rendering video and the second rendering video. The first rendering video can be associated with a first portion of the virtual walkthrough video. The second rendering video can be associated with a second portion of the virtual walkthrough video.

In some implementations, processing, by the computing system, the plurality of positions with the one or more neural radiance field models to generate the plurality of view synthesis renderings of the environment can include, for each position of the plurality of positions, processing, by the computing system, the position with the one or more neural radiance field models to generate a plurality of directional view synthesis renderings. The plurality of directional view synthesis renderings can be associated with a plurality of view directions for the position. Processing, by the computing system, the plurality of positions with the one or more neural radiance field models to generate the plurality of view synthesis renderings of the environment can include, for each position of the plurality of positions, generating, by the computing system, a respective view synthesis rendering for the position by stitching the plurality of directional view synthesis renderings to generate a panoramic image rendering for the position.

In some implementations, the method can include obtaining, by the computing system, a plurality of images of the environment and training, by the computing system, one or more neural radiance field models based on the plurality of images. Training, by the computing system, the one or more neural radiance field models based on the plurality of images can include determining, by the computing system, a plurality of respective scene positions and a plurality of respective scene view directions for the plurality of images based on comparing feature location and feature sizes between images and processing, by the computing system, one or more respective scene positions of the plurality of respective scene positions and one or more respective scene view directions of the plurality of respective scene view directions with the one or more neural radiance field models to generate one or more predicted view synthesis renderings. The one or more predicted view synthesis renderings can include one or more predicted color values and one or more predicted opacity values. Training, by the computing system, the one or more neural radiance field models based on the plurality of images can include evaluating, by the computing system, a loss function that evaluates a difference between the one or more predicted view synthesis renderings and one or more respective images of the plurality of images and adjusting, by the computing system, one or more parameters of the one or more neural radiance field model based at least in part on the loss function.

In some implementations, the method can include obtaining, by the computing system, a plurality of images of the environment and processing, by the computing system, the plurality of images with a segmentation model to generate a plurality of segmented images. The segmentation model can generate segmentation masks for segmenting occlusions from an image. The method can include generating, by the computing system, replacement data for the plurality of segmented images. The replacement data can be descriptive of predicted pixels for replacing masked regions of the plurality of segmented images. The method can include generating, by the computing system, a plurality of augmented images based on the plurality of segmented images and the replacement data. The one or more neural radiance field models may be trained on the plurality of augmented images. In some implementations, the one or more neural radiance field models may have been trained on a plurality of images of the environment and lidar data for the environment. Training can include evaluating a depth loss based on the lidar data.

Another example aspect of the present disclosure is directed to a computing system for providing a virtual walkthrough interface. The system can include one or more processors and one or more non-transitory computer-readable media that collectively store instructions that, when executed by the one or more processors, cause the computing system to perform operations. The operations can include obtaining one or more neural radiance field models. The one or more neural radiance field models may have been trained to generate view renderings of one or more rooms. The operations can include processing a plurality of positions with the one or more neural radiance field models to generate a plurality of view synthesis renderings of the one or more rooms. The plurality of positions can be associated with a plurality of locations within the one or more rooms. In some implementations, the plurality of view synthesis renderings can be descriptive of the one or more from the plurality of positions. The operations can include generating a forward-directional video based on the plurality of view synthesis renderings of the one or more rooms. The forward-directional video can be descriptive of a first sequence of views associated with traveling in a first direction through the one or more rooms. The operations can include generating a backward-directional video based on the plurality of view synthesis renderings of the one or more rooms. The backward-directional video can be descriptive of a second sequence of views associated with traveling in a second direction through the one or more rooms. In some implementations, the second direction can be opposite of the first direction. The operations can include generating a multi-directional video based on the forward-directional video and the backward-directional video. The multi-directional video can be descriptive of the first sequence of views and the second sequence of views. The operations can include providing a virtual walkthrough interface for the one or more rooms by providing an interface for navigating through the multi-directional video.

In some implementations, the operations can include determining a walkthrough path based on processing a plurality of images of the one or more rooms and determining the plurality of positions based on the walkthrough path. Determining the walkthrough path based on processing the plurality of images of the one or more rooms can include processing the plurality of images to determine a plurality of room landmarks associated with features of interest in the one or more rooms and generating the walkthrough path based on the plurality of room landmarks. In some implementations, determining the plurality of positions based on the walkthrough path can include determining a plurality of points on the walkthrough path. The plurality of points can include varying spacing based on regions of interest within the one or more rooms. Navigating through the multi-directional video can include scrubbing through the multi-directional video. The one or more rooms can be associated with a restaurant. The virtual walkthrough interface can be provided in a knowledge panel for the restaurant in a search results interface.

In some implementations, generating the multi-directional video based on the forward-directional video and the backward-directional video can include determining a plurality of frame associations between the forward-directional video and the backward-directional video. Each of the plurality of frame associations can be descriptive of corresponding frames associated with a same position in the one or more rooms. Generating the multi-directional video based on the forward-directional video and the backward-directional video can include generating multi-directional metadata based on the plurality of frame associations. The multi-directional metadata can be descriptive of the corresponding frames. In some implementations, the multi-directional metadata can be configured to provide instructions for the virtual walkthrough interface to navigate to different portions of the multi-directional video based on a walkthrough direction and the plurality of frame associations. Generating the multi-directional video based on the forward-directional video and the backward-directional video can include generating the multi-directional video by stitching the forward-directional video and the backward-directional video and embedding the multi-directional metadata.

Another example aspect of the present disclosure is directed to one or more non-transitory computer-readable media that collectively store instructions that, when executed by one or more computing devices, cause the one or more computing devices to perform operations. The operations can include obtaining a plurality of images of an environment. The operations can include determining a plurality of image-capture positions and a plurality of image-capture view directions associated with the plurality of images. The operations can include training one or more neural radiance field models based on the plurality of images, the plurality of image-capture positions, and the plurality of image-capture view directions. The one or more neural radiance field models can be trained to generate view renderings of the environment. The operations can include processing a plurality of positions with the one or more neural radiance field models to generate a plurality of view synthesis renderings of the environment. The plurality of positions can be associated with a plurality of locations within the environment. In some implementations, the plurality of view synthesis renderings can be descriptive of the environment from the plurality of positions. The plurality of view synthesis renderings can include a plurality of three-hundred and sixty degree view renderings. The operations can include generating a virtual walkthrough video based on the plurality of view synthesis renderings of the environment. The virtual walkthrough video can be descriptive of a sequence of views of the environment. The operations can include storing the virtual walkthrough video in a database. Storing the virtual walkthrough video can include indexing the virtual walkthrough video with a geographic location associated with the environment.

In some implementations, the virtual walkthrough video can be descriptive of a sequence of views of the environment rendered in a forward progressing sequence and a backwards progressing sequence. The plurality of three-hundred and sixty degree view renderings can be generated by generating a plurality of direction-based view renderings for a position and stitching the plurality of direction-based view renderings together to generate a panoramic image. The virtual walkthrough video can include a three-hundred and sixty degree view video. In some implementations, the virtual walkthrough video can be formatted to be selectively cropped by a video player to provide one or more video directions for display during playback.

Another example aspect of the present disclosure is directed to a computer-implemented method for providing a virtual walkthrough interface. The method can include obtaining, by a computing system including one or more processors, a location-based query. The location-based query can be associated with obtaining information associated with a particular location. The method can include obtaining, by the computing system, a virtual walkthrough video associated with the particular location based on the location-based query. The virtual walkthrough video may have been generated by generating a plurality of view renderings with a neural radiance field model. In some implementations, the virtual walkthrough video can be descriptive a sequence of views of an environment associated with the location rendered in a forward progressing sequence and a backwards progressing sequence. The forward progressing sequence can be associated with a first portion of the virtual walkthrough video. The backwards progressing sequence can be associated with a second portion of the virtual walkthrough video. The method can include providing, by the computing system, playback of a first set of frames of the virtual walkthrough video. The method can include obtaining, by the computing system and during display of a particular frame in the first portion of the virtual walkthrough video, a navigation input. The navigation input can be descriptive of a request to perform a virtual walkthrough in an opposite direction. The method can include determining, by the computing system, a corresponding frame in the second portion of the virtual walkthrough video. The corresponding frame can be associated with the particular frame. The method can include providing, by the computing system, playback of a second set of frames of the virtual walkthrough video starting with the corresponding frame.

In some implementations, the particular frame and the corresponding frame can be associated with a same position in the environment.

Another example aspect of the present disclosure is directed to a computing system for providing a virtual walkthrough interface. The system can include one or more processors and one or more non-transitory computer-readable media that collectively store instructions that, when executed by the one or more processors, cause the computing system to perform operations. The operations can include obtaining a location-based query. The location-based query can be associated with obtaining information associated with a particular location. The operations can include obtaining a virtual walkthrough video associated with the particular location based on the location-based query. The virtual walkthrough video may have been generated by generating a plurality of view synthesis renderings with a neural radiance field model. In some implementations, the plurality of view synthesis renderings can include a plurality of three-hundred and sixty degree view renderings. The operations can include providing a virtual walkthrough associated with a first view direction by cropping the plurality of three-hundred and sixty degree view renderings of the virtual walkthrough video to display a first portion of the plurality of three-hundred and sixty degree view renderings associated with the first view direction. The operations can include obtaining a view direction input. The view direction input can be descriptive of a request to adjust a focal direction to a second view direction. The operations can include providing the second view direction for display by cropping the plurality of three-hundred and sixty degree view renderings of the virtual walkthrough video to display a second portion of the plurality of three-hundred and sixty degree view renderings associated with the second view direction.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 4D depicts an illustration of example video frame renderings according to example embodiments of the present disclosure.

FIG. 4E depicts an illustration of an example rendering path according to example embodiments of the present disclosure.

FIG. 5D depicts an illustration of an example outdoor rendering system according to example embodiments of the present disclosure.

FIG. 5E depicts an illustration of an example red-green-blue and depth map rendering system according to example embodiments of the present disclosure.

FIG. 19 depicts an illustration of an example weather-based rendering according to example embodiments of the present disclosure.

Figure 1:
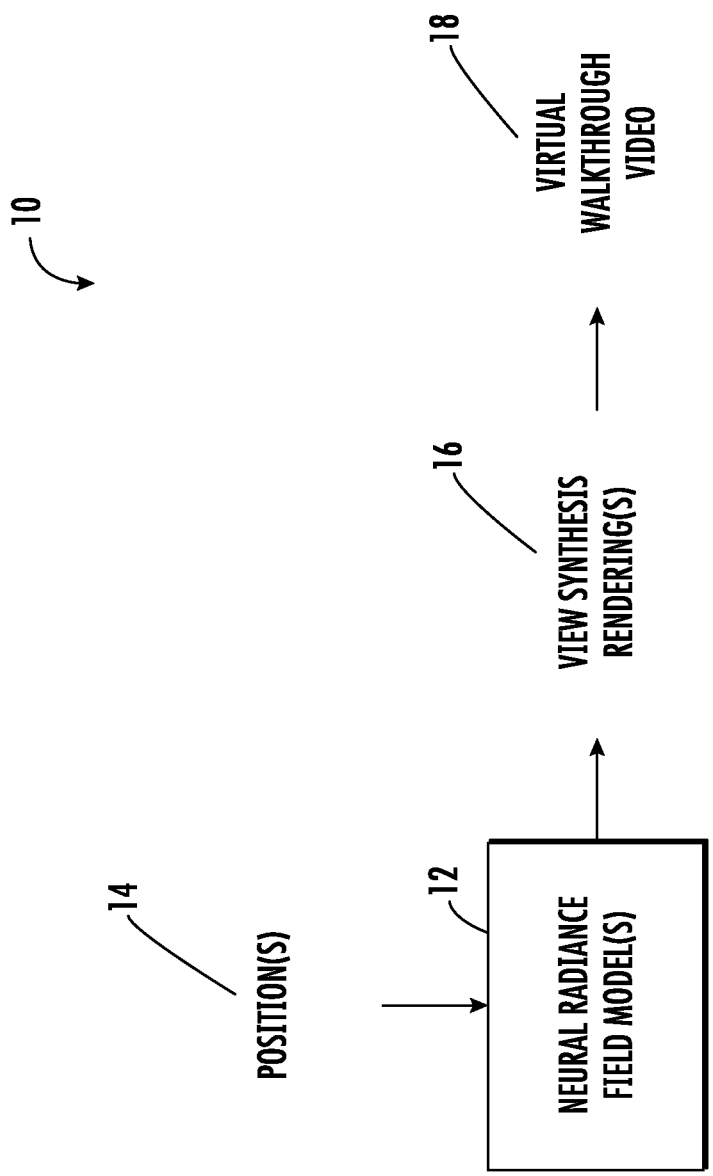
FIG. 1 depicts a block diagram of an example virtual walkthrough video generation system according to example embodiments of the present disclosure.

Reference numerals that are repeated across plural figures are intended to identify the same features in various implementations.

DETAILED DESCRIPTION

Generally, the present disclosure is directed to systems and methods for providing a virtual walkthrough interface. In particular, the systems and methods disclosed herein can leverage one or more neural radiance field models and/or video generation to generate a virtual walkthrough video that can be scrubbed to provide photorealistic and depth-aware imagery in a smooth, dynamic format with minimal to no latency. The systems and methods can include obtaining images of an environment. A neural radiance field model can be trained to generate view synthesis renderings of the environment based on the images. The trained neural radiance field model can then process position data associated with positions in the environment to generate view synthesis renderings of the environment associated with the positions. The view synthesis renderings can include predicted pixel data associated with predicted features in the environment when viewed from the respective positions. The systems and methods can then process the view synthesis renderings to generate a virtual walkthrough video that depicts different views of the environment. The generated virtual walkthrough video can then be stored to be provided to different users interested in virtually viewing the environment.

Neural radiance field models can generate photorealistic and depth-aware view synthesis renderings that can emulate real world images. Additionally and/or alternatively, neural radiance field models can perform novel view synthesis to provide renderings from positions and/or view directions not included in the training dataset. The systems and methods disclosed herein can leverage these properties to generate a plurality of view synthesis renderings along a path that can then be leveraged as a sequence of frames in a generated video. The path may be a smoothed version of the path taken during training data image capture and/or may be a path that differs from the training data path. In some implementations, the path may be determined with one or more machine-learned models and may be generated based on determining points of interest within the environment. For example, the path can be determined by determining the route associated with the capturing of images of the environment. The systems and methods can process the route to generate a smooth path that follows the general route of the image capture route with the side to side deviation smoothened. Alternatively and/or additionally, the systems and methods can determine the path by identifying pathways and/or regions of interest in the environment and generating a path based on the pathways and/or regions of interest. The systems and methods can then process the path and/or the regions of interest to determine the plurality of positions to process with the one or more neural radiance field models to generate the plurality of view synthesis renderings. The systems and methods can identify more points around the regions of interest to provide additional focus on the regions of interest.

The prerendered virtual walkthrough video can be obtained and scrubbed to provide an interactive virtual walkthrough interface. The prerendered virtual walkthrough video can be photorealistic and depth-aware without the computational cost and latency of rendering engine rendering. The scrubbing of the video can provide for easy navigation within the virtual environment with smooth transitions and ease in adjusting speed.

Additionally and/or alternatively, the systems and methods disclosed herein can leverage the neural radiance field models to generate three-hundred and sixty degree view synthesis renderings that can depict the environment from a plurality of different view directions associated with each processed position. The three-hundred and sixty degree view synthesis renderings can be generated by generating a plurality of direction-based view synthesis renderings for each position, which can then be stitched together to generate a panoramic image, which may include various view directions horizontally and/or vertically (e.g., the view synthesis rendering may be descriptive of a spherical view around the position within the environment). The three-hundred and sixty degree view synthesis renderings can be utilized to generate a three-hundred and sixty degree view video. The three-hundred and sixty degree view video can be selectively cropped, viewed, and/or zoomed to provide a navigable interface to view the environment from different view directions without jumping between videos. For example, the cropped, viewed, and/or zoomed portion can be adjusted based on user inputs.

The systems and methods disclosed herein can leverage properties of video players to mitigate and/or remove latency from providing a virtual walkthrough interface. In particular, the systems and methods may render the virtual walkthrough forwards and backwards to generate the virtual walkthrough video, such that a first portion of the virtual walkthrough video is descriptive of a sequence of frames in a first direction and a second portion of the virtual walkthrough video is descriptive of a sequence of frames in a second direction. The first direction and second direction can be opposite of one another (e.g., backwards and forwards). By rendering both backwards and forwards, the systems and methods can leverage the precaching properties of a video player regardless of the direction the user wishes to traverse the environment. For example, a user may begin the virtual walkthrough by navigating the environment in a forward direction. At a certain point, the user may wish to backtrack and/or move in the opposite direction. Video players can have difficulty playing videos backwards. However, since the virtual walkthrough video includes the frames rendered in both directions, the systems and methods can determine the playback is at a particular frame within the first portion (e.g., the forward rendering portion). The systems and methods can determine a corresponding portion in the second portion (e.g., the backward rendering portion) and can navigate to the corresponding frame and resume video playback. The multi-directional rendering of the video can ensure the video player is precaching the next frames of interest regardless of the direction of the walkthrough.

In some implementations, the systems and methods can utilize real-time rendering to complement and/or customize the user's experience. For example, the systems and methods may utilize one or more neural radiance field models to generate detours from the path, which may include bridging the gap between two videos to provide a seamless transition between one virtual walkthrough to a next virtual walkthrough. In particular, a first virtual walkthrough video may be prerendered for the interior of a restaurant, and a second virtual walkthrough video may be prerendered for the street that runs in front of the restaurant. The systems and methods may determine a user is requesting a virtual route along the run then into the restaurant. A path associated with the virtual route can then be determined. The plurality of positions between the first virtual walkthrough video and the second walkthrough video along the path can be processed with the one or more neural radiance field models to generate a plurality of additional view synthesis renderings, which can then be leveraged to generate a virtual route video that smoothly and seamlessly transitions the virtual walkthrough from the first virtual walkthrough video to the second virtual walkthrough video.

Additionally and/or alternatively, the one or more neural radiance field models can be utilized to generate a seamless transition from an aerial view dropdown to the virtual walkthrough experience. In some implementations, the systems and methods can blend view synthesis renderings of a neural radiance field model with images projected to a mesh. Additionally and/or alternatively, the depth predictions of the neural radiance field models can be leveraged for one or more segmentation masks and may be utilized for rendering objects, weather, time, and/or other features into the virtual walkthrough videos. The rendering of additional features can include performing a rendering distortion based on the depth predictions.

In some implementations, content items associated with the environment can be obtained and provided in the virtual walkthrough interface. For example, user images of the environment, reviews, videos, multimodal content, and/or other content can be obtained and rendered into the virtual walkthrough interface. The content may be processed to determine where and/or how to provide the content in the virtual walkthrough interface. In particular, a user-provided image can be processed to determine a location in which the image was captured in the environment. The user provided image can then be anchored to the location to be viewed and/or interacted with when the virtual walkthrough position is proximate to and/or the virtual walkthrough view direction is directed at the location associated with the content. The content item rendering and anchoring can provide additional information on the location and/or may provide a user with options to interact with an environment (e.g., book this table, view a review from someone who found this point as a point of interest, etc.).

Neural radiance field models can be utilized to generate three-dimensionally aware, photorealistic renderings of indoor and outdoor locations that may be leveraged by map applications for virtual walkthroughs, directions, and/or other interface features. A plurality of renderings can be generated to generate a video that can be stored and obtained as a search result and/or as a virtual walkthrough experience. The virtual walkthrough interface can be provided in a search results interface, a map application interface, and/or via other platforms and/or interfaces. The virtual walkthrough interface can provide a virtual preview of locations to inform users of what to expect and/or to provide users with an opportunity to view environments they may not have access to physically.

Images of locations on websites can fail to provide an accurate representation of a size and/or configuration of that location. The aesthetic, lighting, spatial dimensions, layout, and/or flow of an environment can be difficult to understand from image search results alone. Videos of locations can provide additional details; however, the video may fail to be smooth, clear, and/or visually consistent. Additionally, videos of a location may not currently exist and/or may be filled with occlusions that hinder the view of the environment.

Neural radiance field models can generate three-dimensionally aware, photorealistic view renderings, which can include novel view renderings. The view renderings can be leveraged to generate virtual walkthroughs of a plurality of different locations. For example, a plurality of images can be rendered with the neural radiance field model to generate a video to utilize for a virtual walkthrough. The virtual walkthrough can be provided by generating a video based on a plurality of renderings, rendering the video forwards and backwards, storing the forward-and-backward video, and providing the video when requested to be "scrubbed" for providing the virtual walkthrough. The forward-and-backward video can be leveraged to reduce latency based on video player capabilities and video player pre-caching. Additionally and/or alternatively, the plurality of renderings in the video can include 360 degree renderings that are cropped based on the view direction selected.

The rendered video can be leveraged for users to perform multi-directional virtual walkthroughs of restaurants, hotels, museums, streets, gardens, and/or other locations with photorealistic imagery without the distortion of some traditional image formats. The stored rendered video can be stitched with real-time view synthesis renderings for a tailored experience (e.g., an aerial rendering that transitions into the rendered video and/or a street rendering into an indoor rendering).

In some implementations, the neural radiance field models can be leveraged in real-time for real-time rendering. The real-time rendering can be performed in addition to the prerendering and/or in place of the prerendering.

Additionally and/or alternatively, an avatar for the user and/or avatars of other users may be rendered into the environment. For example, the user may view themselves (and/or their avatar) in the environment. Additionally and/or alternatively, the user may perform the virtual walkthrough with other users (e.g., other users they invite to view the environment). The avatar(s) for the other user(s) can then be rendered in the virtual walkthrough interface to be viewed by the user, such that the user can see the other user(s) are present, where they are, and/or what they are looking at. One or more communication interfaces can be provided within the virtual walkthrough interface (e.g., text bubbles, proximity voice chat, and/or other communication mediums). Users may be able to annotate, tag, and/or ping portions of the virtual environment to provide information to other users.

The virtual walkthrough interface can include spatial labeling of entities, can be provided with a time lapse feature, can be provided with navigation options, and/or can be provided with augmentation options.

The systems and methods of the present disclosure provide a number of technical effects and benefits. As one example, the system and methods can provide a virtual walkthrough interface by leveraging a generated virtual walkthrough video. In particular, a neural radiance field model can be trained on a plurality of images of an environment (e.g., one or more rooms and/or an outdoor environment). The trained neural radiance field model can then generate a plurality of view synthesis renderings associated with positions along one or more paths. The virtual walkthrough video can then be generated based on the plurality of view synthesis renderings. The neural radiance field model can be utilized to generate photorealistic and depth-aware view synthesis renderings and may be utilized to generate novel view renderings of the environment that are not included in the training dataset.

Another technical benefit of the systems and methods of the present disclosure is the dimensionally accurate modeling and the interactivity of the provided video rendering. The model can provide dimensionally accurate representations of locations to allow for potential visitors to determine if they indeed wish to visit the location. Moreover, the dimensionally accurate representations can enable a user to more effectively navigate to and view that location. For example, the systems and methods disclosed herein can include rendering the video both forward and backward to allow a user to move back and forth within the virtual environment with minimal latency. In particular, video players may precache upcoming frames. The systems and methods disclosed herein can generate a virtual walkthrough video that includes a sequence of frames rendered forwards and backwards, such that if a user wishes to change the direction of the walkthrough, a corresponding frame in the opposite direction video rendering can be determined and navigated to in order to precache frames for going in the opposite direction.

Video players can precache frames that follow a currently provided frame in order to reduce latency (and/or buffering). Additionally and/or alternatively, video players can provide smoother playback during traditional forward playback and may struggle with similar performance for rewind playback. The systems and methods disclosed herein can provide a multi-directional navigational interface that can provide smooth virtual walkthrough navigation in multiple directions. A traditional video can be provided in a video player with smooth playback in a predetermined direction but may struggle when attempting to scrub the video in the opposite direction as the frames in the opposite direction are not being actively precached. The systems and methods disclosed herein can generate a multi-directional video that includes a first portion with a sequence of frames in a forward sequence rendering and a second portion with the sequence of frames in a backward sequence rendering. The multi-directional video can include metadata that associates corresponding frames between the portions to instruct a video player to navigate to the corresponding frame in the respective other portion when a navigational direction is changed, which can cause the video player to precache frames for performing scrubbing more smoothly in the opposite direction of previous scrubbing playback. The generated multi-directional video can be leveraged to provide a virtual walkthrough interface without the computational cost of rendering engines with the smooth interactivity of providing multi-directional navigation features.

Additionally and/or alternatively, the plurality of view synthesis renderings can include three-hundred and sixty degree view renderings, which can be leveraged to generate three-hundred and sixty degree view videos. The videos can then be selectively cropped to show only a portion of a the three-hundred and sixty degree view video at a given time. A user may then interact with the virtual walkthrough interface to request a different view direction. In response to the request for a different view direction, the systems and methods may adjust the cropping to show a different portion of the three-hundred and sixty degree view video. The view direction navigation interface disclosed herein can leverage the three-hundred and sixty degree view video to smoothly navigate view directions without the computational cost of switching between different videos.

Another example technical effect and benefit relates to improved computational efficiency and improvements in the functioning of a computing system. For example, certain existing systems can allow a user to perform virtual navigation through an environment by relying on tedious and computationally expensive asset generation and rendering, which may rely on computationally expensive rendering engines and the expertise of the developer. The systems and methods disclosed herein can leverage one or more neural radiance field models to prerender and store a virtual walkthrough video that can be generated and formatted to provide navigation options without the computational expense of utilizing rendering engines. The systems and methods can save computational resources such as processor usage, memory usage, and/or network bandwidth. In particular, the virtual walkthrough video can require less bandwidth for it to be transmitted to a user device, in comparison to transmitting and rendering with a rendering engine that utilizes real-time rendering assets for environment transversal. Moreover, the prerendered virtual walkthrough video may occupy less memory at the user device and/or the server computing system than alternative rendering assets and may rely on less processor usage in order to provide the virtual walkthrough interface.

With reference now to the Figures, example embodiments of the present disclosure will be discussed in further detail.

FIG. 1 depicts a block diagram of an example virtual walkthrough video generation system 10 according to example embodiments of the present disclosure. In some implementations, the virtual walkthrough video generation system 10 is configured to receive, and/or obtain, a plurality of positions 14 descriptive of positions within an environment and, as a result of receipt of the plurality of positions 14, generate, determine, and/or provide virtual walkthrough video 18 that depicts a rendered path of the environment. Thus, in some implementations, the virtual walkthrough video generation system 10 can include a neural radiance field model 12 that is operable to generate view synthesis renderings 16 of the environment based on a learned three-dimensional representation of the environment.

In particular, the virtual walkthrough video generation system 10 can obtain a neural radiance field model 12 associated with an environment. The neural radiance field model 12 may have been trained on a plurality of images of the environment. The neural radiance field model can be trained to generate view synthesis renderings 16 of the environment. In some implementations, the neural radiance field model 12 may be trained on image patches (e.g., the plurality of images can be segmented into a plurality of image patches that can then be utilized as ground truth images for training). Additionally and/or alternatively, the neural radiance field model can be trained on image data and lidar data.

The neural radiance field model 12 can process a plurality of positions 14 associated with a path to generate a plurality of view synthesis renderings 16 of the environment. The plurality of positions 14 can be associated with a plurality of locations within the environment. The path can be associated with a route through the environment. The path can be manually determined, can be based on image-capture positions, and/or may be automatically determined based on regions of interest in the environment, locations of entrance and exit, and/or based on determined pathways. The plurality of view synthesis renderings 16 can depict the environment from the plurality of view synthesis renderings 16. The plurality of view synthesis renderings 16 can be generated based on a plurality of predicted color values and a plurality of predicted opacity values.

The example virtual walkthrough video generation system 10 can process the plurality of view synthesis renderings 16 to generate a virtual walkthrough video 18. The virtual walkthrough video 18 can be descriptive of a virtual tour of the environment. The virtual walkthrough video 18 can then be stored. The virtual walkthrough video 18 may then be obtained and utilized by a virtual walkthrough interface 18 to provide virtual tours to users.

Figure 2:
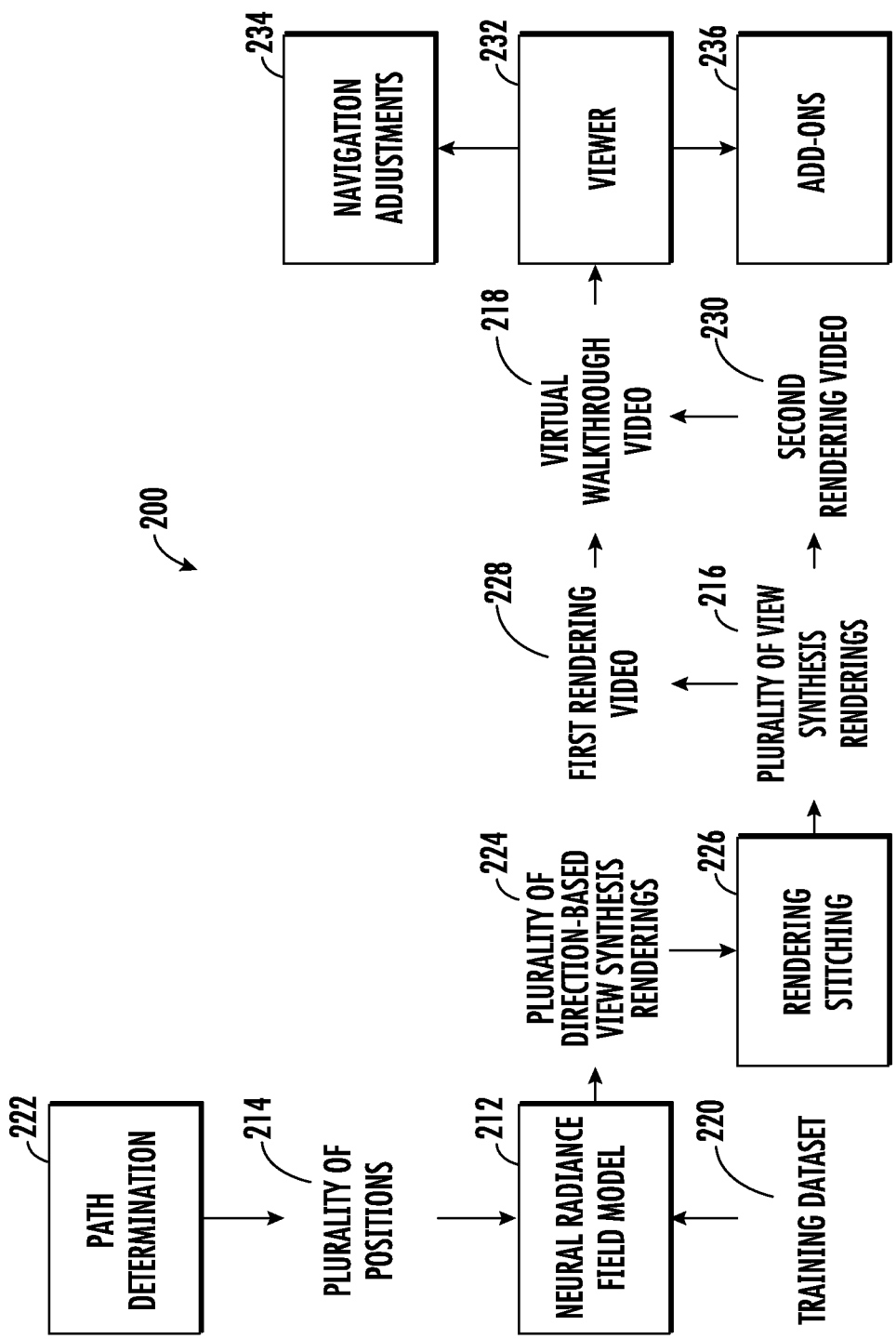
FIG. 2 depicts a block diagram of an example video generation and display system according to example embodiments of the present disclosure.

FIG. 2 depicts a block diagram of an example video generation and display system 200 according to example embodiments of the present disclosure. The video generation and display system 200 is similar to virtual walkthrough video generation system 10 of FIG. 1 except that video generation and display system 200 further includes rendering stitching and multi-directional rendering.

In particular, the video generation and display system 200 can obtain a neural radiance field model 212 associated with an environment (e.g., a room (e.g., a restaurant, a store, an apartment, etc.), a street, and/or other environments). The neural radiance field model 212 may have been trained on a training dataset 220 that includes data descriptive of the environment. The neural radiance field model can be trained to generate view synthesis renderings 216 of the environment. In some implementations, the neural radiance field model 212 may be trained on image patches (e.g., the plurality of images can be segmented into a plurality of image patches that can then be utilized as ground truth images for training) generated based on a plurality of images of the training dataset 220. Additionally and/or alternatively, the neural radiance field model can be trained on training dataset 220 including image data and lidar data.

The neural radiance field model 212 can process a plurality of positions 214 associated with a path to generate a plurality of view synthesis renderings 216 of the environment. The plurality of positions 214 can be associated with a plurality of locations within the environment.

Data associated with the environment can be processed with a path determination block 222 to determine a path through the environment. The plurality of positions 214 can be determined based on the determined path. The path can be associated with a route through the environment. The path can be manually determined, can be based on image-capture positions, and/or may be automatically determined based on regions of interest in the environment, locations of entrance and exit, and/or based on determined pathways. The plurality of view synthesis renderings 216 can depict the environment from the plurality of view synthesis renderings 216. The plurality of view synthesis renderings 216 can be generated based on a plurality of predicted color values and a plurality of predicted opacity values.

The plurality of view synthesis renderings 216 can be generated by, for each position of the plurality of positions, processing the position with a neural radiance field model 212 to generate a plurality of direction-based view synthesis renderings 224 associated with views of the environment from a plurality of different view directions from the position. The plurality of direction-based view synthesis renderings 224 can be processed with a rendering stitching block 226 to generate a respective panoramic image descriptive of a plurality of views of the environment from the position. The process can be repeated for each position to generate the plurality of view synthesis renderings 216. The plurality of view synthesis renderings 216 can include a plurality of three-hundred and sixty degree view panoramic images of the environment.

The example virtual walkthrough video generation system 200 can process the plurality of view synthesis renderings 216 to generate a first rendering video 228 and a second rendering video 230. The first rendering video 228 may be descriptive of the plurality of view synthesis renderings 216 ordered in a first order. The second rendering video 230 may be descriptive of the plurality of view synthesis renderings 216 ordered in a second order. The second order may include the same sequence of frames as the first order but in an opposite order direction. For example, the plurality of view synthesis renderings 216 can be processed to forward render a video to generate the first rendering video 228 and to backward render a video to generate the second rendering video 230.

The first rendering video 228 and the second rendering video 230 can then be combined to generate the virtual walkthrough video 218. The virtual walkthrough video 218 can include the first rendering video 228 then the second rendering video 230. The virtual walkthrough video 218 can include a three-hundred and sixty degree view video. The virtual walkthrough video 218 can include a first portion associated with the first rendering video 228 and a second portion associated with the second rendering video 230.

The example virtual walkthrough video generation and display system 200 can process the plurality of view synthesis renderings 216 to generate a virtual walkthrough video 218 by rendering a video backwards and forwards. The virtual walkthrough video 218 can be descriptive of a virtual tour of the environment. The virtual walkthrough video 218 can then be stored. The virtual walkthrough video 218 may then be obtained and utilized by a virtual walkthrough interface 218 to provide virtual tours to users.

The virtual walkthrough video 218 can then be provided for display via a viewer 232 of a virtual walkthrough interface 232. The virtual walkthrough interface can include a plurality of user interface elements for controlling navigation through the environment (e.g., the position of the walkthrough, the view direction, the speed, and/or the zoom. The plurality of user interface elements may include a joystick for controlling the position and view direction of the "virtual walkthrough."

The virtual walkthrough interface can obtain one or more navigation inputs that can be processed with a navigation adjustments block 234 to determine a navigation adjustment. The navigation adjustment can include changing "walking" directions, changing view direction, changing zoom, and/or changing speed. Changing the "walking" direction can include determining the particular frame being displayed during the input. The particular frame can be determined to be in the first portion of the virtual walkthrough video that is associated with the first rendering video 228. The video generation and display system 200 can determine a corresponding frame in the second portion of the virtual walkthrough video (e.g., the portion of the video associated with the second rendering video 230) that is associated with the particular frame (e.g., the particular frame may be determined to depict the environment from a same position as the corresponding frame). The video generation and display system 200 can then instruct the viewer to navigate to the corresponding frame and restart playback at the corresponding frame.

Alternatively and/or additionally, the one or more navigation inputs can be processed with a navigation adjustments block 234 to determine a navigation adjustment that is descriptive of a view direction change. Changing the view direction can include adjusting the cropping of the virtual walkthrough video to depict a different region of the three-hundred and sixty degree view video. Cropping the virtual walkthrough video 218 can include adjusting the portion of the frames that are depicted in the viewer 232. The view directions may be provided in a grid format and/or may be able to be scrolled without predesignated boundaries.

In some implementations, the virtual walkthrough video 218 can be provided in the viewer 232 with one or more add-ons 236. The one or more add-ons 236 can include user-generated content renderings in the virtual walkthrough video 218 (e.g., user images, reviews, user videos, and/or other content can be rendered within the virtual walkthrough video 218). Additionally and/or alternatively, the virtual walkthrough video 218 can be provided with a real-time rendering. For example, an aerial view dropdown into the environment can be rendered and then provided with the virtual walkthrough video 218. The aerial view dropdown can include blending different rendering types (e.g., blending neural radiance field model renderings and mesh-based image projection renderings). Additional real-time renderings may include rendering a detour through the environment. The detour can be rendered based on one or more user inputs.

Figure 3:
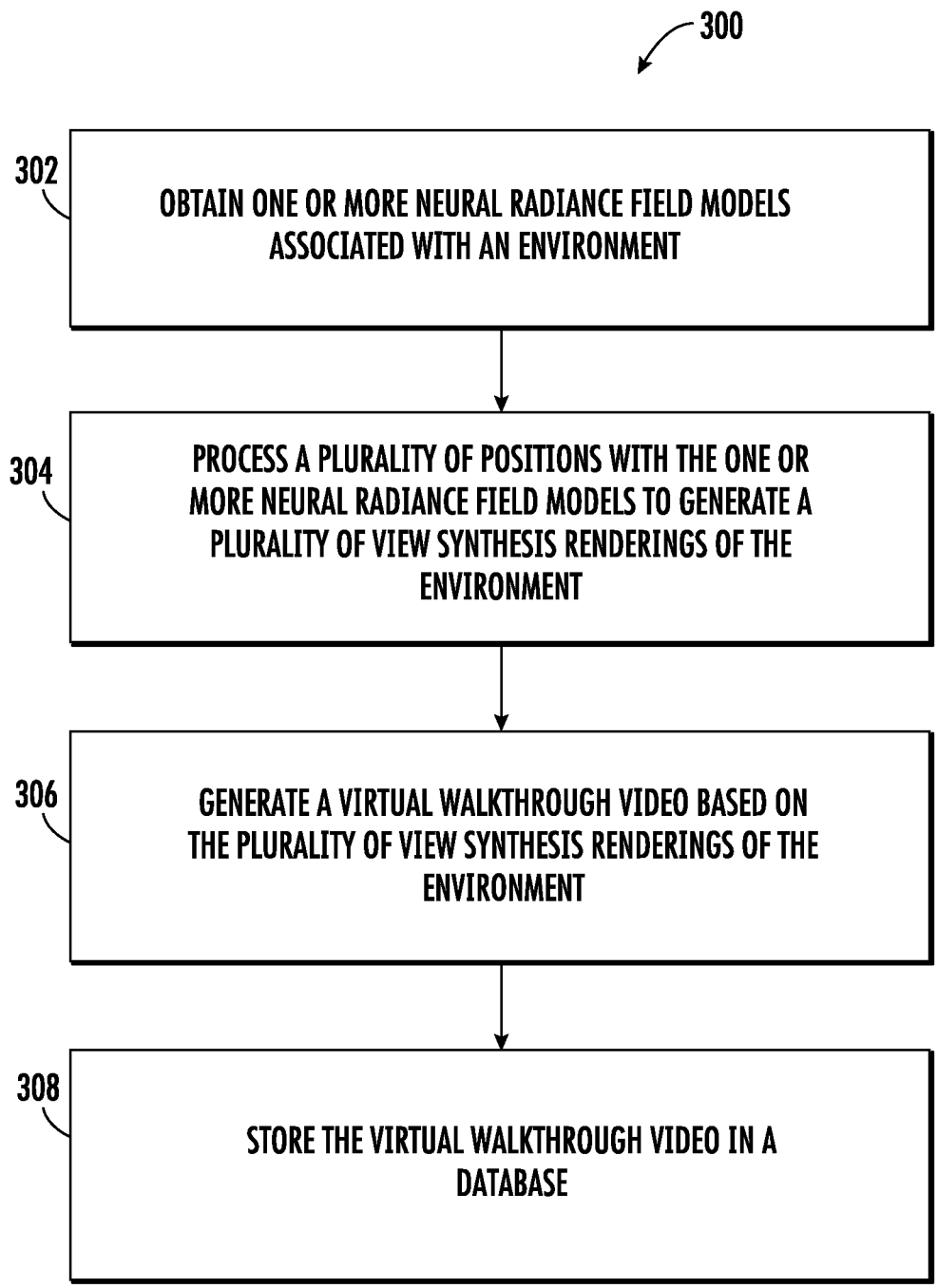
FIG. 3 depicts a flow chart diagram of an example method to perform virtual walkthrough video generation according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain one or more neural radiance field models associated with an environment. The one or more neural radiance field models may have been trained to generate view renderings of the environment. The environment can be associated with a geographic location. In some implementations, the environment can be associated with a store, a restaurant, a landmark, an apartment, a house, an event space, a street, a monument, a museum, a government building, and/or other environments. The geographic location can include coordinates and/or an address for the environment.

In some implementations, the computing system can train the one or more neural radiance field models on a plurality of images of the environment. For example, the computing system can obtain a plurality of images of an environment and can train the one or more neural radiance field models based on the plurality of images. The plurality of images can be generated with one or more image sensors. In some implementations, the plurality of images may be descriptive of a plurality of views of the environment associated with a plurality of image-captures positions and a plurality of image-capture view directions within the environment. The one or more image sensors may be image sensors associated with a mobile computing device. In some implementations, the one or more image sensors may be mounted to a vehicle. Alternatively and/or additionally, the one or more image sensors may be a set of sensors of a plurality of sensors included in a backpack. The plurality of sensors may include image sensors, lidar sensors, and/or GPS sensors. The plurality of images can include images of one or more rooms (e.g., a restaurant, an apartment, a music venue, and/or other rooms), one or more buildings, one or more landmarks, one or more streets (e.g., street view images), and/or one or more landscapes.

In some implementations, the one or more neural radiance field models may have been trained on the plurality of images of the environment and lidar data for the environment. Training can include evaluating a depth loss based on the lidar data. Training the one or more neural radiance field models can include processing one or more positions and one or more view directions with the one or more neural radiance field models to generate one or more predicted color values and one or more predicted depth values. The one or more predicted color values may be evaluated with a photometric loss, and the one or more predicted depth values may be evaluated with a depth loss. In some implementations, the one or more predicted color values can be evaluated based on the plurality of images, and the one or more predicted depth values may be evaluated based on the lidar data. The one or more neural radiance field models can be trained by a user computing system, a server computing system, and/or other computing systems. In some implementations, the one or more neural radiance field models can be trained with a different computing system than the video rendering computing system.

In some implementations, the computing system can process the plurality of images with a segmentation model to generate a plurality of segmented images. The segmentation model can generate segmentation masks for segmenting occlusions from an image. The computing system can generate replacement data for the plurality of segmented images. In some implementations, the replacement data can be descriptive of predicted pixels for replacing masked regions of the plurality of segmented images. The computing system can generate a plurality of augmented images based on the plurality of segmented images and the replacement data. The one or more neural radiance field models can be trained on the plurality of augmented images.

In some implementations, training the one or more neural radiance field models based on the plurality of images can include determining a plurality of respective scene positions and a plurality of respective scene view directions for the plurality of images based on comparing feature location and feature sizes between images. Training can include processing one or more respective scene positions of the plurality of respective scene positions and one or more respective scene view directions of the plurality of respective scene view directions with the one or more neural radiance field models to generate one or more predicted view synthesis renderings. The one or more predicted view synthesis renderings can include one or more predicted color values and one or more predicted opacity values. Training the one or more neural radiance field models can include evaluating a loss function that evaluates a difference between the one or more predicted view synthesis renderings and one or more respective images of the plurality of images and adjusting one or more parameters of the one or more neural radiance field model based at least in part on the loss function.

At 304, the computing system can process a plurality of positions with the one or more neural radiance field models to generate a plurality of view synthesis renderings of the environment. The plurality of positions can be associated with a plurality of locations within the environment. The plurality of view synthesis renderings can be descriptive of the environment from the plurality of positions. The plurality of view synthesis renderings can be descriptive of view included in the plurality of images and/or novel views not included in the plurality of images of the environment. The plurality of view synthesis images can include a plurality of predicted pixels associated with predicted colors, predicted depths, and/or predicted lighting for the environment.

In some implementations, processing the plurality of positions with the one or more neural radiance field models to generate the plurality of view synthesis renderings of the environment can include, for each position of the plurality of positions, processing the position with the one or more neural radiance field models to generate a plurality of directional view synthesis renderings. The plurality of directional view synthesis renderings can be associated with a plurality of view directions for the position. Processing the plurality of positions with the one or more neural radiance field models to generate the plurality of view synthesis renderings of the environment can include, for each position of the plurality of positions, generating a respective view synthesis rendering for the position by stitching the plurality of directional view synthesis renderings to generate a panoramic image rendering for the position. In some implementations, the plurality of view synthesis renderings can include a plurality of panoramic view synthesis renderings descriptive of the respective plurality of directional view synthesis renderings for each of the positions.

At 306, the computing system can generate a virtual walkthrough video based on the plurality of view synthesis renderings of the environment. The virtual walkthrough video can be descriptive of a sequence of views of the environment. The virtual walkthrough video can include a plurality of frames that can be associated with the plurality of view synthesis renderings of the environment. In some implementations, the plurality of view synthesis renderings can be at least a subset of the plurality of frames. Additionally and/or alternatively, the computing system may process the plurality of view synthesis renderings to generate the plurality of frames, which can include blending and/or augmenting the plurality of view synthesis renderings for smooth transitions between positions within the environment.

In some implementations, generating the virtual walkthrough video based on the plurality of view synthesis renderings of the environment can include generating a first rendering video based on rendering the sequence of views of the environment in a first direction, generating a second rendering video based on rendering the sequence of views of the environment in a second direction, and generating the virtual walkthrough video by combing the first rendering video and the second rendering video. The first rendering video can be associated with a first portion of the virtual walkthrough video. The second rendering video can be associated with a second portion of the virtual walkthrough video. Rendering the sequence of frames forwards and backwards can provide the plurality of frames to be viewed with a video player in either direction without the potential latency issues that can occur when playing videos backwards. For example, corresponding frames in the first portion and the second portion can be associated with one another to be quickly navigated to when a user selects an option to switch "walkthrough" (or playback) directions.

At 308, the computing system can store the virtual walkthrough video in a database. The database can be a searchable database. Storing the virtual walkthrough video can include indexing the virtual walkthrough video with the geographic location associated with the environment. In some implementations, the virtual walkthrough video can be indexed with information descriptive of a location and/or name for the environment. For example, the virtual walkthrough video can be indexed with the address and/or coordinates for the environment such that the virtual walkthrough video can be obtained based on querying the database with an address and/or coordinates. The virtual walkthrough video can be stored with an entity tag associated with the environment (e.g., a name of the restaurant, a name of the store chain, a name of the monument, a name of the street, etc.). The virtual walkthrough video can be stored in a database with a plurality of other prerendered virtual walkthrough videos. Additionally and/or alternatively, metadata associated with the virtual walkthrough video can be generated and stored. The metadata can include entity tags, location information, user-generated content that can be rendered, links, data associated with corresponding frames in the virtual walkthrough video, position data, view direction data, and/or data descriptive of instructions for providing the virtual walkthrough video for display.

In some implementations, the computing system can obtain a search query. The computing system can determine the search query is associated with a particular geographic location. In response to determining the search query is associated with the particular geographic location, the computing system can search the database to determine the virtual walkthrough video is associated with the particular geographic location. In response to determining the virtual walkthrough video is associated with the particular geographic location associated with the virtual walkthrough video, the virtual walkthrough video can be obtained from the database. The computing system can then provide the virtual walkthrough video for display in a virtual walkthrough interface. The search query can include a text string. The text string can be associated with one or more entities. In some implementations, determining the geographic location associated with the virtual walkthrough video is associated with the search query can include determining the one or more entities is associated with the geographic location. The search query may include text data, image data, audio data, latent encoding data, and/or other data that can be embedded then searched to determine a virtual walkthrough video to display. The search query may be obtained with a virtual walkthrough interface, which can then search a prerendered video database to obtain the virtual walkthrough video.

Alternatively and/or additionally, the computing system can provide a map interface for display. The map interface can include map information associated with a geographic location. The geographic location can be associated with the environment. The computing system can obtain a selection of a virtual walkthrough user interface element, determine the virtual walkthrough video is associated with the geographic location, and provide the virtual walkthrough video for display.

Figure 4A:
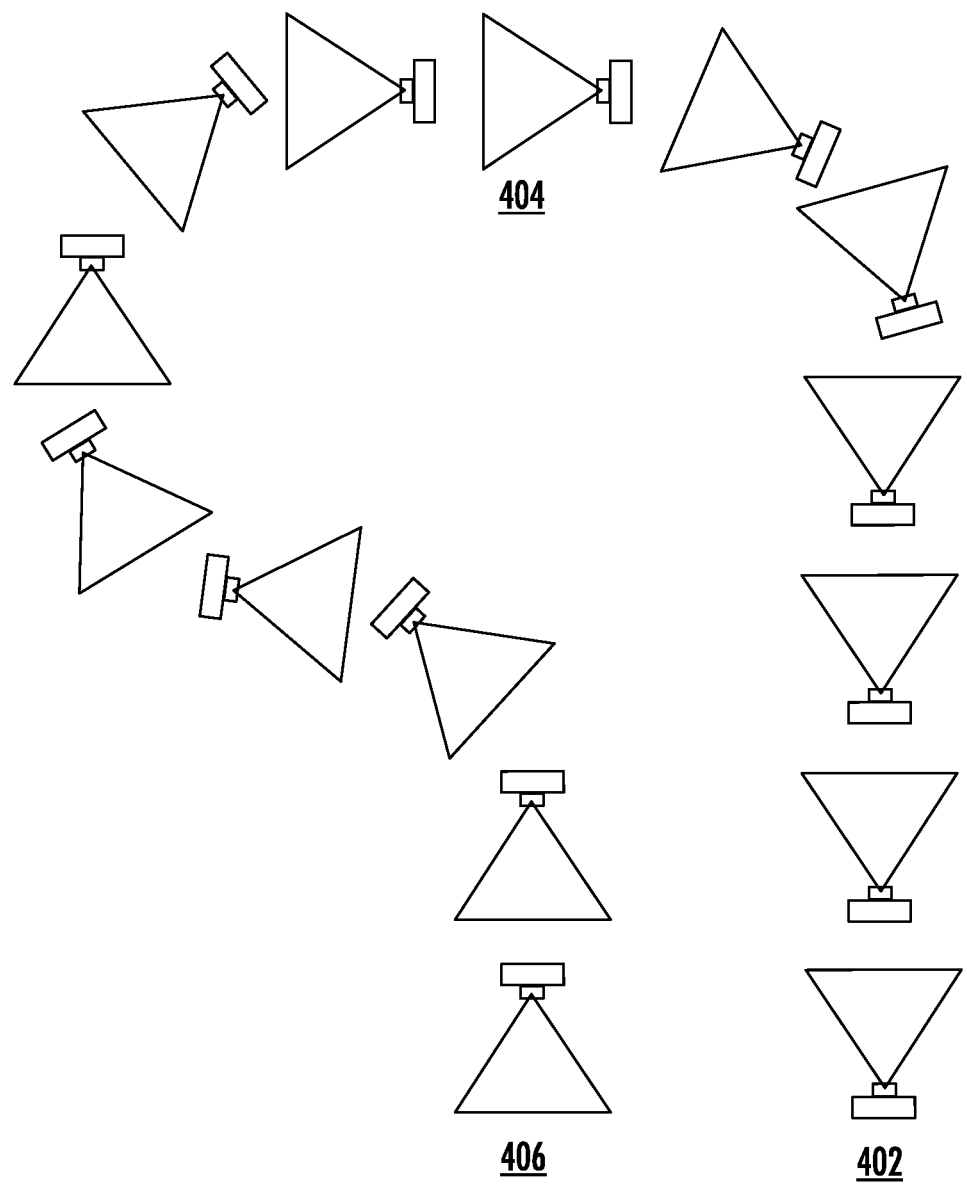
FIG. 4A depicts an illustration of an example image capture route according to example embodiments of the present disclosure.

FIG. 4A depicts an illustration of an example image capture route 400 according to example embodiments of the present disclosure. Obtaining images of the environment for training the neural radiance field model can be based on a set framework of rules and procedures. For example, the plurality of images can be captured by performing a set path with set image-capture directions. FIG. 4A can depict an example image-capture path with example positions and example view directions. The image-capture path can include a start 402 that then loops 404 within the environment then ends 406 exiting the environment.

Figure 4B:
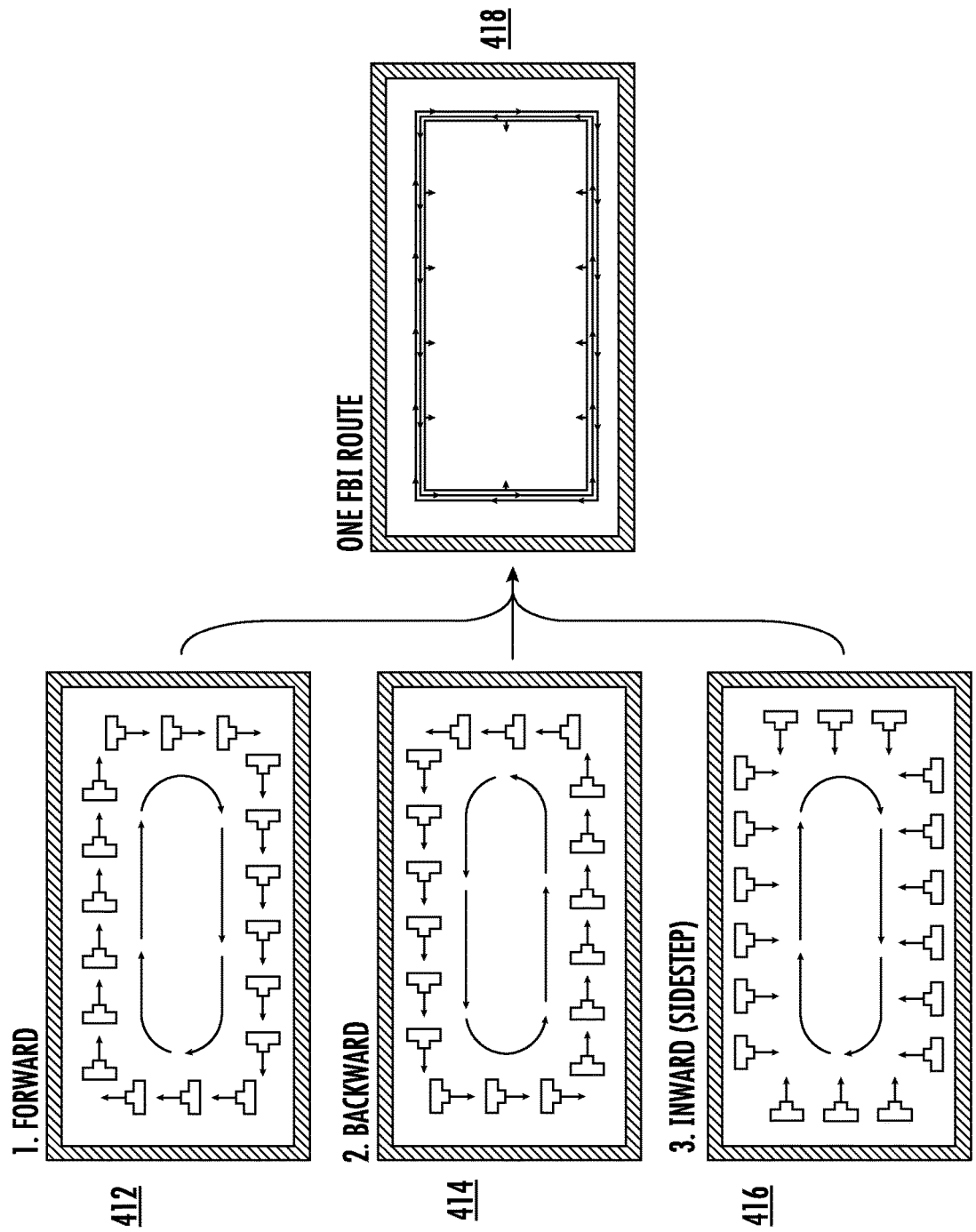
FIG. 4B depicts an illustration of an example image capture route system according to example embodiments of the present disclosure.

FIG. 4B depicts an illustration of an example image capture route system according to example embodiments of the present disclosure. In particular, the image capture route system can include three loops within the environment. The three loops can include a forward loop 412 with images captured along the loop, a backward loop 414 with images captured along the loop, in which the backward loop 414 is the opposite direction of the forward loop 412, and an inward loop 416, which is along the path of the forward loop 412 except the image sensor is directed toward the center of the loop. The images captured from each loop can be aggregated and stored as one forward-backward-inward route 418 of image data. In some implementations, the images can be stored with data descriptive of the image-capture positions and the image-capture view directions.

Figure 4C:
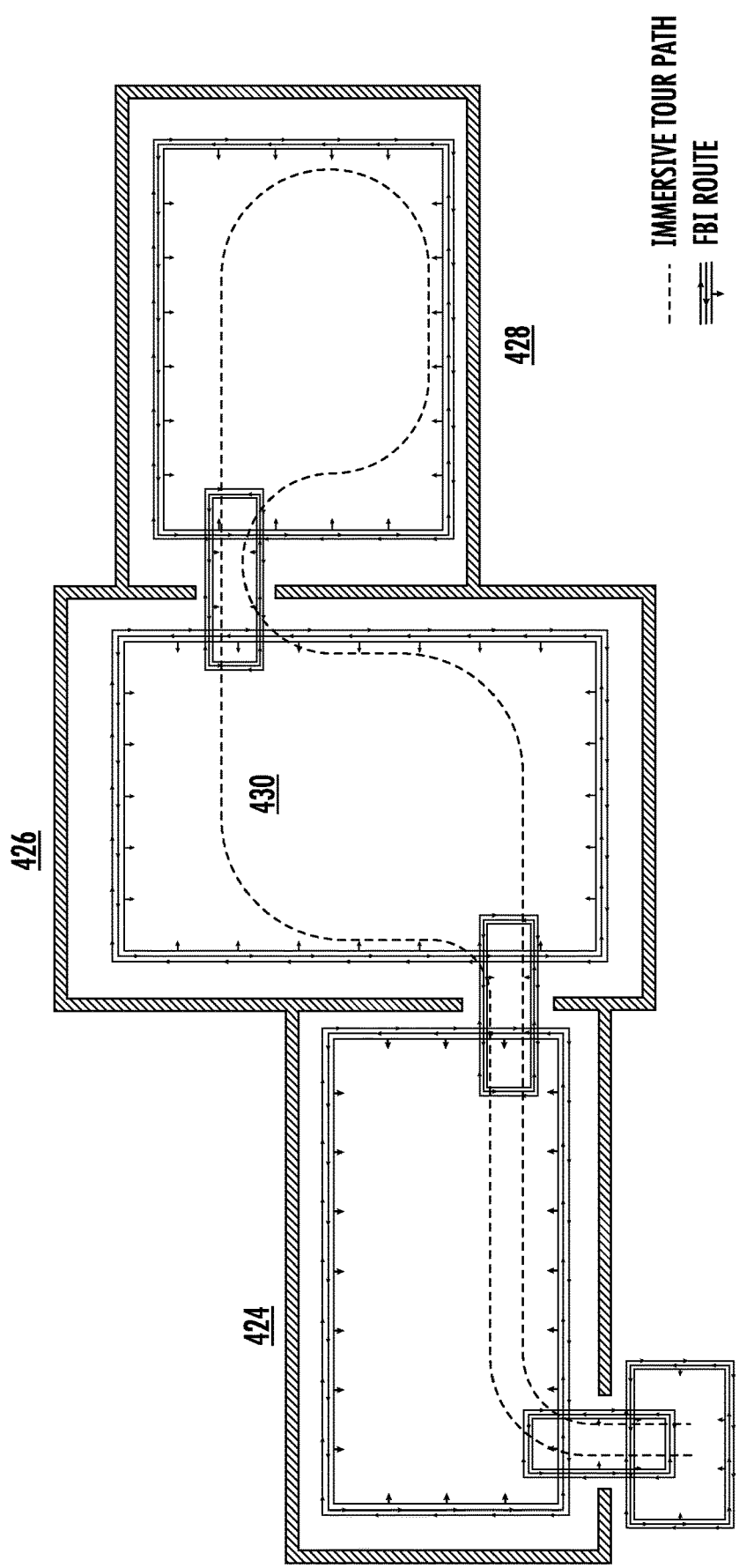
FIG. 4C depicts an illustration of an example rendering pathway overlay in view of the image capture routes according to example embodiments of the present disclosure.

FIG. 4C depicts an illustration of an example rendering pathway overlay in view of the image capture routes according to example embodiments of the present disclosure. In particular, FIG. 4C depicts the image capture route system of FIG. 4B applied to a multi-room environment. The image capture route system can be repeated for each room and, in some implementations, in the doorway. The image capture can include a doorway aggregated loop 422, a first room aggregated loop 424, a second room aggregated loop 426, a third room aggregated loop 428 and two hallway aggregated loops. The plurality of aggregated image capture loops with the plurality of images can be utilized to train one or more neural radiance field models for the environment that includes the three rooms and the doorway. Once the one or more neural radiance field models are trained, a path 430 can be determined. A plurality of positions within the path 430 can be processed with the one or more neural radiance field models to generate a plurality of view synthesis renderings of the environment, which can then be utilized to generate a virtual walkthrough video of the environment.

FIG. 4D depicts an illustration of example video frame renderings according to example embodiments of the present disclosure. In particular, a virtual walkthrough video can be generated for the environment and stored. The virtual walkthrough video can be obtained from a database then provided for playback via a user computing device (e.g., a mobile computing device, a smart wearable, a smart appliance, a television, and/or a desktop). The environment can be a restaurant, and the virtual walkthrough video can depict a walkthrough of the restaurant. FIG. 4D can depict three example frames from the virtual walkthrough video. The first frame 432 can depict the environment from a first position at the entrance of the restaurant pointed towards the back of the restaurant. The second frame 434 can depict the environment from a second position near the bar in the restaurant and pointed towards the wall of the restaurant. The third frame 436 can depict the environment from a third position near the entrance of the restaurant pointed towards the door out of the restaurant.

FIG. 4E depicts an illustration of an example rendering path according to example embodiments of the present disclosure. The plurality of view synthesis renderings can include three-hundred and sixty degree view renderings. FIG. 4E can depict a representation of the coverage of the three-hundred and sixty degree view panorama 442. Additionally, FIG. 4E can depict the three-hundred and sixty degree view panorama 442 across time and space 444 of the virtual walkthrough.

Figure 5A:
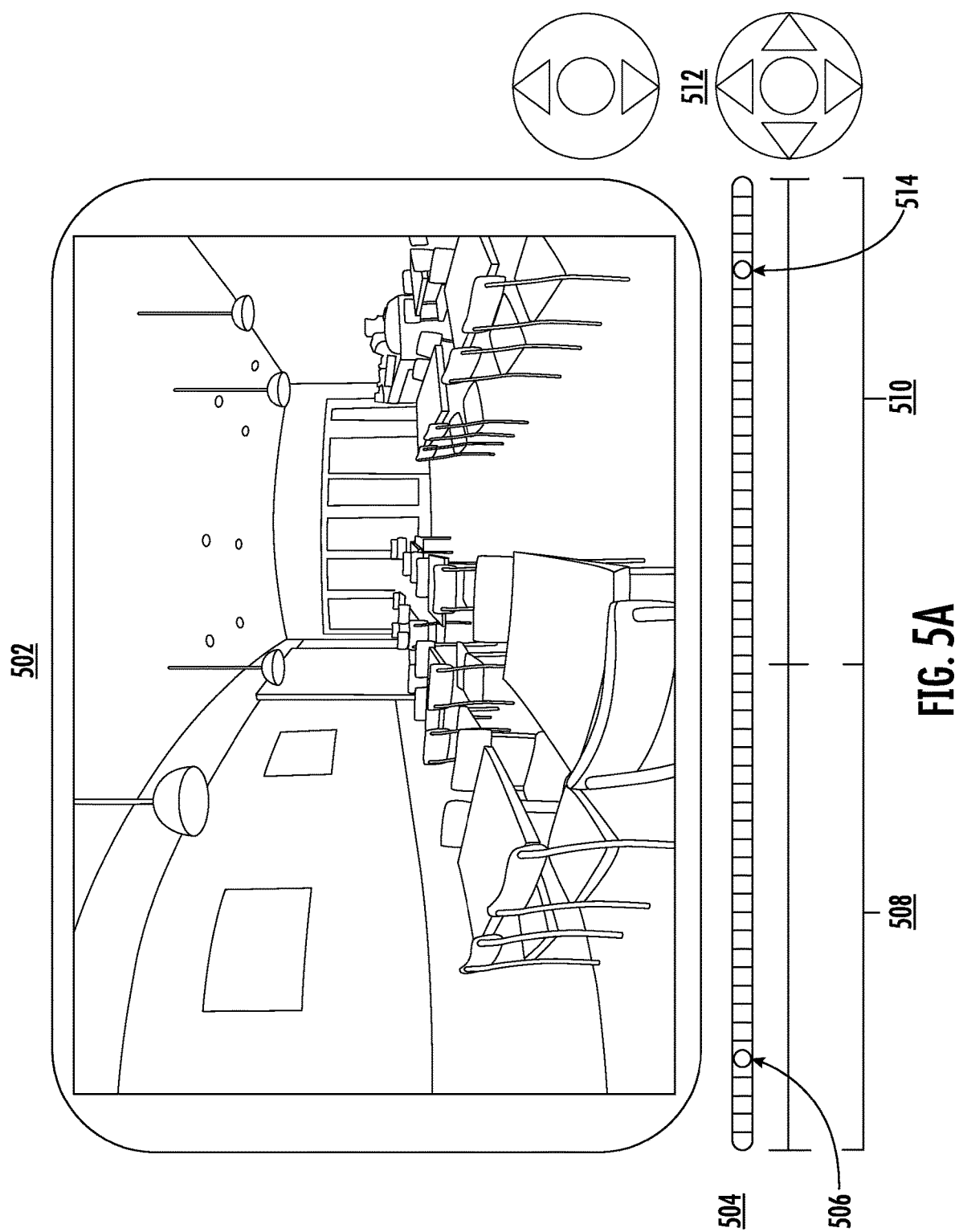
FIG. 5A depicts an illustration of an example video player system according to example embodiments of the present disclosure.

FIG. 5A depicts an illustration of an example video player system according to example embodiments of the present disclosure. The video player system can include a video player 502 that can provide the virtual walkthrough video for playback. The virtual walkthrough video can be descriptive of a plurality of view synthesis renderings of the environment. The depicted progress bar 504 can include indicators of frames associated with the plurality of positions within the environment including the views provided by the plurality of view synthesis renderings. The video player 502 may currently depict a portion of a particular frame 506 associated with the first portion 508 of the video. The first portion 508 of the video can be associated with a forward rendering of a sequence of position-based renderings, and the second portion 510 of the video can be associated with a backward rendering of the sequence of position-based renderings.

The video player system can include one or more user interface elements for providing navigational inputs for controlling the virtual walkthrough. The navigational adjustments can include changing the movement direction, changing the movement speed, changing the view direction, and/or changing the zoom. The video player system may include one or more joystick user interface elements 512. The one or more joystick user interface elements 512 can be utilized to change the movement direction, view direction, speed, and/or zoom. For example, the user may pull a joystick user interface element down to change the movement direction. In response to receiving the input, the particular frame 506 being depicted can be determined. A corresponding frame 514 in the second portion 510 can then be determined. The playback can then jump to the corresponding frame 514, which can help with precaching the next frames for performing the virtual tour in the correct direction. In some implementations, the view direction may be changed with the movement direction change in order to perform a one hundred and eighty degree view direction change to emulate turning around when the movement direction changes.

Figure 5B:
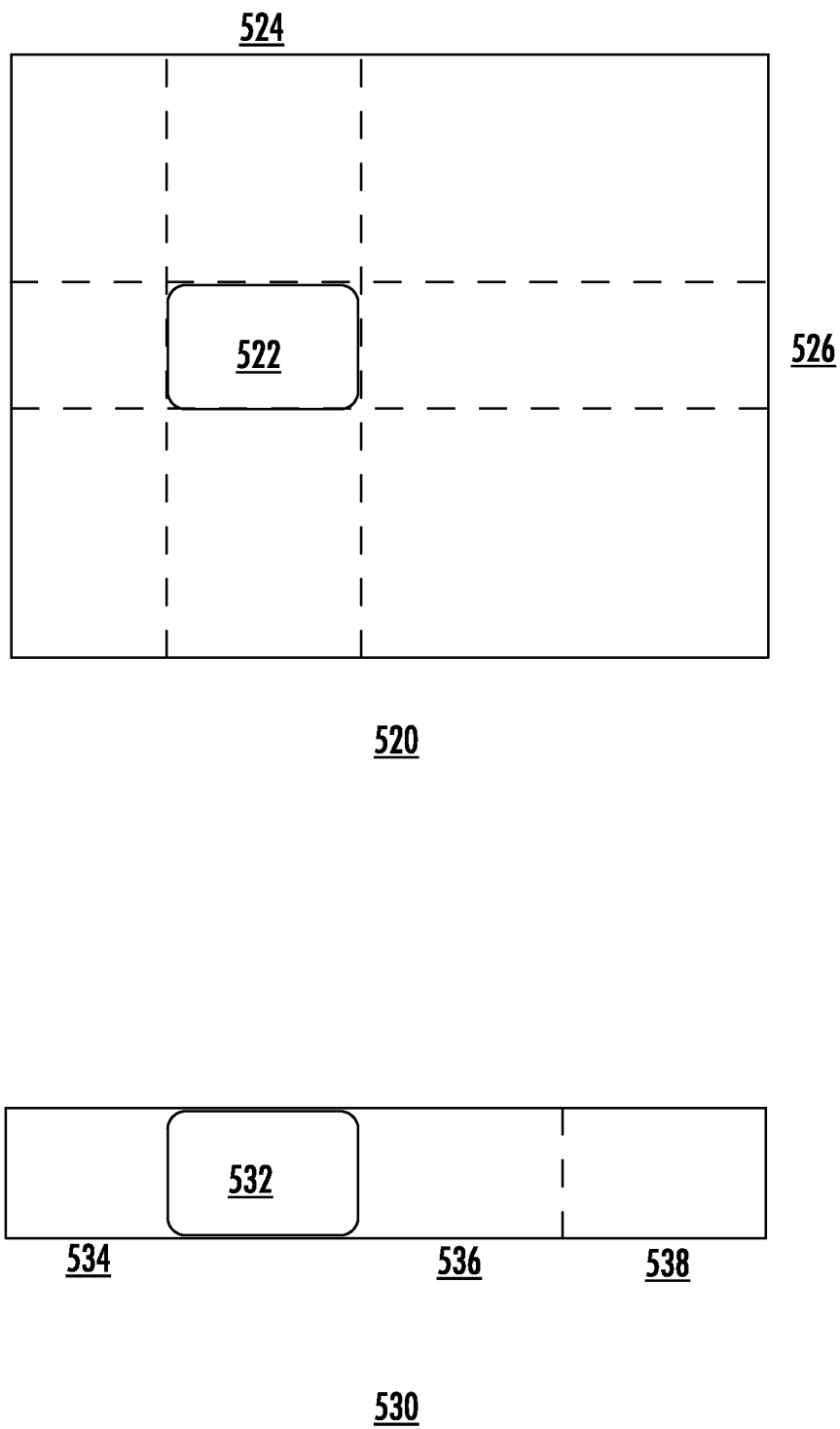
FIG. 5B depicts an illustration of an example cropping system according to example embodiments of the present disclosure.

FIG. 5B depicts an illustration of an example cropping system according to example embodiments of the present disclosure. In particular, FIG. 5B can depict two example cropping systems. The multi-directional cropping system 520 can move the playback window 522 along a three-hundred and sixty degree horizontal direction 526 and a three-hundred and sixty degree vertical direction 526. For example, the depicted portion of the environment can change based on user inputs that change a view direction. The change in view direction can include a horizontal change and/or a vertical change. The change can be performed by moving the portion of the video within the playback window 522. In some implementations, the cropping system may include a grid system in addition to and/or instead of a smooth rolling view direction movement. The horizontal view direction cropping system 530 depicted in FIG. 5B can include a first portion provided in a playback window 532 that may be associated with a second cell of the grid. The grid can include a first cell 534 associated with a forward view direction, a second cell associated with a right view direction, a third cell 536 associated with a left view direction, and/or a fourth cell 538 associated with a backward view direction.

Figure 5C:
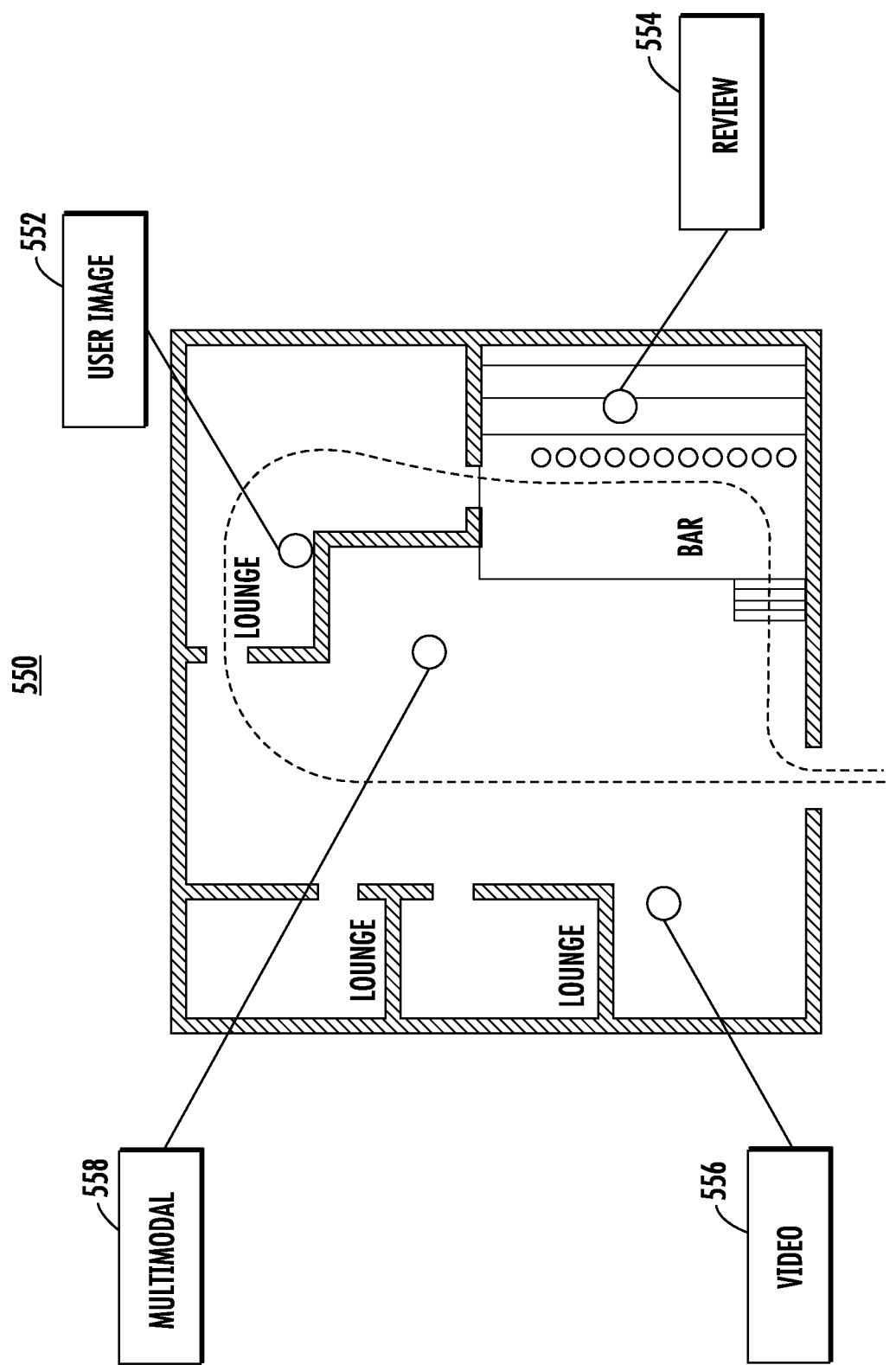
FIG. 5C depicts an illustration of an example user-generated content tagging system according to example embodiments of the present disclosure.

FIG. 5C depicts an illustration of an example user-generated content tagging system 550 according to example embodiments of the present disclosure. The user-generated content tagging system 550 can include anchoring renderings of user-generated content and/or other content within the virtual walkthrough video rendering. The anchoring can be based on spreading out content, anchoring the content to a relevant location within the environment, and/or user-selected anchoring. The content tagged in the virtual walkthrough video can include user image data 552, one or more reviews 554, video data 556, multimodal data 558, and/or other content data. The user image data 552 may be anchored to a location within the lounge based on the user image data 552 depicting the lounge. The one or more reviews 554 may be anchored to the bar based on one or more of the reviews 554 being associated with the bar (e.g., descriptive of a review of the bar). The multimodal data 558 can be anchored to the table where the image and text were generated. The video data 556 may be anchored to a particular location away from the other anchored content to avoid overcrowding. The content can be rendered within the video player window as an augmented-reality asset within the virtual walkthrough.

FIG. 5D depicts an illustration of an example outdoor rendering system according to example embodiments of the present disclosure. The rendering system can include real-time rendering that may include neural radiance field rendering within one or more spheres 562 around a position associated with a position being viewed. The sphere 562 can move with the movement of the virtual tour. The rendering can include rendering a three-dimensional model 564. The three-dimensional model can be rendered for perspective such that the neural radiance field renderings within the sphere 562 may be warped based on predicted depth data. For some environments (e.g., large outdoor environments), the scenes and objects outside of the sphere 562 may be rendered via a different technique (e.g., to conserve computational resources). For example, neural radiance field model rendering can be performed within the sphere 562 and mesh-based image projection (e.g., three-dimensional meshes for the environment can be determined, images of the environment can be segmented, and the segmented images can be projected on the three-dimensional meshes to generate three-dimensional models of the environment) can be performed outside of the sphere 562.

FIG. 5E depicts an illustration of an example red-green-blue and depth map rendering system according to example embodiments of the present disclosure. In some implementations, the neural radiance field model can be utilized to learn depth values and color values for an environment. The learned color representations 572 and the learned depth representations 574 can be utilized to generate view synthesis renderings 570 of the environment. The depth renderings and the rgb renderings can be distorted based on a viewing position to generate a distorted rgb rendering 576 and a distorted depth rendering 578 within the rendering sphere. At 582, the distortion is depicted. At 584, the spheres are depicted from outside of the position-based sphere.

The depth based distortion can be utilized to add dynamic renderings into the virtual environment rendering. For example, the depth values can be utilized to determine lighting changes, shadow changes, when to occlude a new dynamic object, and/or other rendering changes. In some implementations, the view synthesis rendering can be augmented to change the time of day, the weather, and/or the occupancy of the environment. For example, the sky may be segmented based on the depth value and/or based on other learned data for the environment. The sky can then be replaced with a different sky associated with image data descriptive of the desired time of day and/or weather. The lighting can then be adjusted to match the change in background, which can include adjusting color rendering tones, adding shadows, removing shadows, and/or augmenting the size and/or direction of the shadows. In some implementations, the learned depth representations 574 can be utilized to render an object within the environment rendering. The depth predictions can be utilized to determine which portions of the environment the object is to interact with and to determine shadows and/or other features for the added object.

Figure 5F:
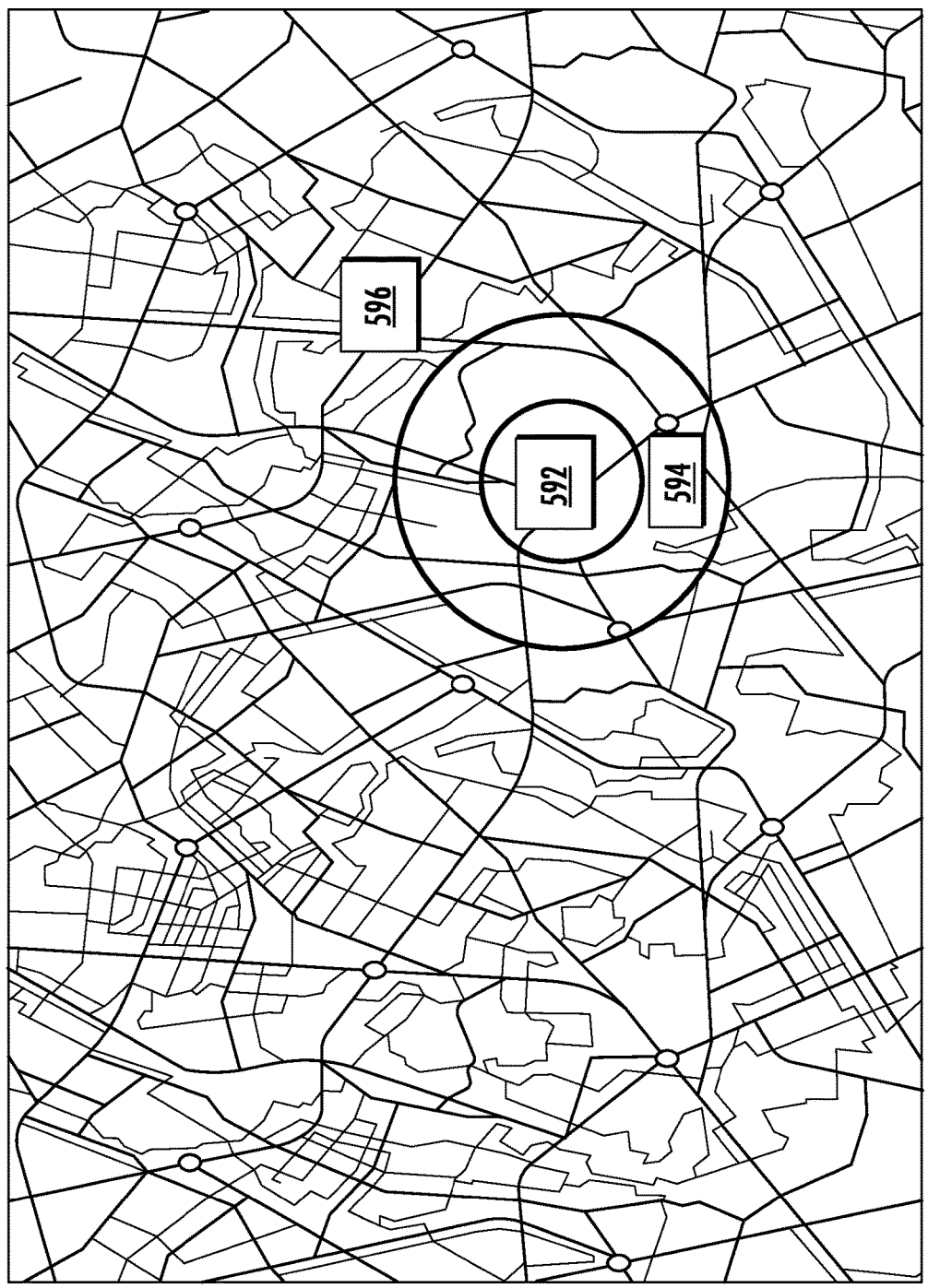
FIG. 5F depicts an illustration of an example rendering sphere system according to example embodiments of the present disclosure.

FIG. 5F depicts an illustration of an example rendering sphere system 590 according to example embodiments of the present disclosure. The rendering sphere system 590 can include neural radiance field model rendering within a first distance 592 and a second distance 594 around the user. The other portions of the environment 596 within view of the position but outside of the second distance 594 can be rendered via image projection. The neural radiance field model renderings within the second distance 594 but outside of the first distance 592 may be blended with the image projection rendering to provide a smooth transition between the two rendering types.

Figure 6A:
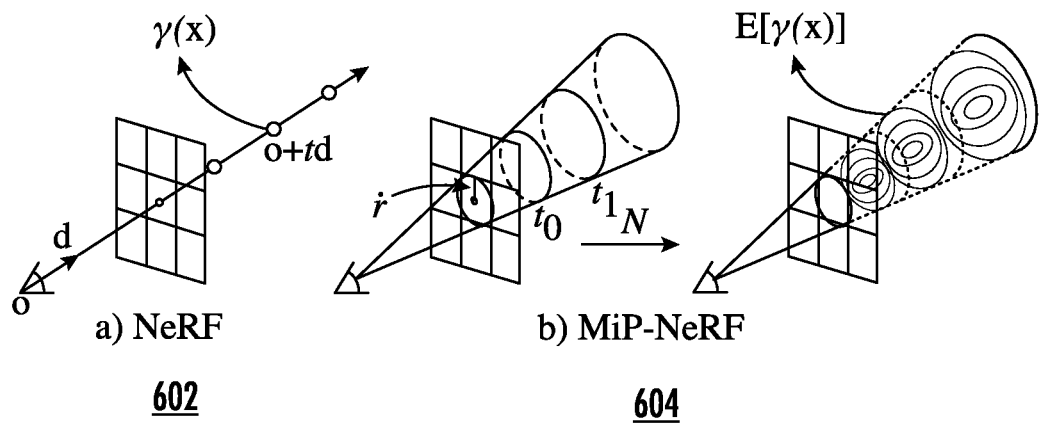
FIG. 6A depicts an illustration of example conical frustum projections for neural radiance field model rendering according to example embodiments of the present disclosure.

FIG. 6A depicts an illustration of example three-dimensional conical frustum projection for camera pixel prediction. In particular, FIG. 6A can depict an example camera center projection 602 through a pixel for feature prediction and can depict a three-dimensional conical frustum projection 604 for a camera pixel for feature prediction. The NeRF prediction system (a) depicted in FIG. 6A can sample points x along rays that are traced from the camera center of projection 602 through each pixel, then encodes those points with a positional encoding (PE) $\gamma$ to produce a feature $\gamma(x)$. The Mip-NeRF prediction system (b) depicted in FIG. 6A can instead reason about the 3D conical frustum defined by a camera pixel. The conical frustums can then be featurized with the integrated positional encoding (IPE), which works by approximating the frustum with a multivariate Gaussian and then computing the (closed form) integral $E[\gamma(x)]$ over the positional encodings of the coordinates within the Gaussian.

In some implementations, the rendering procedure used by neural radiance fields (NeRF) can sample a scene with a single ray per pixel and may generate renderings that may be blurred or aliased when training or testing images observing scene content at different resolutions. Supersampling by rendering with multiple rays per pixel may be utilized. However, the supersampling may be impractical for NeRF, because rendering each ray may rely on querying a multilayer perceptron hundreds of times. In some implementations, a mip-NeRF model (e.g., a mip-NeRF system as disclosed in Barron et al., "Mip-NeRF: A Multiscale Representation for Anti-Aliasing Neural Radiance Fields," ARXIV (Aug. 14, 2021), https://arxiv.org/pdf/2103.13415.pdf.) can be utilized. Mip-NeRF can include extending a NeRF to represent the scene at a continuously-valued scale. By efficiently rendering anti-aliased conical frustums instead of rays, mip-NeRF can reduce objectionable aliasing artifacts and can improve NeRF's ability to represent fine details, while being faster than some traditional NeRF models and may be half the size.

For example, the systems and methods disclosed herein can leverage a mipmap for representing the prefiltered radiance field for a continuous space of scales. In some implementations, the input to a mip-NeRF model can be a 3D Gaussian that represents the region over which the radiance field should be integrated. The trained model can then render a prefiltered pixel by querying mip-NeRF at intervals along a cone, using Gaussians that approximate the conical frustums corresponding to the pixel. To encode a 3D position and the surrounding Gaussian region, a feature representation (e.g., an integrated positional encoding (IPE)) can be implemented and may be a generalization of a NeRF positional encoding (PE) that allows a region of space to be compactly featurized, as opposed to a single point in space.

The neural radiance field models disclosed herein can address a potential sampling and aliasing issue of traditional neural radiance field models by casting a cone from each pixel. Instead of performing point-sampling along each ray, the neural radiance field model may divide the cone being cast into a series of conical frustums (e.g., cones cut perpendicular to their axis). Additionally and/or alternatively, the neural radiance field model may generate an integrated positional encoding of the volume covered by each conical frustum. The adjustment in encoding can allow the multilayer perceptrons (MLP) to determine the size and shape of each conical frustum, instead of just a centroid.

Figure 6B:
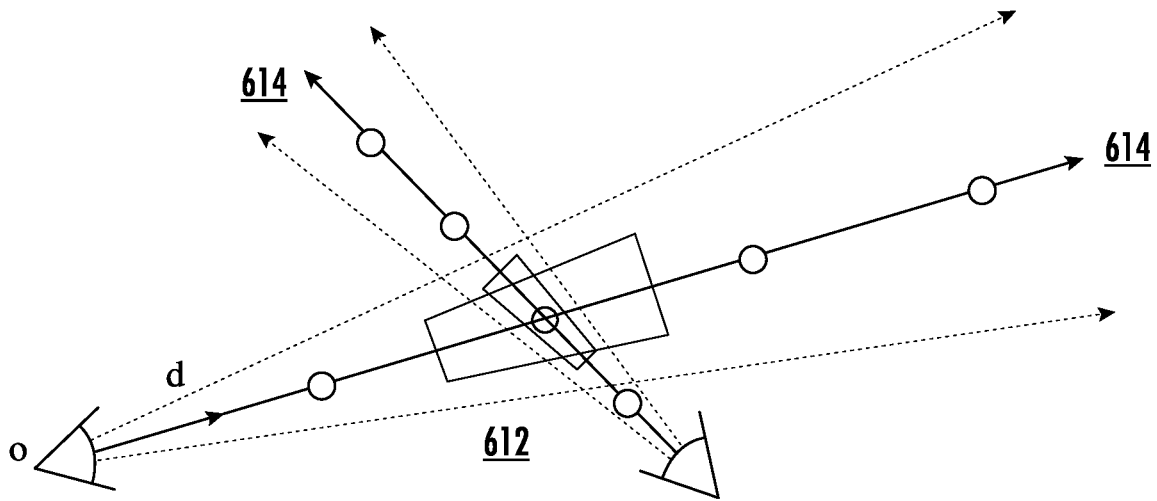
FIG. 6B depicts an illustration of example projections for neural radiance field model pixel predictions according to example embodiments of the present disclosure.

FIG. 6B depicts an illustration of example set of conical frustums 612 projected over centroid projections 614 for two example rays. In particular, neural radiance field models can extract point-sampled positional encoding features (shown in FIG. 6B as dots) along each pixel's ray. The point-sampled features may not include information associated with the shape and size of the volume viewed by each ray, which can cause two different cameras imaging the same position at different scales to produce the same ambiguous point-sampled feature, which can degrade NeRF's performance. The neural radiance field models disclosed herein may include conical frustum 612 projections (e.g., as implemented by Mip-NeRF) to cast cones instead of rays and may explicitly model the volume of each sampled conical frustum 612 (shown in FIG. 6B as trapezoids), which can mitigate the ambiguity.

In some implementations, the neural radiance field models disclosed herein may leverage non-linear scene parametrization, online distillation, and/or a distortion-based regularizer for unbounded scenes and/or to generate three-hundred and sixty degree scene renderings. The neural radiance field models may leverage a space-warping procedure to shrink distant points towards the origin. Additionally, and/or alternatively, the systems and methods may apply smooth parameterization to volumes and/or points. In some implementations, the neural radiance field models disclosed herein can include two types of multilayer perceptrons (MLP). The first multilayer perceptron type (e.g., a proposal MLP) can predict volumetric density and may not predict color. The predicted densities can be processed to resample new intervals that are provided to the second multilayer perceptron type (e.g., a NeRF MLP) to render an image. The weights produced by the first multilayer perceptron type (e.g., a proposal MLP) may not be supervised using the input image but may instead be supervised with the histogram weights generated by the second multilayer perceptron type (e.g., a NeRF MLP). The adjusted supervision pipeline and dual MLP system can allow the system to use a large second multilayer perceptron type (e.g., a NeRF MLP) that is evaluated relatively few times, alongside a small first multilayer perceptron type (e.g., a proposal MLP) that is evaluated many more times, which increase the model's total capacity and/or improve rendering quality while providing minimal to no changes in training time. The systems and methods may include one or more regularizers to suppress, reduce, and/or mitigate floaters (e.g., rendering non-existent features) in renderings.

Figure 6C:
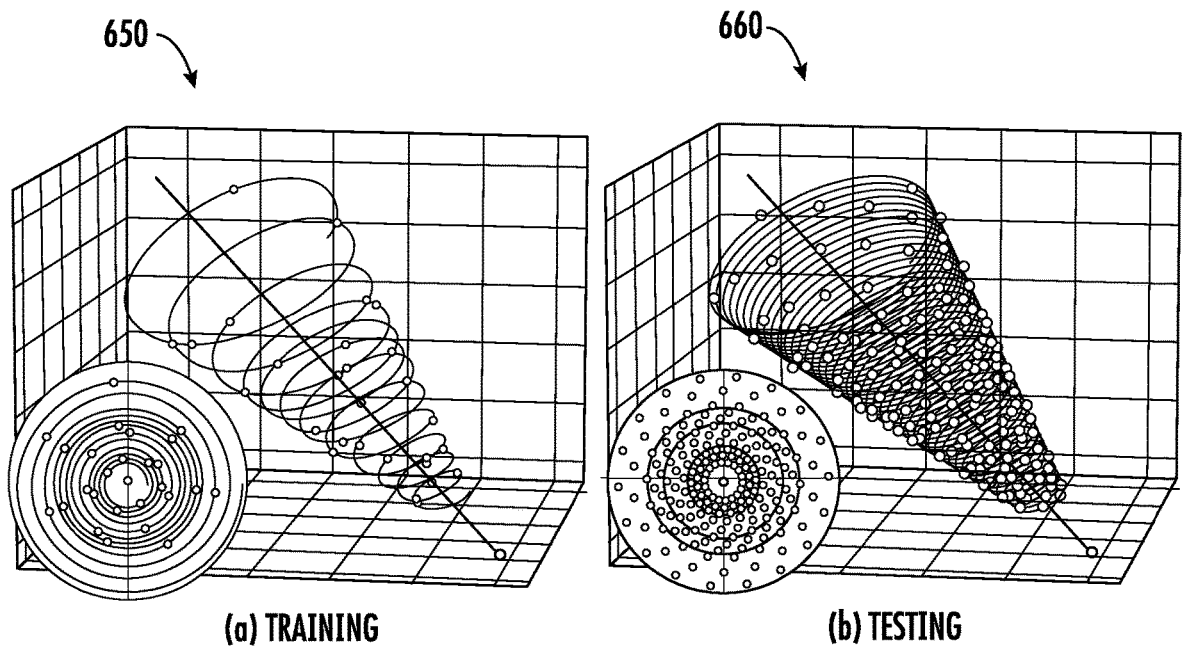
FIG. 6C depicts an illustration of example three-dimensional rays divided into frustums according to example embodiments of the present disclosure.

FIG. 6C depicts an illustration of example three-dimensional rays divided into frustums denoted by color according to example embodiments of the present disclosure. For instance, the three-dimensional rays of FIG. 6C may represent sampling directions. The examples of FIG. 6C depict the rays having exaggerated pixel width for the purposes of illustration. Each frustum may be multi-sampled by placing points (e.g., n points) along a spiral with a number of loops (e.g., m loops) such that the sample mean and covariance matches the frustum's true mean and covariance. Ray 650 depicts an example ray that may be used in training, which may have a smaller, randomized set of multi-samples for each frustum. Ray 660, alternatively, depicts an example ray that may be used at inference or testing, with a larger, deterministic set of multi-samples.

In particular, FIG. 6C depicts a toy 3D ray with an exaggerated pixel width (viewed along the ray as an inset) divided into 4 frustums. The systems and methods may multi-sample each frustum with a hexagonal pattern that matches the frustum's first and second moments. Each pattern can be rotated around the ray and flipped along the ray (a) randomly when training 650 and (b) deterministically when rendering 660.

Figure 6D:
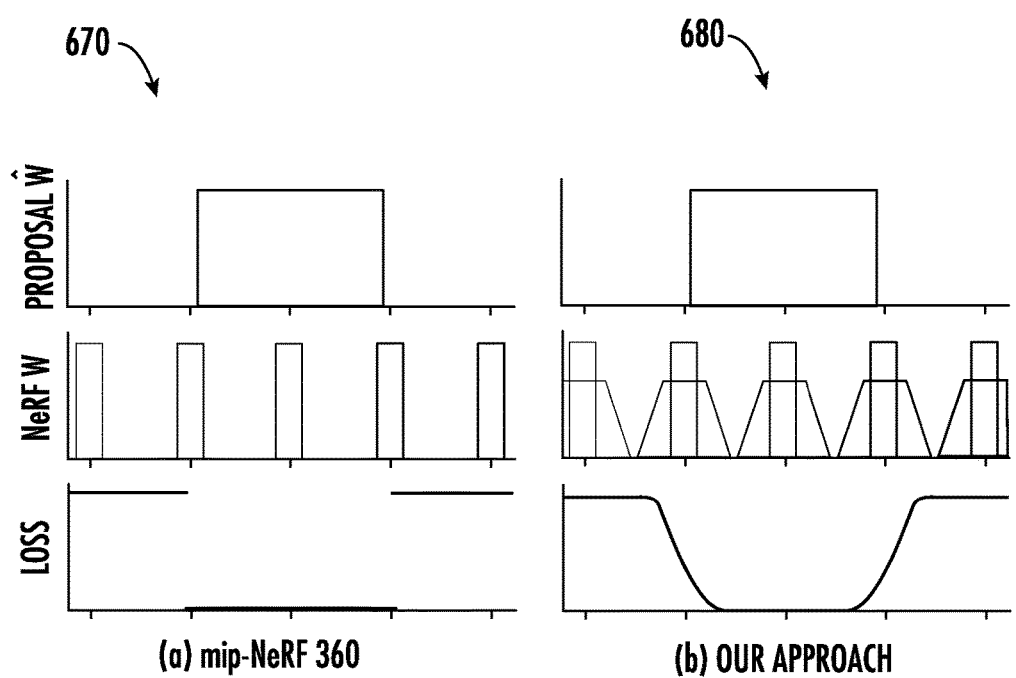
FIG. 6D depicts an illustration of an example supervision loss system according to example embodiments of the present disclosure.

FIG. 6D depicts an illustration of an example supervision loss system for a setting where a narrow NeRF histogram, in the middle plot, translates along a ray relative to a coarse proposal histogram, in the top plot, and the resulting loss in the bottom plot. As illustrated in plot 670, which corresponds to a model that utilizes a loss that is piecewise constant. The piecewise constant loss can contribute to aliasing in model outputs. However, as illustrated in plot 680, which can correspond to a prefiltered smooth loss created by blurring NeRF histograms into piecewise linear splines, the loss is continuous over all translations. The continuous loss can reduce aliasing in final model outputs.

In particular, FIG. 6D depicts a visualization of supervision for a toy setting where a narrow NeRF histogram (middle rectangles) translates along a ray relative to a coarse proposal histogram (top rectangles). (a) The loss used by mip-NeRF360 (Barron et al., "Mip-NeRF 360: Unbounded Anti-Aliased Neural Radiance Fields," ARXIV (Mar. 25, 2022), https://arxiv.org/pdf/2111.12077.pdf.) can be a piecewise constant 670, and the (b) adjusted loss can be smooth 680, because the system may blur NeRF histograms into piecewise linear splines (trapezoids). The prefiltered loss can be leveraged to learn anti-aliased distributions.

The neural radiance field models disclosed herein can include architecture, training pipelines, pre-processing, and/or post-processing of mip-NeRF models (e.g., the mip-NeRF model in Barron et al., "Mip-NeRF: A Multiscale Representation for Anti-Aliasing Neural Radiance Fields," ARXIV (Aug. 14, 2021), https://arxiv.org/pdf/2103.13415.pdf.), mip-NeRF 360 models (e.g., the mip-NeRF 360 model in Barron et al., "Mip-NeRF 360: Unbounded Anti-Aliased Neural Radiance Fields," ARXIV (Mar. 25, 2022), https://arxiv.org/pdf/2111.12077.pdf.), zip-NeRF models (e.g., the zip-NeRF model in Barron et al., "Zip-NeRF: Anti-Aliased Grid-Based Neural Radiance Fields," ARXIV (Oct. 26, 2023), https://arxiv.org/abs/2304.06706.), and/or other models.

Figure 7:
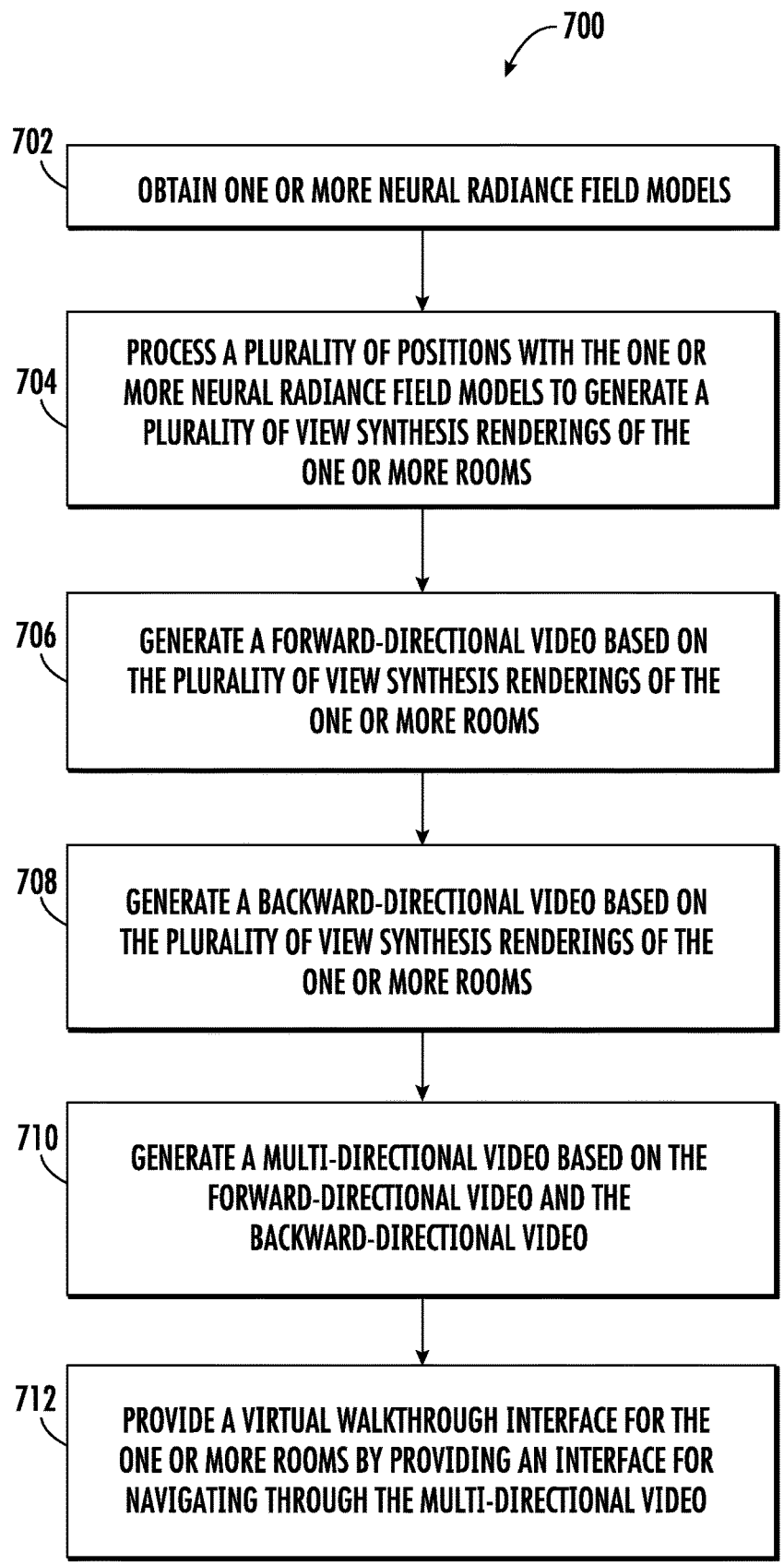
FIG. 7 depicts a flow chart diagram of an example method to perform multi-directional video generation according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain one or more neural radiance field models. The one or more neural radiance field models may have been trained to generate view renderings of one or more rooms. The one or more neural radiance field models may have been pre-trained on a plurality of training images and/or lidar data associated with the one or more rooms. The one or more neural radiance field models may be obtained from a database that stores a plurality of neural radiance field models associated with a plurality of different locations. The one or more rooms can be associated with one or more commercial businesses, one or more user environments, one or more public spaces, and/or other rooms.

At 704, the computing system can process a plurality of positions with the one or more neural radiance field models to generate a plurality of view synthesis renderings of the one or more rooms. The plurality of positions can be associated with a plurality of locations within the one or more rooms. The plurality of view synthesis renderings can be descriptive of the one or more views of the one or more rooms from the plurality of positions. The plurality of view synthesis renderings can include a plurality of panoramic view synthesis renderings. Alternatively and/or additionally, the plurality of view synthesis renderings can be generated to be descriptive of one or more view directions at a respective position.

In some implementations, the computing system can determine a walkthrough path based on processing a plurality of images of the one or more rooms and determine the plurality of positions based on the walkthrough path. Determining the walkthrough path based on processing the plurality of images of the one or more rooms can include processing the plurality of images to determine a plurality of room landmarks associated with features of interest in the one or more rooms and generating the walkthrough path based on the plurality of room landmarks. For example, the walkthrough path can be determined by determining a route that displays the plurality of room landmarks in a natural and seamless manner. The walkthrough path may be determined based on walkthrough traffic in the one or more rooms and/or based on determined pathways in the one or more rooms. Determining the plurality of positions based on the walkthrough path can include determining a plurality of points on the walkthrough path. The plurality of points can include varying spacing based on regions of interest within the one or more rooms. For example, the spacing between points near regions of interest can be smaller than the spacing between points in areas away from regions of interest (e.g., a hallway). In some implementations, the spacing between points can be equal and uniform.

At 706, the computing system can generate a forward-directional video based on the plurality of view synthesis renderings of the one or more rooms. The forward-directional video can be descriptive of a first sequence of views associated with traveling in a first direction through the one or more rooms.

At 708, the computing system can generate a backward-directional video based on the plurality of view synthesis renderings of the one or more rooms. The backward-directional video can be descriptive of a second sequence of views associated with traveling in a second direction through the one or more rooms. The second direction can be opposite of the first direction. The forward-directional video can include a first plurality of frames descriptive of the plurality of view synthesis renderings in a first sequence, and the backward-directional video can include a second plurality of frames descriptive of the plurality of view synthesis renderings in a second sequence, which includes the plurality of view synthesis renderings in an opposite order to the first sequence.

At 710, the computing system can generate a multi-directional video based on the forward-directional video and the backward-directional video. The multi-directional video can be descriptive of the first sequence of views and the second sequence of views. In some implementations, the multi-directional video can include a three-hundred and sixty degree video of the environment from a plurality of positions within the one or more rooms.

In some implementations, generating the multi-directional video based on the forward-directional video and the backward-directional video can include determining a plurality of frame associations between the forward-directional video and the backward-directional video. Each of the plurality of frame associations can be descriptive of corresponding frames associated with a same position in the one or more rooms. Generating the multi-directional video based on the forward-directional video and the backward-directional video can include generating multi-directional metadata based on the plurality of frame associations. The multi-directional metadata can be descriptive of the corresponding frames. In some implementations, the multi-directional metadata can be configured to provide instructions for the virtual walkthrough interface to navigate to different portions of the multi-directional video based on a walkthrough direction and the plurality of frame associations. The computing system can generate the multi-directional video by stitching the forward-directional video and the backward-directional video and embedding the multi-directional metadata.

At 712, the computing system can provide a virtual walkthrough interface for the one or more rooms by providing an interface for navigating through the multi-directional video. Navigating through the multi-directional video can include scrubbing through the multi-directional video. The one or more rooms can be associated with a restaurant. In some implementations, the video virtual walkthrough interface can be provided in a knowledge panel for the restaurant in a search results interface. The virtual walkthrough interface can include one or more joystick user interface elements that can be utilized to control the direction of the virtual walkthrough, the view direction, the zoom, and/or the speed.

Figure 8:
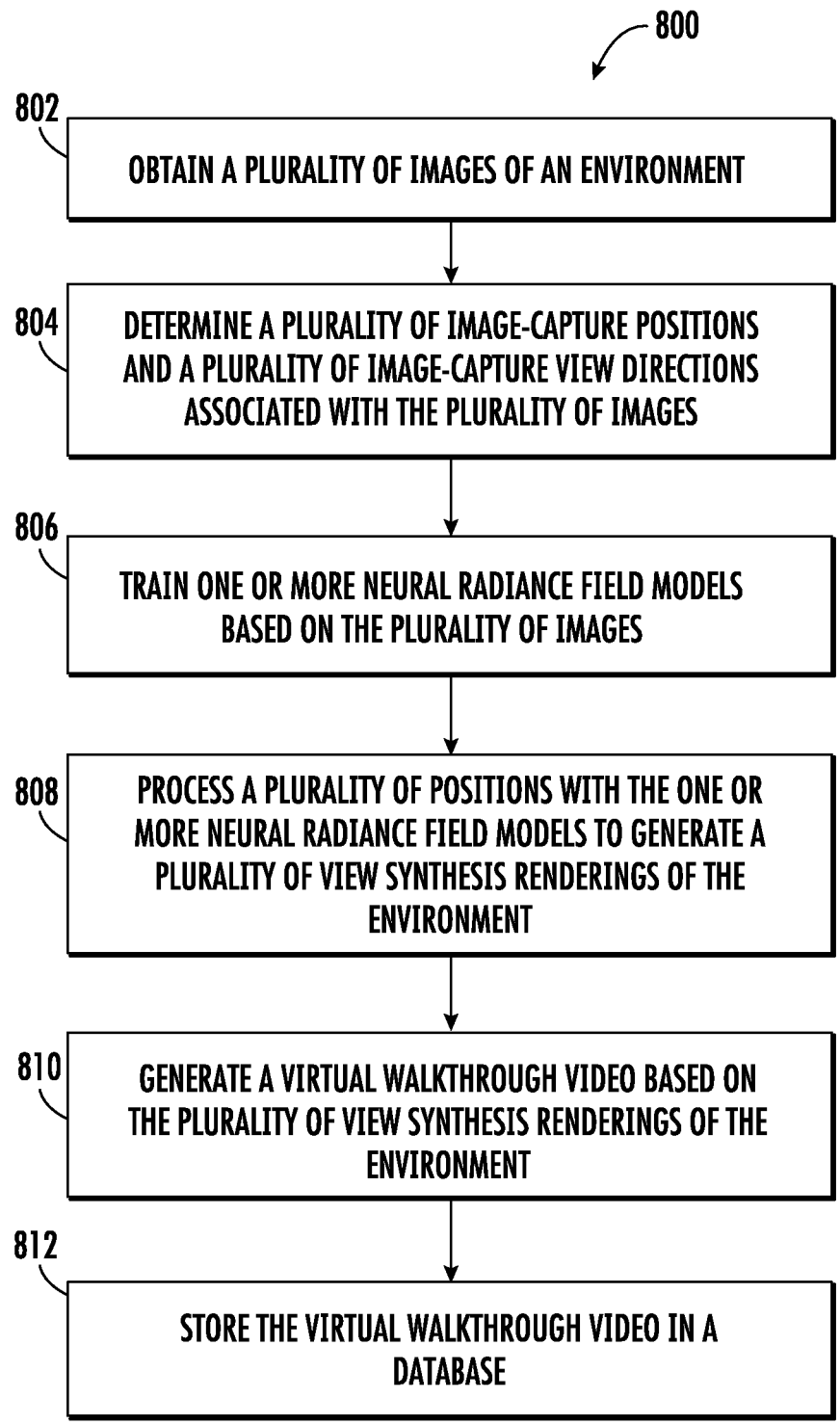
FIG. 8 depicts a flow chart diagram of an example method to perform multi-view video generation according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a plurality of images of an environment. The plurality of images can be captured with one or more cameras from a plurality of different positions within the environment. The plurality of images can depict different objects and/or scenes within the environment.

At 804, the computing system can determine a plurality of image-capture positions and a plurality of image-capture view directions associated with the plurality of images. The plurality of image-capture positions and the plurality of image-capture view directions can be determined based on feature recognition, feature mapping, object size comparisons, and/or other techniques. In some implementations, the plurality of image-capture positions and the plurality of image-capture view directions can be determined based on image metadata and/or other sensor data (e.g., inertial measuring units, lidar sensors, GPS sensors, infrared sensors, and/or proximity sensors).

At 806, the computing system can train one or more neural radiance field models based on the plurality of images, the plurality of image-capture positions, and the plurality of image-capture view directions. The one or more neural radiance field models can be trained to generate view renderings of the environment. In some implementations, the plurality of images may be utilized to train one or more additional machine-learned models to learn a three-dimensional representation of the environment.

At 808, the computing system can process a plurality of positions with the one or more neural radiance field models to generate a plurality of view synthesis renderings of the environment. The plurality of positions can be associated with a plurality of locations within the environment. In some implementations, the plurality of view synthesis renderings can be descriptive of the environment from the plurality of positions. The plurality of view synthesis renderings can include a plurality of three-hundred and sixty degree view renderings. The plurality of positions can be associated with a path that traverses through the environment. The plurality of view synthesis renderings can be descriptive of a plurality of directional renderings stitched together to generate panoramic image renderings.

At 810, the computing system can generate a virtual walkthrough video based on the plurality of view synthesis renderings of the environment. The virtual walkthrough video can be descriptive of a sequence of views of the environment. In some implementations, the virtual walkthrough video can be descriptive of a sequence of views of the environment rendered in a forward progressing sequence and a backwards progressing sequence. The plurality of three-hundred and sixty degree view renderings can be generated by generating a plurality of direction-based view renderings for a position and stitching the plurality of direction-based view renderings together to generate a panoramic image. The virtual walkthrough video can include a three-hundred and sixty degree view video. For example, the virtual walkthrough video can include a plurality of panoramic frames.

At 812, the computing system can store the virtual walkthrough video in a database. The virtual walkthrough video can include a three-hundred and sixty degree view video. In some implementations, the virtual walkthrough video can be formatted to be selectively cropped by a video player (and/or a virtual walkthrough interface) to provide one or more video directions for display during playback.

Figure 9:
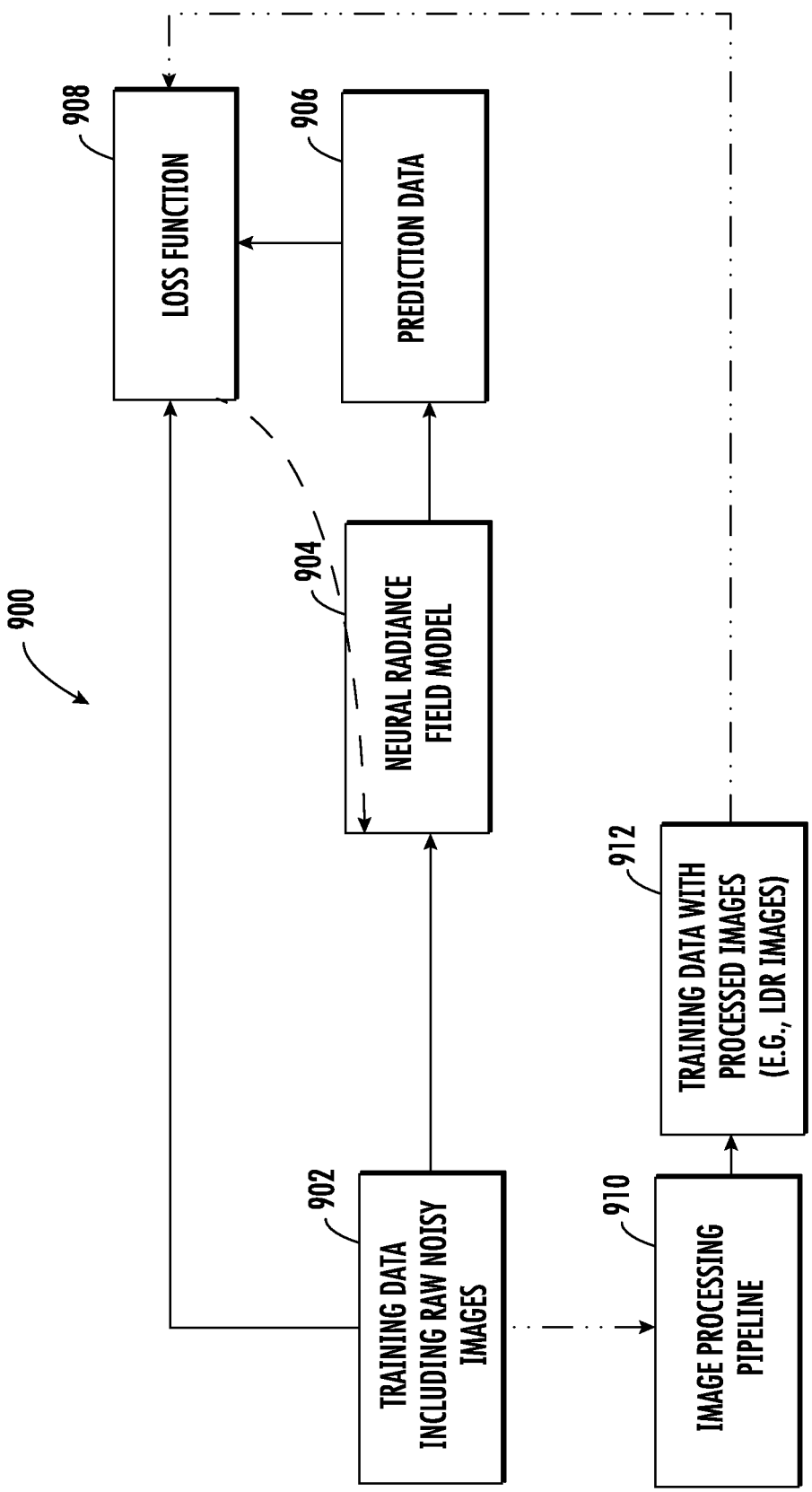
FIG. 9 depicts a block diagram of an example neural radiance field model training system according to example embodiments of the present disclosure.

FIG. 9 depicts a block diagram of an example neural radiance field model 900 according to example embodiments of the present disclosure. In particular, training data 902 can include a plurality of raw noisy images, a plurality of two-dimensional view directions, and a plurality of three-dimensional positions. A two-dimensional view direction and a three-dimensional position can be processed with the neural radiance field model 904 to generate prediction data 906. The prediction data 906 can include one or more predicted density values and/or one or more predicted color values. The prediction data 906 can then be compared against ground truth data to evaluate a loss function 908.

For a low dynamic range (LDR) pipeline, the ground truth data can include processed image data. For example, a raw noisy image associated with the view direction and the position can be processed with an image processing pipeline 910 to generate training data with processed images 912. The prediction data 906 and the processed image can be utilized to evaluate a loss function 908. A gradient descent can then be backpropagated to the neural radiance field model 904 to adjust one or more parameters of the neural radiance field model 904.

Alternatively and/or additionally, for a high dynamic range (HDR) pipeline, the ground truth data can include a raw noisy image. For example, the prediction data 906 and a raw (unprocessed) noisy image can be utilized to evaluate the loss function 908 to generate a gradient descent, which can be backpropagated to the neural radiance field model 904 to adjust one or more parameters of the neural radiance field model 904.

Both the LDR pipeline and the HDR pipeline can include generating prediction data 906, which can be utilized to evaluate a loss function 908. However, the ground truth data and/or the loss function 908 can differ. In particular, the LDR pipeline can include processed image data as the ground truth, which can cause the neural radiance field model 904 to learn to output low dynamic range data. Alternatively and/or additionally, the HDR pipeline can include unprocessed image data as the ground truth, which can cause the neural radiance field model 304 to learn to output high dynamic range data.

Figure 10:
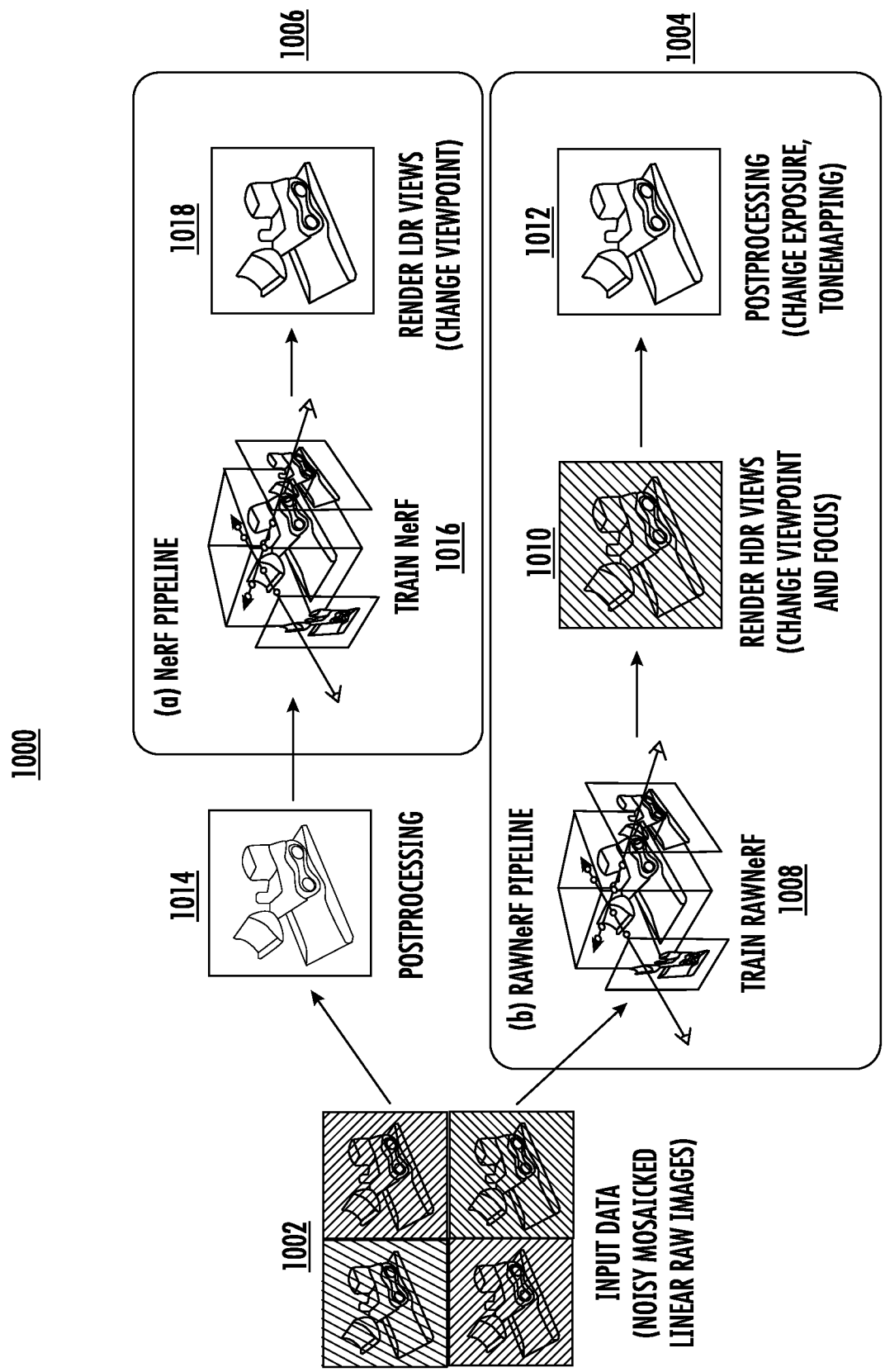
FIG. 10 depicts an illustration of an example view rendering pipeline according to example embodiments of the present disclosure.

FIG. 10 depicts an illustration of an example view rendering pipeline 1000 according to example embodiments of the present disclosure. For a low dynamic range neural radiance field model pipeline 1006, input data 1002 (e.g., noisy mosaicked linear raw images (e.g., RGGB bayer filter image datasets)) can be processed 1014 to demosaic the images and perform color and/or exposure correction. The resulting processed image data can then be utilized to train a neural radiance field model 1016. The trained model can then be utilized to render low dynamic range views 1018 of the environment that the neural radiance field model was trained on.

For a high dynamic range neural radiance field model pipeline 1004, the input data 1002 can be utilized to directly train the raw neural radiance field model 1008. The trained model can be trained to render high dynamic range views 1010 of the environment that the raw neural radiance field model is trained on. The rendered high dynamic range views 1010 can then be post processed 1012 to change the exposure and tone-mapping of the view rendering to generate a refined view rendering.

Figure 11:
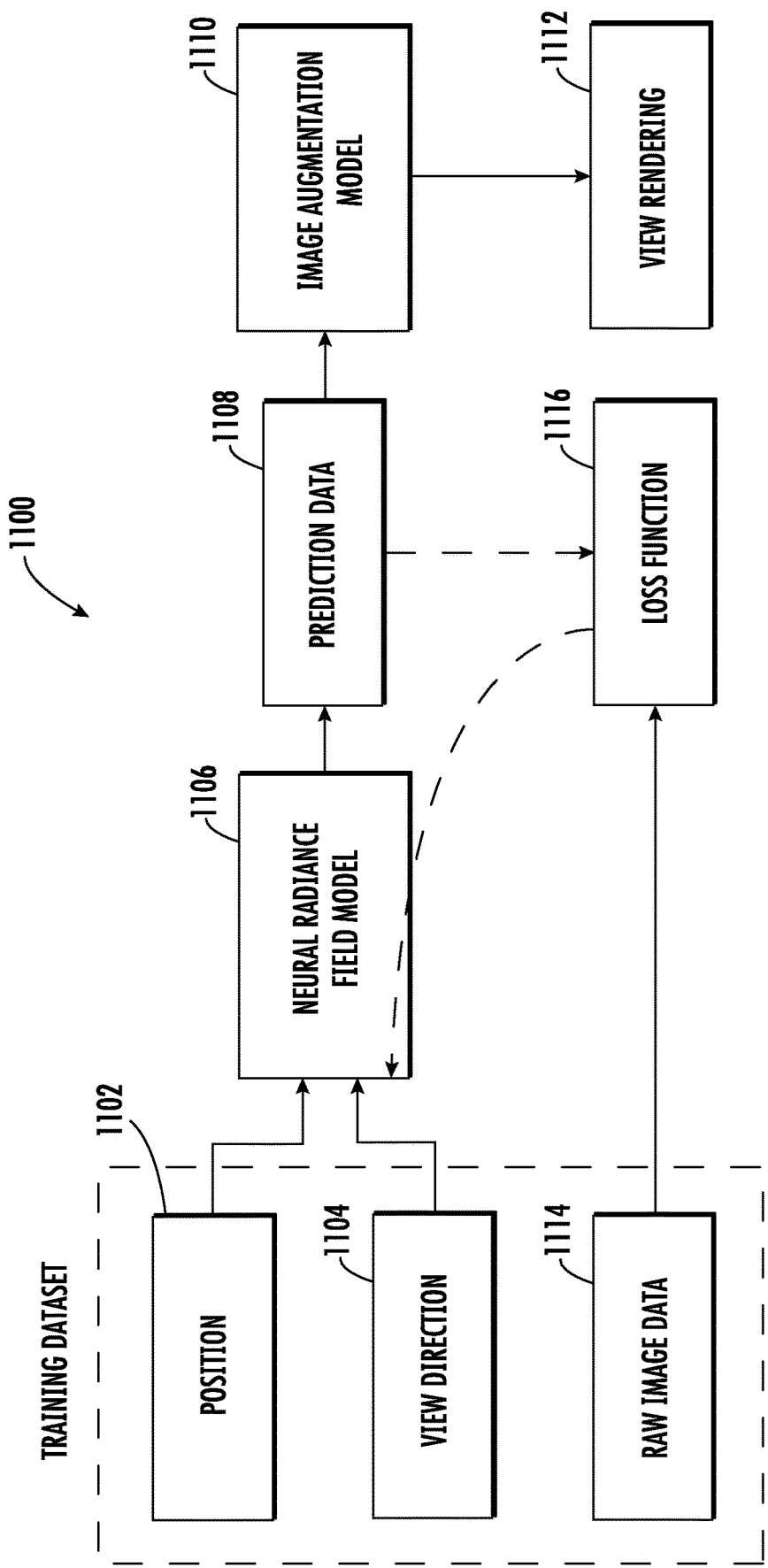
FIG. 11 depicts a block diagram of an example neural radiance field model training system according to example embodiments of the present disclosure.

FIG. 11 depicts a block diagram of an example neural radiance field model training 1100 according to example embodiments of the present disclosure. The neural radiance field model training 1100 can include obtaining a training dataset. The training dataset can include one or more positions 1102, one or more view directions, and/or one or more raw image datasets 1114. For training, a three-dimensional position 1102 and a two-dimensional view direction 1104 can be processed with the neural radiance field model 1106 to generate prediction data 1108. The prediction data 1108 can include one or more predicted color values and/or one or more predicted density values. The prediction data 1108 and a raw image dataset 1114 from the training dataset can be utilized to evaluate a loss function 1116. The loss function 1116 can then be utilized to adjust one or more parameters of the neural radiance field model 1106.

Once the neural radiance field model 1106 has been trained, a novel position and view direction set can be processed with the neural radiance field model 1106 to generate prediction data 1108, which can then be processed with an image augmentation model 1110 to generate a novel view rendering 1112. The novel view rendering 1112 can be associated with processed image data.

Figure 12:
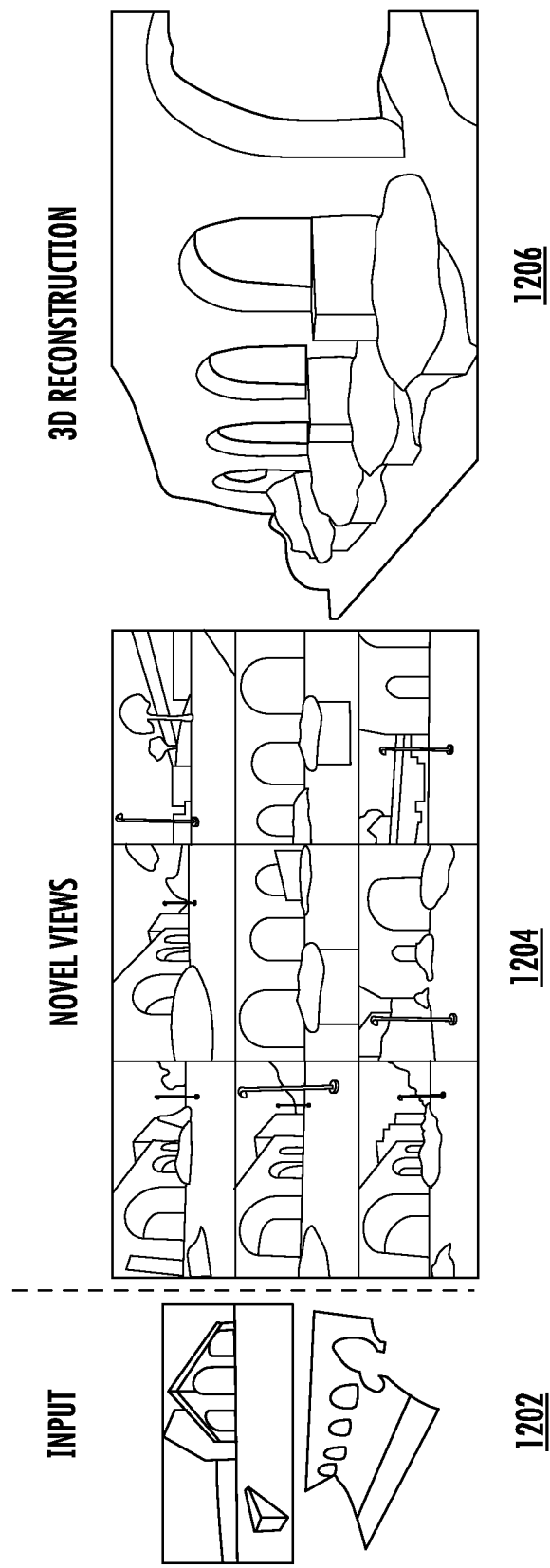
FIG. 12 depicts an illustration of example inputs and outputs for outdoor rendering according to example embodiments of the present disclosure.

FIG. 12 depicts a given set of panoramas and lidar observations 1202, which can be used as input for training a view synthesis model to model an urban setting. The view synthesis model utilizes the training data 1202 to estimate a neural representation that can be used for novel view synthesis 1204 and accurate three-dimensional reconstruction 1206.

For example, FIG. 12 can depict example inputs and outputs 1200 for a view synthesis model. In some implementations, the inputs 1202 for training can be obtained using sensors attached to a vehicle or sensors being carried by an individual walking a sidewalk or street. Alternatively and/or additionally, the inputs 1202 can be obtained from a database that include a plurality of panoramic images and lidar data for a particular area.

The inputs 1202 can be utilized to evaluate generated outputs of the view synthesis model during training. For example, the depth data can be utilized to evaluate one or more lidar loss terms, while the plurality of images can be utilized to evaluate one or more photometric-based loss terms. The machine-learned view synthesis model can then generate novel view synthesis outputs 1204 and/or three-dimensional reconstruction outputs 1206 based on the learned representation.

Figure 13:
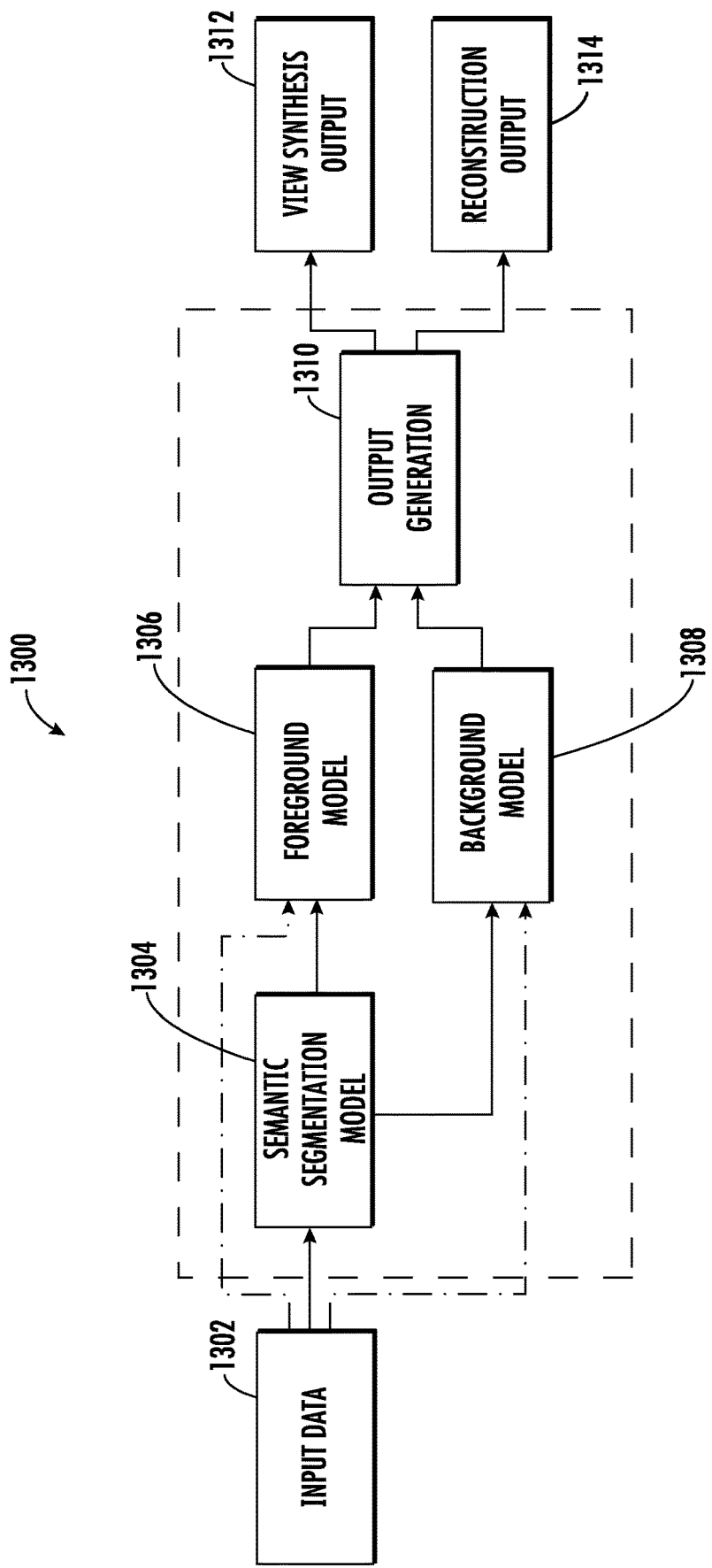
FIG. 13 depicts a block diagram of an example view synthesis model according to example embodiments of the present disclosure.

FIG. 13 depicts a block diagram of an example view synthesis model 1300 according to example embodiments of the present disclosure. In some implementations, the view synthesis model 1300 is trained to receive a set of input data 1302 descriptive of an input position and/or a view direction and, as a result of receipt of the input data 1302, provide output data 1312 or 1314 that can include a view synthesis output 1312 (e.g., a novel view synthesis) or reconstruction output 1314 (e.g., a three-dimensional reconstruction). Thus, in some implementations, the view synthesis model 1300 can include a foreground model 1306 that is operable to model and/or render the foreground of an environment and a background model 1308 that is operable to model and/or render the background of an environment.

In some implementations, the view synthesis model 1300 can include, or work in series with, a pre-trained semantic segmentation model 1304. For example, during the training of the view synthesis model 1300, the semantic segmentation model 1304 can perform two functions. First, the semantic segmentation model 1304 can process the training images to remove unwanted occlusions (e.g., moving objects such as walking humans, flying birds, and/or driving cars). Second, the semantic segmentation model 1304 can find the pixels that correspond to the sky or another undetermined distance feature. The pixels that correspond to the sky or other undetermined distance feature can be modeled with a separate network than the remainder of the scene being rendered.

The systems and methods can obtain input data 1302 (e.g., a three-dimensional position and a two-dimensional view direction) to be input into the view synthesis model 1300. In some implementations, the input data 1302 can be processed by the semantic segmentation model 1304 to determine which portions of the view synthesis or three-dimensional reconstruction will be performed by which model. For example, the semantic segmentation model 1304 can output segmentation outputs to be provided to the foreground model 1306 and the background model 1308 to instruct the models which portions of the rendering each model will be rendering. Alternatively and/or additionally, the input data 1302 may be directly processed by the foreground model 1306 and the background model 1308.

The foreground model 1306 can generate a foreground output descriptive of predicted color values and predicted density values for the pixels corresponding to determined depths. Additionally and/or alternatively, the background model 1308 can generate a background output descriptive of predicted color values and predicted density values for the pixels corresponding to the sky or other undetermined depths. The foreground output and the background output can be concatenated to generate a model output. Alternatively and/or additionally, the foreground output and the background output can be processed with an output generation block 1310 to generate a view synthesis output 1312 and/or a reconstruction output 1314.

Figure 14:
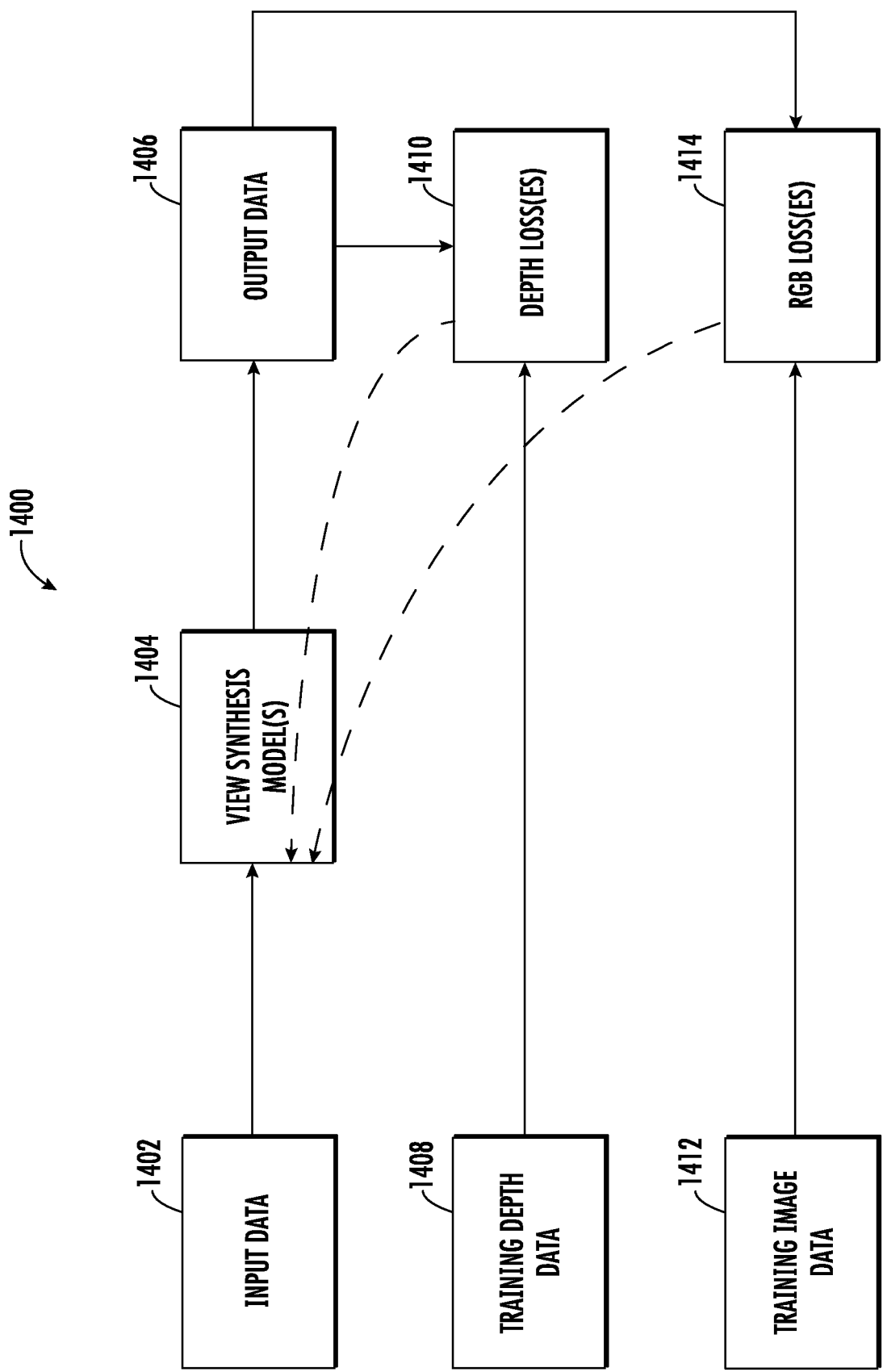
FIG. 14 depicts a block diagram of an example view synthesis model training system according to example embodiments of the present disclosure.

FIG. 14 depicts a block diagram of an example view synthesis model 1404 being trained 1400 according to example embodiments of the present disclosure. The view synthesis model 1404 is similar to the view synthesis model 1300 of FIG. 13 except that the view synthesis model 1400 is being trained based on two or more losses.

The training system 1400 can include obtaining input data 1402 (e.g., a position and/or a view direction). The input data 1402 can be processed by the view synthesis model 1404 to generate output data 1406 (e.g., a view synthesis output or a three-dimensional reconstruction). The output data 1406 can be compared against training depth data 1408 to evaluate one or more depth loss terms 1410. Additionally and/or alternatively, the output data 1406 can be compared against training image data 1412 to evaluate one or more RGB loss terms 1414. In some implementations, a gradient descent for each loss term may be backpropagated to the view synthesis model 1404 in order to adjust one or more parameters of the view synthesis model 1404. Alternatively and/or additionally, the different loss terms can contribute to a gradient descent that is backpropagated to the view synthesis model 1404 to train the model for accurate view synthesis and three-dimensional reconstruction.

Figure 15:
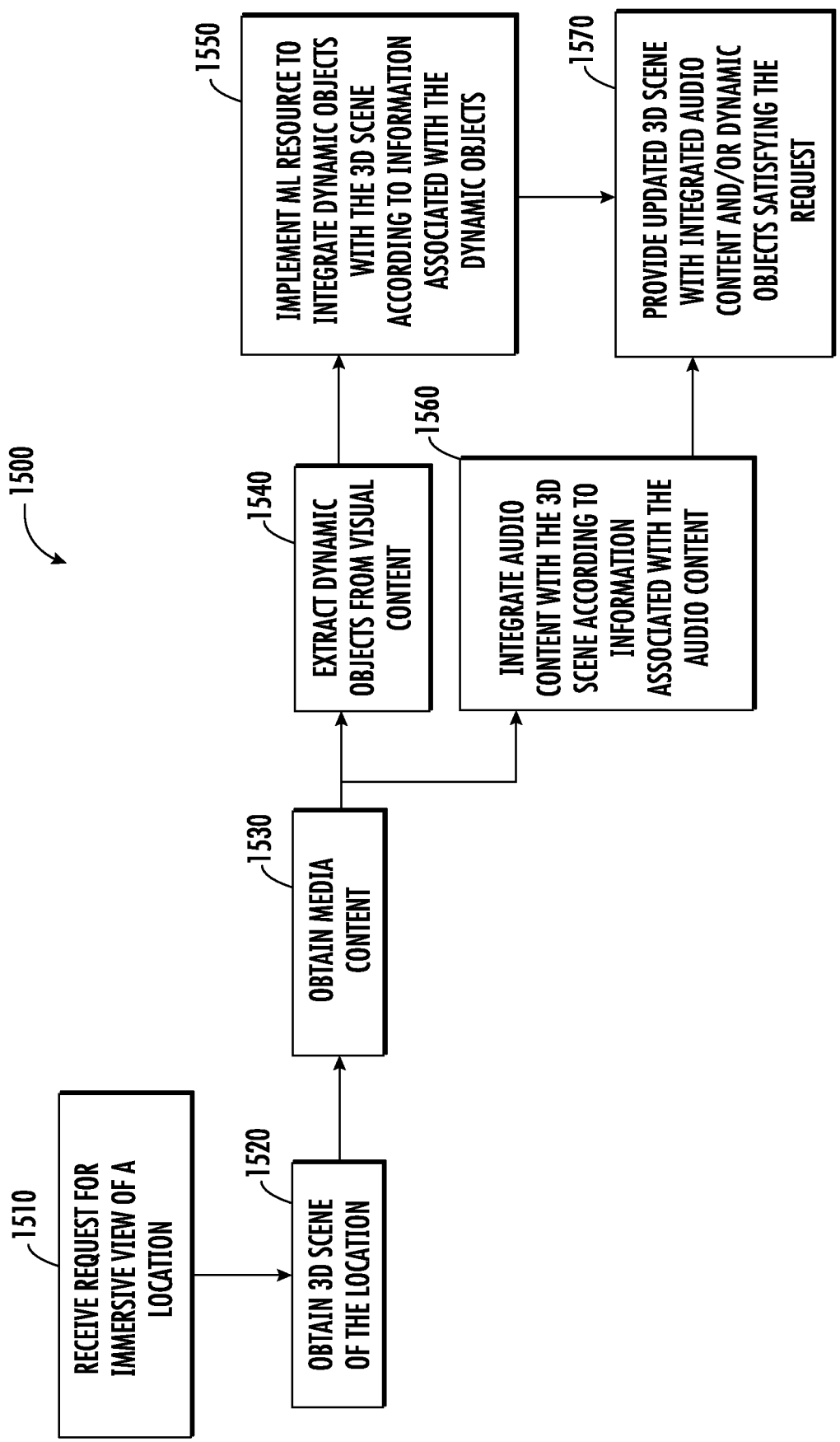
FIG. 15 depicts a block diagram of an example integrated content system according to example embodiments of the present disclosure.

FIG. 15 depicts a block diagram of an example computer implemented method 1500. At operation 1510, the method includes server computing system 300 receiving a request for an immersive view of a location. For example, the request for the immersive view may be associated with temporal conditions (e.g., an immersive view of the location at a particular time, including a time of day, time of year, etc.) and/or other conditions including lighting conditions, weather conditions, and the like. For example, a user of a computing device may request an immersive view of a restaurant at 6 pm on a Friday via an immersive view application and the request may be transmitted to a server computing system.

At operation 1520, the server computing system 300 may obtain a 3D scene associated with the location. For example, the server computing system may obtain the 3D scene from 3D scene imagery. For example, the 3D scene of the location obtained from 3D scene imagery may be a 3D scene which corresponds to, or is roughly associated with, the conditions of the request (e.g., a 3D scene of the restaurant at 6 pm on a Friday, a 3D scene of the restaurant at night or under similar lighting conditions which are expected at a similar time of day, etc.). As another example, if a user requests an immersive view of a park when it is raining, the 3D scene of the park retrieved from 3D scene imagery may be a 3D scene of the park when it is raining rather than a 3D scene of the park when it is sunny.

At operation 1530, the server computing system may obtain media content associated with the location. For example, a server computing system may obtain the media content from a user-generated content data store and/or a machine-generated content data store. For example, the server computing system may obtain the media content from the user-generated content data store and/or the machine-generated content data store which corresponds to, or is roughly associated with, the conditions of the request (e.g., media content captured at the restaurant at or around 6 pm on a Friday, media content captured at the restaurant at night or under similar lighting conditions which are expected at a similar time of day, etc.). As another example, if a user requests an immersive view of a park when it is raining, the retrieved media content may include imagery of the park at a time when it is raining. Likewise, retrieved media content may include audio content associated with the park captured at a time when it is raining or synthesized audio content which reflects conditions associated with rain at the park.

At operation 1540, the server computing system may extract dynamic objects from visual content (i.e., imagery). For example, the 3D scene integrator may be configured to identify and extract one or more objects (e.g., one or more dynamic objects) from an image of a scene of the location. Extraction of objects from captured images may be performed using various techniques (e.g., image segmentation algorithms, machine learning resources, cropping tools, etc.). Objects which are extracted may include foreground objects which are identified as being variable or dynamic objects, such objects providing an accurate representation of the state of the location at a particular time or under the particular circumstances. Further, such objects can indicate or represent a vibe or feeling of the location at a particular time or under particular circumstances.

At operation 1550, the server computing system may implement a machine learning resource to integrate the objects (e.g., dynamic objects) with the 3D scene of the location according to information (e.g., temporal information) associated with the objects. For example, the 3D scene integrator may be configured to integrate user-generated content from the user-generated content data store and/or the machine-generated content from machine-generated content data store with the 3D scene obtained from 3D scene imagery at operation 1520. For example, the 3D scene integrator may be configured to position the extracted objects within the 3D scene to generate an updated or integrated 3D scene in which the objects are placed in the scene in a manner which is consistent with how those objects were located or posed in the user-generated image of the scene. For machine-generated objects, the 3D scene integrator may be configured to position the machine-generated objects within the 3D scene to generate an updated or integrated 3D scene in which the machine-generated objects are placed in the scene in a manner which is consistent with how corresponding real-world objects would most likely be located or posed in the scene, for example, using a machine learning resource which is trained to place machine-generated objects in a scene in a manner which is consistent with how corresponding real-world objects would most likely be located or are actually posed in the scene (e.g., via a neural network). The integration of the objects is intended to provide a user viewing the integrated 3D scene with an accurate representation of the state of the location at a particular time or under other specified conditions. Further, the integration of the objects may also provide a sense of how the location generally feels at a particular time (e.g., a time of day, time of year, etc.) or under other specified conditions (e.g., a particular weather condition, lighting condition, etc.).

At operation 1560, the server computing system may also integrate audio content with the 3D scene of the location according to information (e.g., temporal information) associated with the scene. For example, the 3D scene integrator may be configured to integrate sound with the 3D scene in a manner similar to integrating imagery. For example, the 3D scene integrator may be configured to integrate user-generated content from the user-generated content data store and/or the machine-generated content from machine-generated content data store with the 3D scene obtained from 3D scene imagery at operation 1520. For example, the 3D scene integrator may be configured to integrate audio content obtained at operation 1530 which is consistent with the request received at operation 1510 (e.g., audio content that is recorded at a similar timeframe that the immersive view request is associated with). The integration of the audio content can be intended to provide a user viewing the integrated 3D scene with a detailed representation of the state of the location at a particular time or under other specified conditions. Further, the integration of audio content may also provide a further sense of how the location generally feels or sounds at a particular time (e.g., a time of day, time of year, etc.) or under other specified conditions (e.g., a particular weather condition, etc.).

At operation 1570, the server computing system may be configured to provide the updated or integrated 3D scene of the location having the integrated audio content and/or objects (e.g., dynamic objects) which satisfies the request received at operation 1510. For example, the updated or integrated 3D scene of the location may be transmitted to the computing device from the server computing system. For example, the updated or integrated 3D scene of the location may be stored as integrated 3D scene imagery.

In FIG. 15, the server computing system may dynamically generate the updated or integrated 3D scene of the location in response to receiving the request at operation 1510. In some implementations however, an updated or integrated 3D scene of the location which satisfies the request received at operation 1510 may be prestored or preexisting and may be stored as integrated 3D scene imagery. Therefore, in such a case, operations 1520, 1530, 1540, 1550, and 1560 may be omitted while an operation of searching for an integrated 3D scene of the location at integrated 3D scene imagery which satisfies the conditions of the request may be performed as an intermediate operation between operations 1510 and 1570. Accordingly, the responsiveness of the server computing system to the request may be faster as less operations are performed or needed.

Figure 16A:
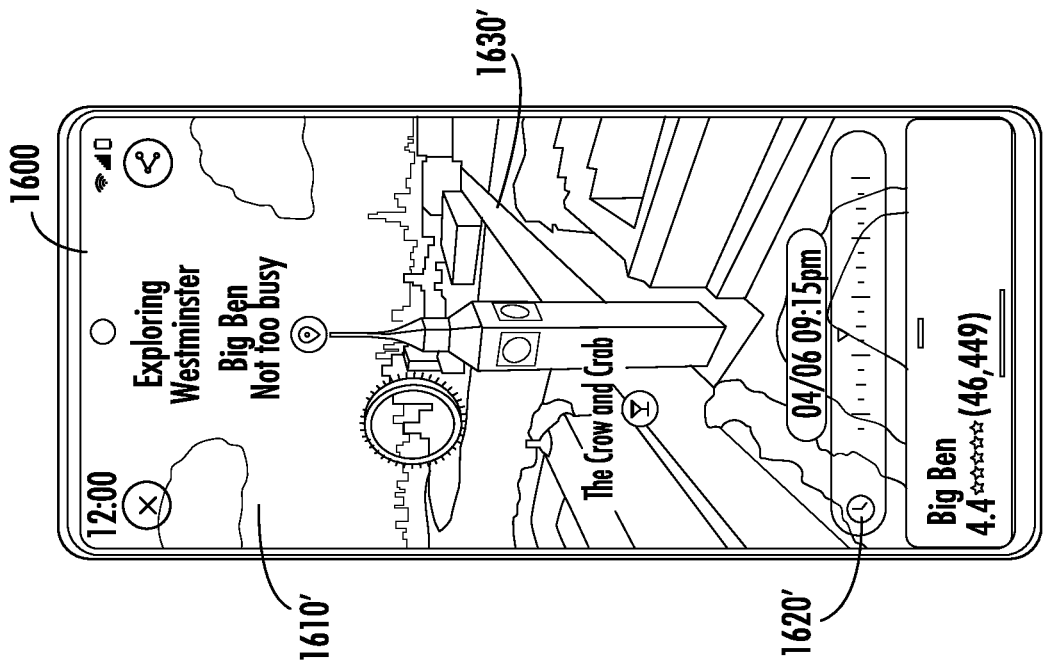
FIG. 16A depicts an illustration of example predicted rendering at a first time according to example embodiments of the present disclosure.
Figure 16B:
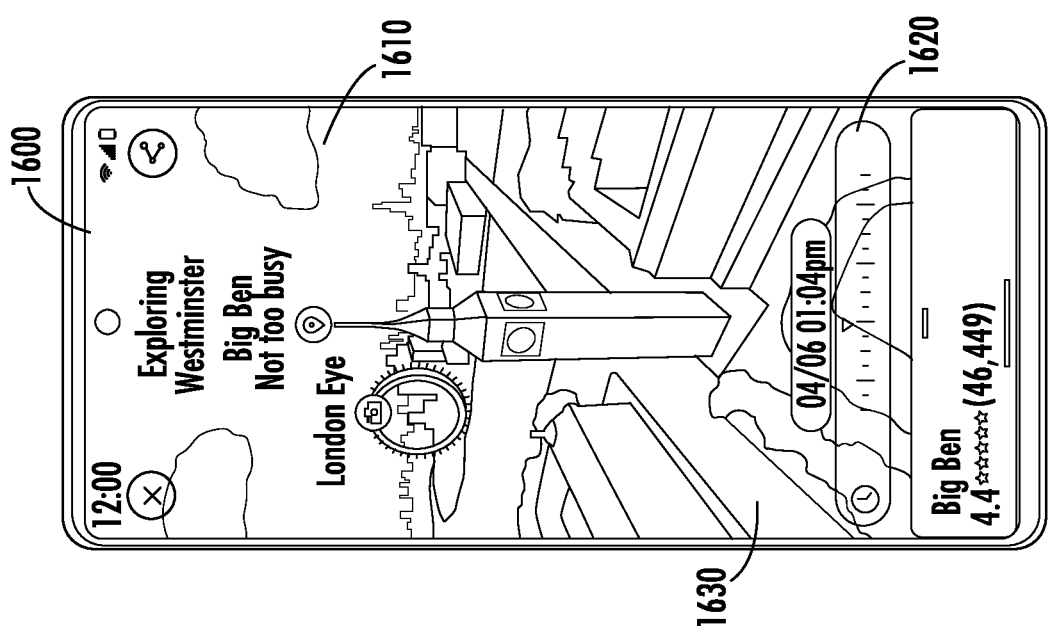
FIG. 16B depicts an illustration of example predicted rendering at a second time according to example embodiments of the present disclosure.

FIGS. 16A-16B illustrate example user interface screens by which a user can request an immersive view of a location which is associated with a particular time, according to one or more example embodiments of the disclosure. For example, FIG. 16A illustrates a computing device 1600 which displays a user interface screen 1610 including various user interface elements including a user interface element 1620 which corresponds to a time slider widget which allows a user to request an immersive view of a location at various times of the day. For example, FIG. 16B illustrates the computing device 1600 which displays a user interface screen 1610' including various user interface elements including a user interface element 1620' which corresponds to a time slider widget which allows the user to request an immersive view of a location at various times of the day.

For example, user interface screen 1610 displays an immersive view of Westminster at 1:04 pm while user interface screen 1610' displays an immersive view of Westminster at 9:15 pm. For example, the immersive view shown in FIG. 16A reflects accurate lighting conditions for that time of day and dynamic objects may include vehicles 1630 which are integrated with a 3D scene of the location. For example, the immersive view shown in FIG. 16B reflects accurate lighting conditions for that time of day and dynamic objects may include vehicles 1630' having their headlights turned on which are integrated with a 3D scene of the location.

Though not shown in FIGS. 16A-16B, other user interface elements may be provided by which a user can specify a request to obtain an immersive view of a location according to various conditions to accurately obtain a representation of the state of the location according to those conditions. Further, this may allow a user to accurately obtain a vibe of the location according to those conditions. For example, a user interface element for identifying a weather condition (e.g., a sunset view, a sunrise view, under sunny, cloudy, or rainy conditions, etc.) may be provided. For example, a user of the computing device may request an immersive view of a park in the evening when it is raining. The user interface element to specify a weather condition (or any condition associated with the requested immersive view) may be in the form of a pull-down menu, a selectable user interface element, a text box, and the like. For example, a user interface element for specifying a crowd condition (e.g., not crowded, slightly crowded, crowded, very crowded, etc.) may be provided. For example, a user of the computing device may request an immersive view of a park when it is considered to be very busy so that the user can appreciate the vibe of the park when it is very crowded without actually traveling to the park. The integrated 3D scene of the park may include imagery of the park with a high level of visitors and/or audio content which reflects a very noisy environment indicative of a very crowded park. For example, a user interface element for specifying a lighting condition (e.g., normal ambient light, bright, dark, etc.) may be provided. For example, a user of the computing device may request an immersive view of a park when it is considered to be very bright so that the user can appreciate the ambiance of the park when it is very bright without actually traveling to the park. The integrated 3D scene of the park may include imagery of the park with integrated images that are indicative of the park under bright conditions. The user may also specify a time of day in addition to or instead of a brightness level, when requesting the immersive view.

Figure 17:
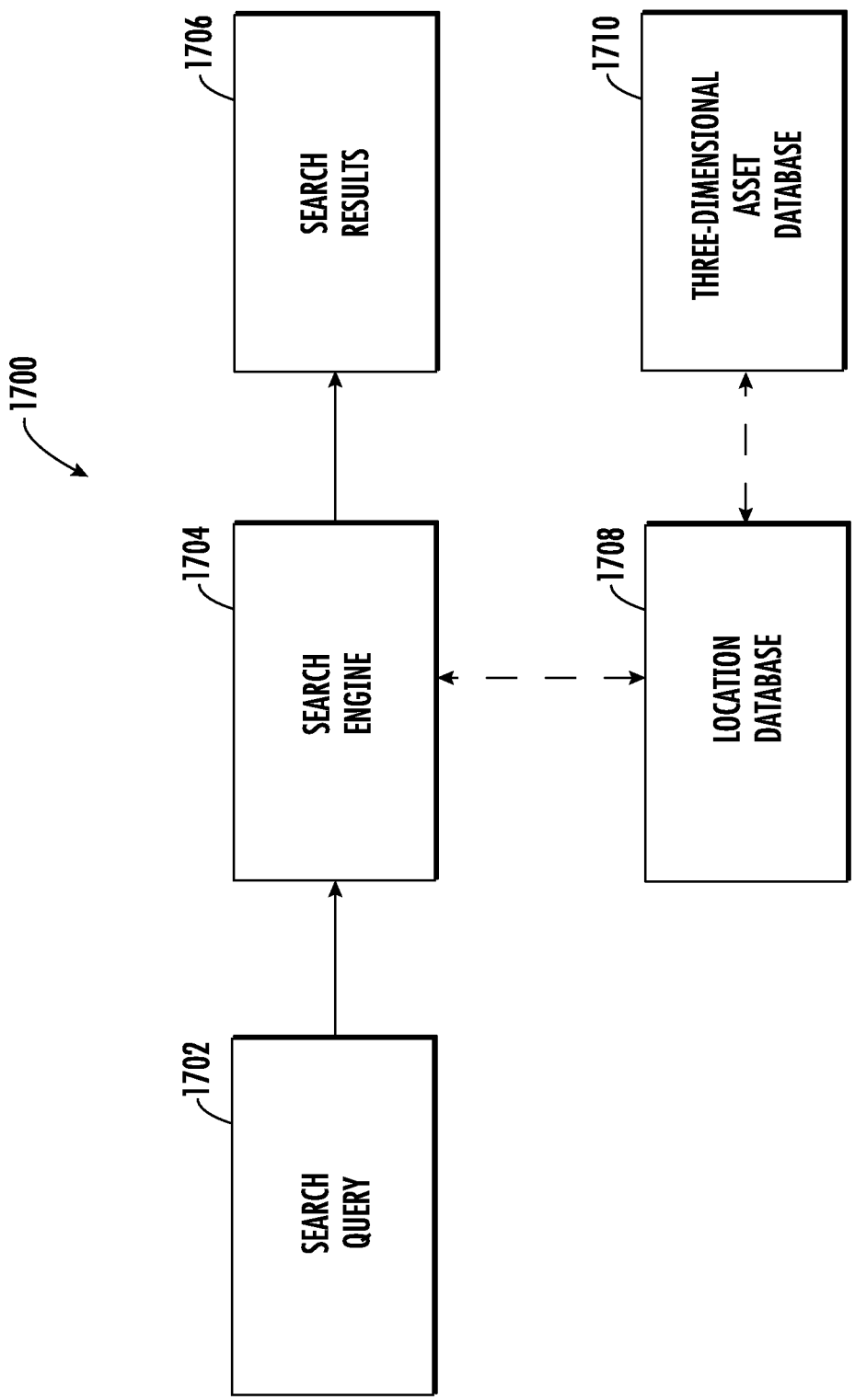
FIG. 17 depicts a block diagram of an example model search system according to example embodiments of the present disclosure.

FIG. 17 depicts a block diagram of an example model search system 1700 according to example embodiments of the present disclosure. In some implementations, the model search system 1700 is trained to receive a set of input data 1702 descriptive of a search query and, as a result of receipt of the input data 1702, provide output data 1706 that includes one or more search results. Thus, in some implementations, the model search system 1700 can include a search engine 1704 that is operable to process a search query and determine intent.

The example model search system 1700 can involve a search engine 1704 obtaining a search query 1702 as input and outputting search results 1706 which can include one or more location-specific models. The search query 1702 can be a location search query associated with a location. The search engine 1704 can process the query to determine the location associated with the search query 1702. The search engine can then access a location database 1708 to retrieve data related to the location and may access a three-dimensional asset database 1710 to determine if the location has a related three-dimensional model (e.g., a three-dimensional model generated with a neural radiance field model). Alternatively and/or additionally, a neural radiance field model and/or a virtual walkthrough video may be obtained based on the search query. If a three-dimensional model is found, the three-dimensional model may be segmented to generate a location-specific model, which can be output as a search result 1706. In some implementations, the search results 1706 can further include one or more links based on the search query 1702 and may include location data retrieved from a location database 1708.

Figure 18:
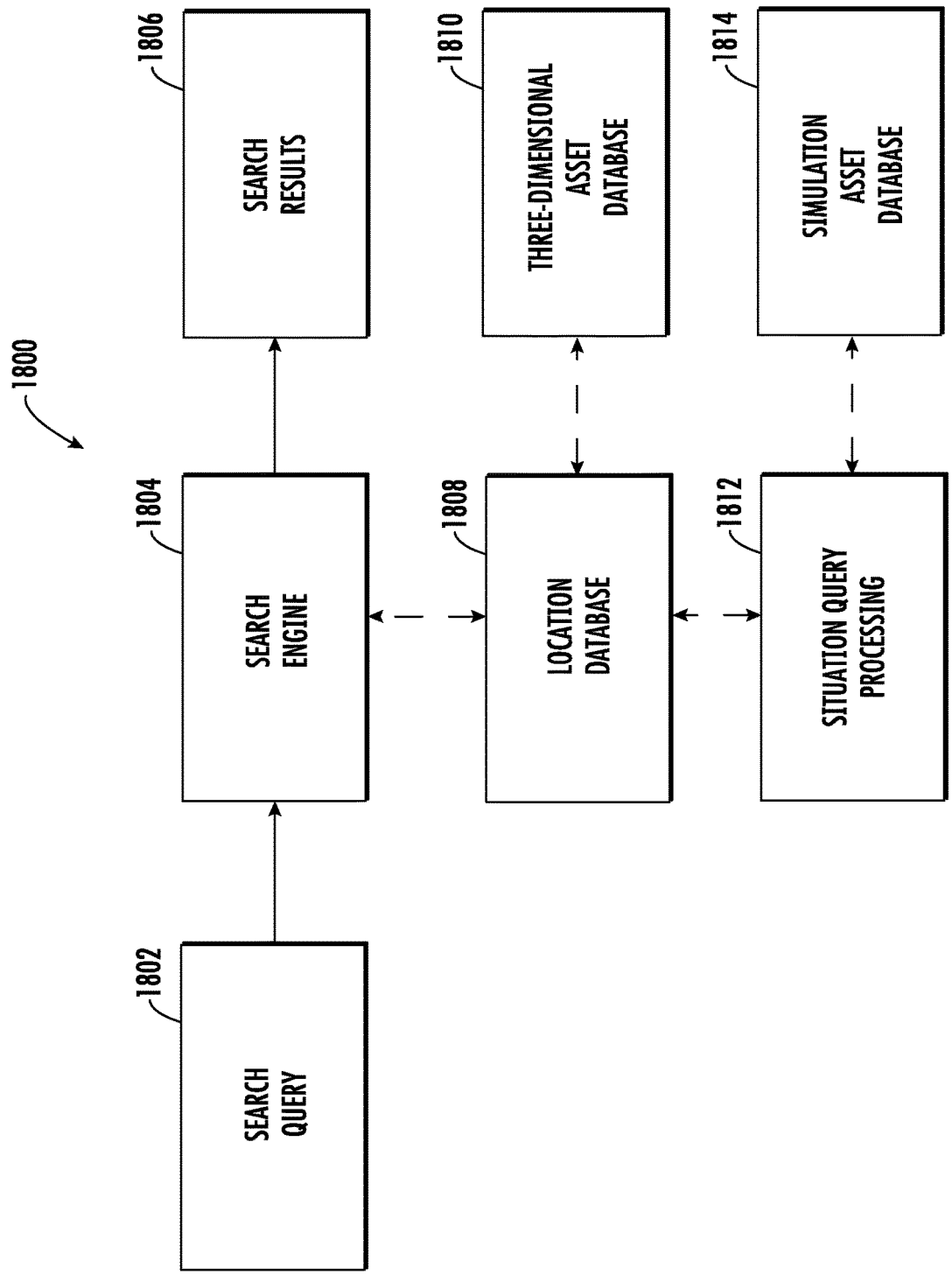
FIG. 18 depicts a block diagram of an example situation-aware model search system according to example embodiments of the present disclosure.

FIG. 18 depicts a block diagram of an example situation-aware model search system 300 according to example embodiments of the present disclosure. The situation-aware model search system 1800 is similar to the model search system 1700 of FIG. 117 except that the situation-aware model search system 1800 further includes situation-aware search and rendering.

The example situation-aware model search system 1800 can involve a search engine 1804 obtaining a search query 1802 as input and outputting search results 306 which can include one or more location-specific models. The search query 1802 can be a location search query associated with a location. The search engine 1804 can process the query to determine the location associated with the search query 1802. The search engine can then access a location database 1808 to retrieve data related to the location and may access a three-dimensional asset database 1810 to determine if the location has a related three-dimensional model. If a three-dimensional model is found, the three-dimensional model may be segmented to isolate the location to generate a location-specific model, which can be output as a search result 1806. In some implementations, the search results 306 can further include one or more links based on the search query 1802 and may include location data retrieved from a location database 1808. In some implementations, the search engine can further access time specific situation data related to the location using situation query processing 1812, which can be used to determine the time specific situation. Once a time specific situation is determined, a simulation asset database 1814 can be accessed to retrieve a simulation rendering effect descriptive of the determined situation. The location-specific model and the simulation rendering effect can be used to generate a simulated event to be output as a search result. The simulated event can include a three-dimensional model of a location with the situation rendered into the model. For example, the search query may be related to the Washington Monument, and the time specific situation may include the current weather state, which includes rain. Therefore, the simulated event can be a model of the Washington Monument with rain rendered into the model.

FIG. 19 depicts illustrations of example three-dimensional renderings 1910, 1920, and 1930 according to example embodiments of the present disclosure. The three-dimensional renderings 1910, 1920, and 1930 can further include situation based simulations.

The systems and methods disclosed herein can be used to retrieve or generate situation data, which can be used to retrieve simulation assets related to the situation described by the situation data. The simulation assets can be used to generate a simulated event with the location-specific model, which can include a simulation of the specific situation. For example, FIG. 19 displays three simulated weather states generated using the location-specific model and a simulation asset. The three-dimensional renderings are displayed in a user-interface with a location and the weather state. A partly cloudy three-dimensional rendering 1910 can provide a simulated partly cloudy weather state for the location, which can provide a user with a rendering that accurately depicts that location with that particular weather state. Moreover, the systems and methods disclosed herein can provide previews of the location in various other weather states such as a rainy weather state 1920 or a heavy rain weather state 1930. These renderings can be time specific to an input time by a user, can be based on a real-time situational state, or can be a manually selected situational state. Alternatively and/or additionally, the situation can be a crowd situation, a traffic situation, and/or a variety of other situations that may be determined and simulated for the user.

Figure 20:
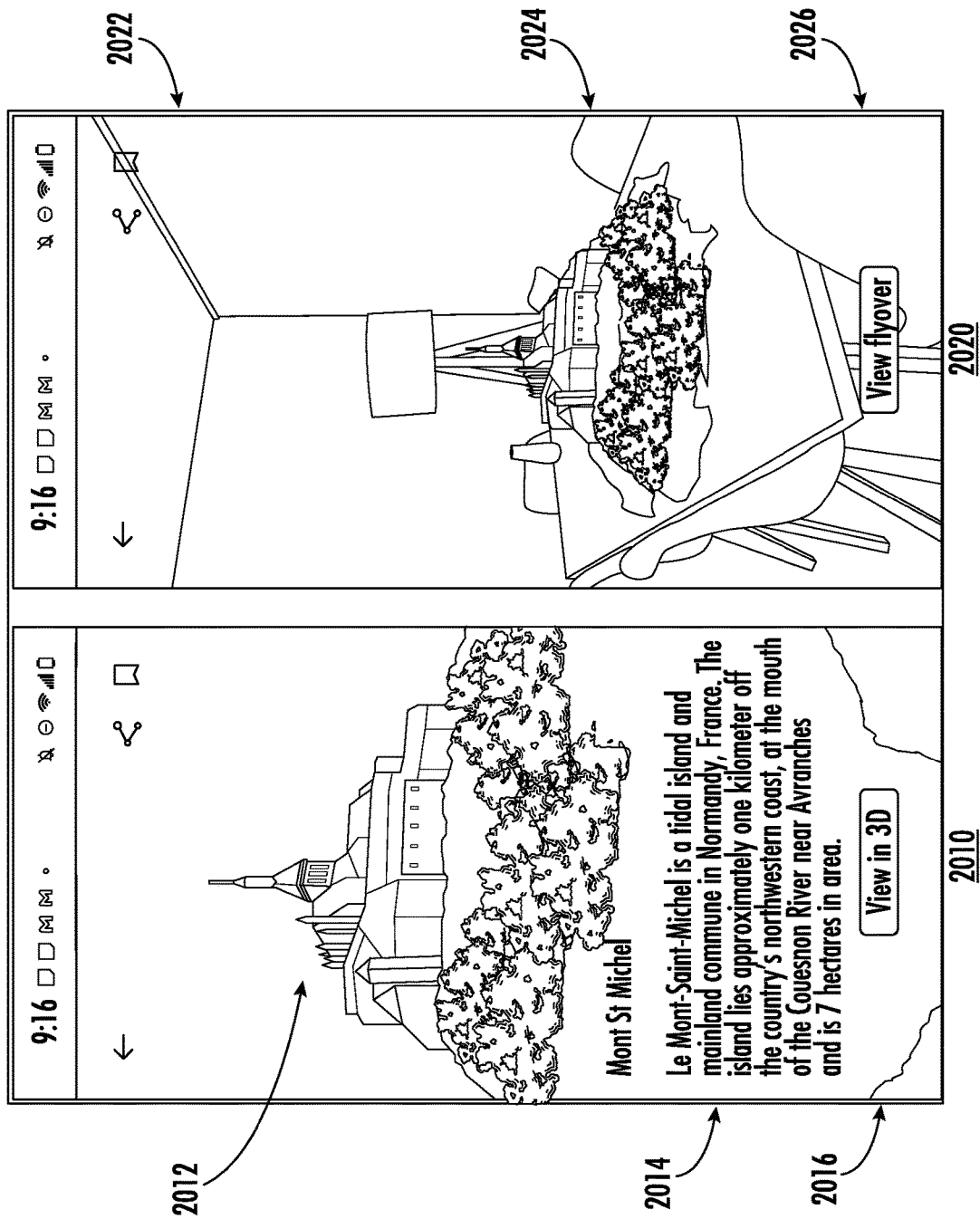
FIG. 20 depicts an illustration of an example augmented-reality experience according to example embodiments of the present disclosure.

FIG. 20 depicts an illustration of an example augmented-reality experience 2020 according to example embodiments of the present disclosure. In some implementations, the augmented-reality experience 2020 is trained to receive a set of input data descriptive of a three-dimensional model and, as a result of receipt of the input data, provide output data 2024 that can be a rendering of a three-dimensional model of a location. Thus, in some implementations, the augmented-reality experience 2020 can include a preview of a location 2012 that is operable to depict the location before an augmented-reality experience is selected 2016.

The augmented-reality experience 2020 can be one of many mediums in which to provide the location-specific model. In this implementation, the user computing device is provided with a user interface that allows the user to view the location-specific model 2012 (e.g., a three-dimensional model generated with the one or more neural radiance field models) in context 2010 or as an augmented-reality rendering 2024. In this implementation, the user interface provides the location-specific model in context 2010 with the location name and a textual snippet 2014 with information on the location. The user interface can contain a selectable icon 2016 to switch to an augmented-reality experience 2020 that can use the location-specific model 2012 to render the location into a user's environment 2022. The augmented-reality rendering 2024 can be placed in the user's environment 2022 via the augmented-reality experience 2024 to view the location as a scaled down model. Moreover, the user interface can provide a selectable icon 2026 to exit the augmented-reality experience 2020 and return to the location-specific model 2012 in context 2010.

Figure 21:
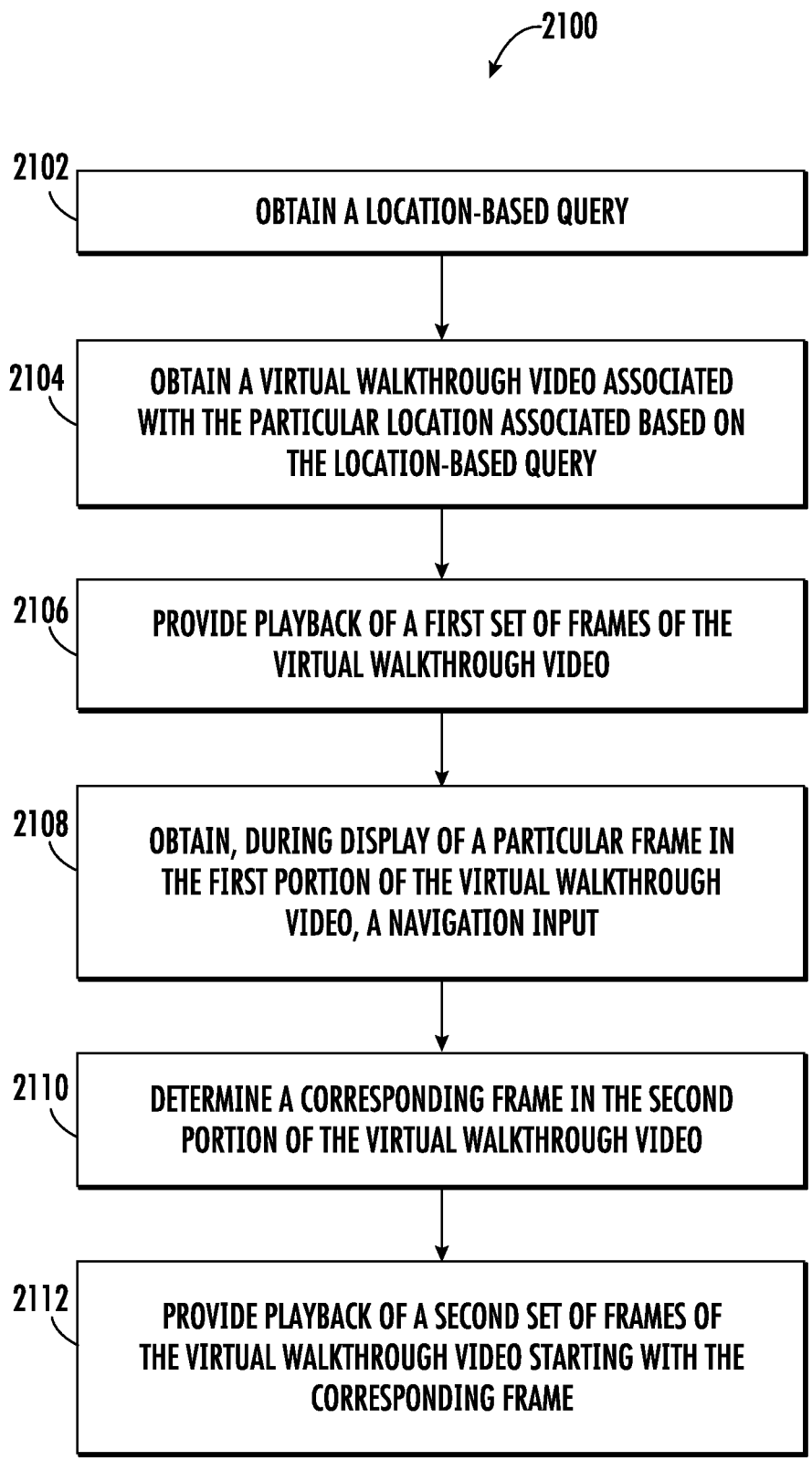
FIG. 21 depicts a flow chart diagram of an example method to perform direction navigation in a virtual walkthrough interface according to example embodiments of the present disclosure.

FIG. 21 depicts a flow chart diagram of an example method to perform according to example embodiments of the present disclosure. Although FIG. 21 depicts steps performed in a particular order for purposes of illustration and discussion, the methods of the present disclosure are not limited to the particularly illustrated order or arrangement. The various steps of the method 2100 can be omitted, rearranged, combined, and/or adapted in various ways without deviating from the scope of the present disclosure.

At 2102, a computing system can obtain a location-based query. The location-based query can be associated with obtaining information associated with a particular location. The location-based query can be generated based on a user viewing a map depicting the particular location. In some implementations, the location-based query can include text data, image data, audio data, latent encoding data, multimodal data, and/or other data.

At 2104, the computing system can obtain a virtual walkthrough video associated with the particular location based on the location-based query. The virtual walkthrough video may have been generated by generating a plurality of view renderings with a neural radiance field model. The virtual walkthrough video can be descriptive of a sequence of views of an environment associated with the location rendered in a forward progressing sequence and a backwards progressing sequence. The forward progressing sequence can be associated with a first portion of the virtual walkthrough video. The backwards progressing sequence can be associated with a second portion of the virtual walkthrough video. In some implementations, the virtual walkthrough video can include a video that depicts a three-hundred and sixty view of an environment from a plurality of positions within the environment.

At 2106, the computing system can provide playback of a first set of frames of the virtual walkthrough video. The playback can be performed by a video player provided by a virtual walkthrough interface. The playback can be adjusted (and/or controlled) with one or more user interface elements within the virtual walkthrough interface. For example, the speed of playback, the direction of the playback, and/or the view direction can be adjusted based on interactions with virtual joysticks, virtual buttons, virtual sliders, virtual icons, and/or other user interface elements. In some implementations, the adjustments may be performed based on a gesture input, a selection input, an audio input, and/or other inputs. Providing the playback can include cropping the image frames of the virtual walkthrough video to depict a range of view associated with a view direction.

At 2108, the computing system can obtain, during display of a particular frame in the first portion of the virtual walkthrough video, a navigation input. The navigation input can be descriptive of a request to perform a virtual walkthrough in an opposite direction. The navigation input can include a movement of a joystick user interface element in an opposite direction to a previous action. The navigation input may include a selection of a reverse option.

At 2110, the computing system can determine a corresponding frame in the second portion of the virtual walkthrough video. The corresponding frame can be associated with the particular frame. In some implementations, the particular frame and the corresponding frame can be associated with a same position in the environment. The corresponding frame determination can be based on video metadata, a playback data packet associated with the virtual walkthrough video, and/or real-time video processing. The corresponding frame and the particular frame can be associated with the same view synthesis rendering of the plurality of view synthesis renderings utilized to generate the virtual walkthrough video.

At 2112, the computing system can provide playback of a second set of frames of the virtual walkthrough video starting with the corresponding frame. The playback can be performed within the virtual walkthrough interface. The second set of frames can be descriptive of at least a portion of the first set of frames in an opposite order.

Figure 22:
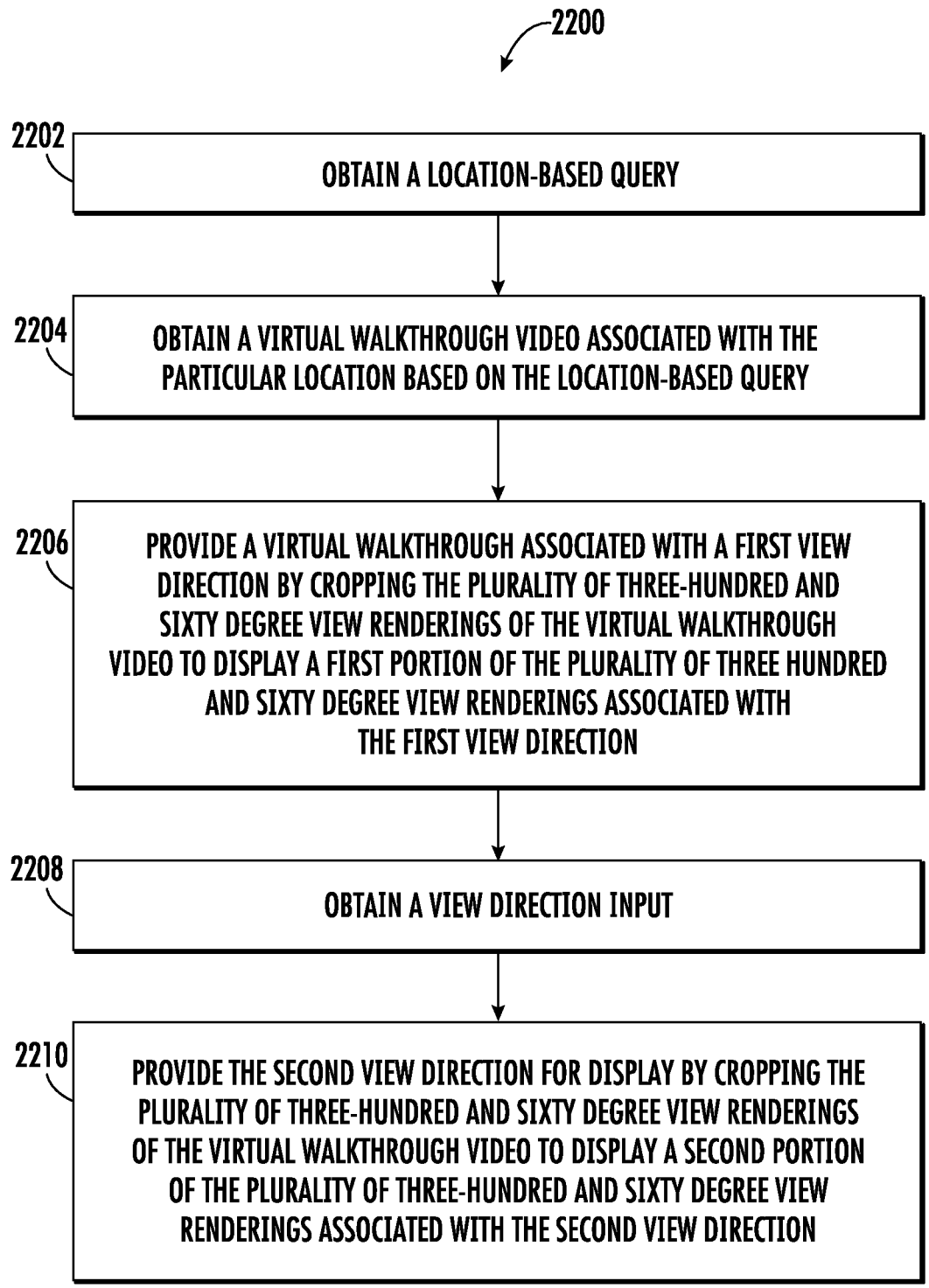
FIG. 22 depicts a flow chart diagram of an example method to perform view direction navigation in a virtual walkthrough interface according to example embodiments of the present disclosure.

FIG. 22 depicts a flow chart diagram of an example method to perform according to example embodiments of the present disclosure. Although FIG. 22 depicts steps performed in a particular order for purposes of illustration and discussion, the methods of the present disclosure are not limited to the particularly illustrated order or arrangement. The various steps of the method 2200 can be omitted, rearranged, combined, and/or adapted in various ways without deviating from the scope of the present disclosure.

At 2202, a computing system can obtain a location-based query. The location-based query can be associated with obtaining information associated with a particular location. The location-based query can be obtained via a search interface, a map interface, a browser interface, and/or one or more other interfaces. The particular location can be associated with one or more entities, one or more individuals, and/or one or more objects. The particular location can be determined based on processing the location-based query with one or more search engines.

At 2204, the computing system can obtain a virtual walkthrough video associated with the particular location based on the location-based query. The virtual walkthrough video may have been generated by generating a plurality of view renderings with a neural radiance field model. In some implementations, the plurality of view synthesis renderings can include a plurality of three-hundred and sixty degree view renderings. The virtual walkthrough video can be a prerendered video that can be supplemented with real-time renderings. The real-time renderings can be associated with rendering in annotations and/or user-generated content. Additionally and/or alternatively, the real-time renderings can include additional neural radiance field model renderings for walkthrough detours, entering the environment, and/or bridging the gap between two or more prerendered videos. In some implementations, an aerial drop down into the environment can be rendered based on the neural radiance field model and/or aerial imagery.

At 2206, the computing system can provide a virtual walkthrough associated with a first view direction by cropping the plurality of three-hundred and sixty degree view renderings of the virtual walkthrough video to display a first portion of the plurality of three-hundred and sixty degree view renderings associated with the first view direction. The virtual walkthrough video can be provided in a virtual walkthrough interface with a plurality of navigation user interface elements for adjusting the virtual walkthrough. The cropping can be determined based on one or more user selections, based on predetermined settings, based on semantic understanding, and/or one or more other contexts. The cropping can be performed based on a grid system and/or based on smooth movement adjustments that provide freeform adjustments of the view direction.

At 2208, the computing system can obtain a view direction input. The view direction input can be descriptive of a request to adjust a focal direction to a second view direction. The view direction input can include a gesture input, a tap input, an audio input, and/or one or more other inputs. The second view direction can horizontally and/or vertically differ from the first view direction.

At 2210, the computing system can provide the second view direction for display by cropping the plurality of three-hundred and sixty degree view renderings of the virtual walkthrough video to display a second portion of the plurality of three-hundred and sixty degree view renderings associated with the second view direction. The cropping can be determined based on one or more user selections, based on predetermined settings, based on semantic understanding, and/or one or more other contexts.

Figure 23:
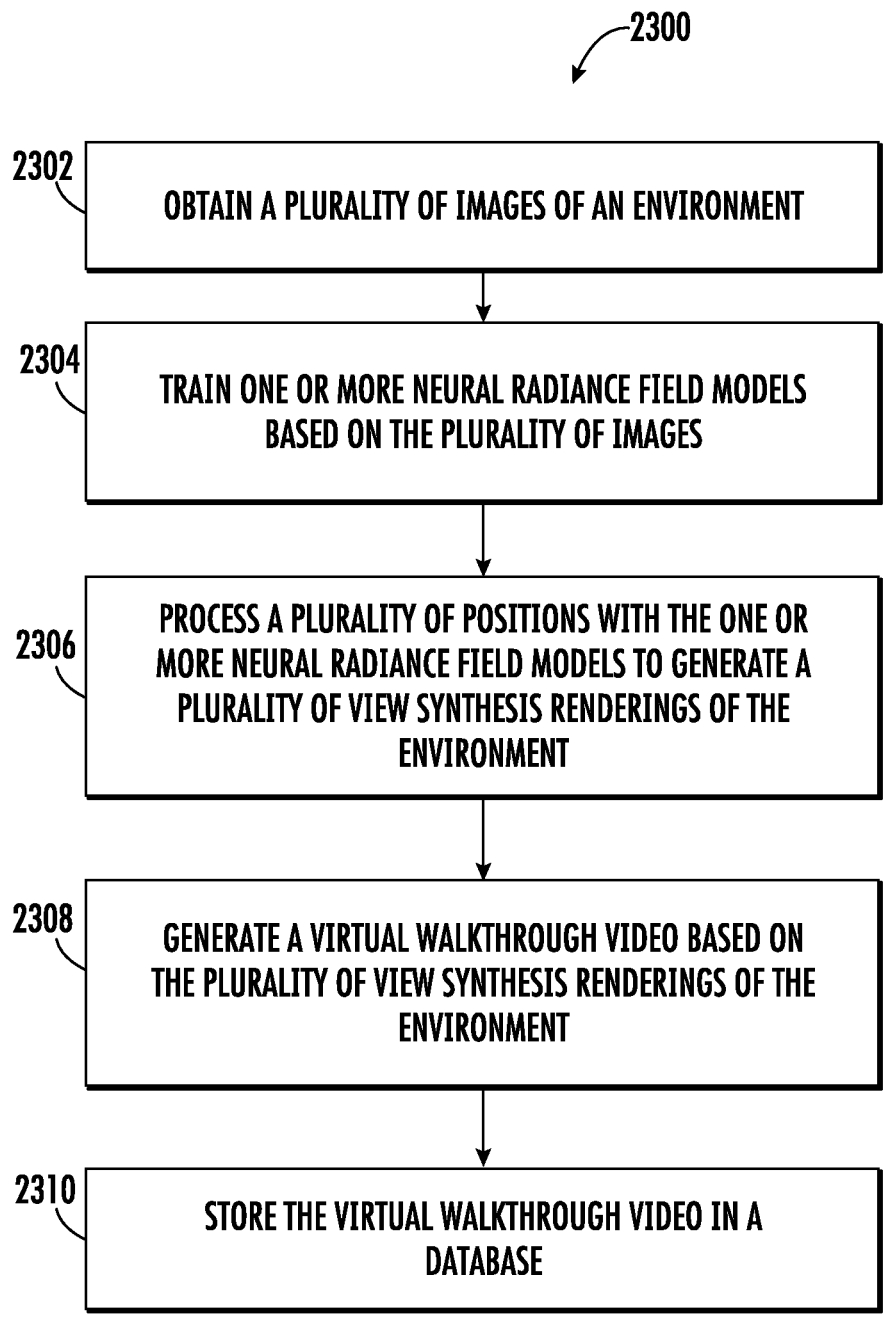
FIG. 23 depicts a flow chart diagram of an example method to perform virtual walkthrough video generation according to example embodiments of the present disclosure.

FIG. 23 depicts a flow chart diagram of an example method to perform according to example embodiments of the present disclosure. Although FIG. 23 depicts steps performed in a particular order for purposes of illustration and discussion, the methods of the present disclosure are not limited to the particularly illustrated order or arrangement. The various steps of the method 2300 can be omitted, rearranged, combined, and/or adapted in various ways without deviating from the scope of the present disclosure.

At 2302, a computing system can obtain a plurality of images of an environment. The plurality of images can be generated with one or more image sensors. In some implementations, the plurality of images may be descriptive of a plurality of views of the environment associated with a plurality of image-captures positions and a plurality of image-capture view directions within the environment. The one or more image sensors may be image sensors associated with a mobile computing device. In some implementations, the one or more image sensors may be mounted to a vehicle. Alternatively and/or additionally, the one or more image sensors may be a set of sensors of a plurality of sensors included in a backpack. The plurality of sensors may include image sensors, lidar sensors, and/or GPS sensors. The plurality of images can include images of one or more rooms (e.g., a restaurant, an apartment, a music venue, and/or other rooms), one or more buildings, one or more landmarks, one or more streets (e.g., street view images), and/or one or more landscapes.

At 2304, the computing system can train one or more neural radiance field models based on the plurality of images. The one or more neural radiance field models can be trained to generate view renderings of the environment. In some implementations, the one or more neural radiance field models can be trained on the plurality of images of the environment and lidar data for the environment. Training can include evaluating a depth loss based on the lidar data. Training the one or more neural radiance field models can include processing one or more positions and one or more view directions with the one or more neural radiance field models to generate one or more predicted color values and one or more predicted depth values. The one or more predicted color values may be evaluated with a photometric loss, and the one or more predicted depth values may be evaluated with a depth loss. In some implementations, the one or more predicted color values can be evaluated based on the plurality of images, and the one or more predicted depth values may be evaluated based on the lidar data.

In some implementations, the computing system can process the plurality of images with a segmentation model to generate a plurality of segmented images. The segmentation model can generate segmentation masks for segmenting occlusions from an image. The computing system can generate replacement data for the plurality of segmented images. In some implementations, the replacement data can be descriptive of predicted pixels for replacing masked regions of the plurality of segmented images. The computing system can generate a plurality of augmented images based on the plurality of segmented images and the replacement data. The one or more neural radiance field models can be trained on the plurality of augmented images.

In some implementations, training the one or more neural radiance field models based on the plurality of images can include determining a plurality of respective scene positions and a plurality of respective scene view directions for the plurality of images based on comparing feature location and feature sizes between images. Training can include processing one or more respective scene positions of the plurality of respective scene positions and one or more respective scene view directions of the plurality of respective scene view directions with the one or more neural radiance field models to generate one or more predicted view synthesis renderings. The one or more predicted view synthesis renderings can include one or more predicted color values and one or more predicted opacity values. Training the one or more neural radiance field models can include evaluating a loss function that evaluates a difference between the one or more predicted view synthesis renderings and one or more respective images of the plurality of images and adjusting one or more parameters of the one or more neural radiance field model based at least in part on the loss function.

At 2306, the computing system can process a plurality of positions with the one or more neural radiance field models to generate a plurality of view synthesis renderings of the environment. The plurality of positions can be associated with a plurality of locations within the environment. The plurality of view synthesis renderings can be descriptive of the environment from the plurality of positions. The plurality of view synthesis renderings can be descriptive of view included in the plurality of images and/or novel views not included in the plurality of images of the environment. The plurality of view synthesis images can include a plurality of predicted pixels associated with predicted colors, predicted depths, and/or predicted lighting for the environment.

In some implementations, processing the plurality of positions with the one or more neural radiance field models to generate the plurality of view synthesis renderings of the environment can include, for each position of the plurality of positions, processing the position with the one or more neural radiance field models to generate a plurality of directional view synthesis renderings. The plurality of directional view synthesis renderings can be associated with a plurality of view directions for the position. Processing the plurality of positions with the one or more neural radiance field models to generate the plurality of view synthesis renderings of the environment can include, for each position of the plurality of positions, generating a respective view synthesis rendering for the position by stitching the plurality of directional view synthesis renderings to generate a panoramic image rendering for the position. In some implementations, the plurality of view synthesis renderings can include a plurality of panoramic view synthesis renderings descriptive of the respective plurality of directional view synthesis renderings for each of the positions.

At 2308, the computing system can generate a virtual walkthrough video based on the plurality of view synthesis renderings of the environment. The virtual walkthrough video can be descriptive of a sequence of views of the environment. The virtual walkthrough video can include a plurality of frames that can be associated with the plurality of view synthesis renderings of the environment. In some implementations, the plurality of view synthesis renderings can be at least a subset of the plurality of frames. Additionally and/or alternatively, the computing system may process the plurality of view synthesis renderings to generate the plurality of frames, which can include blending and/or augmenting the plurality of view synthesis renderings for smooth transitions between positions within the environment.

In some implementations, generating the virtual walkthrough video based on the plurality of view synthesis renderings of the environment can include generating a first rendering video based on rendering the sequence of views of the environment in a first direction, generating a second rendering video based on rendering the sequence of views of the environment in a second direction, and generating the virtual walkthrough video by combing the first rendering video and the second rendering video. The first rendering video can be associated with a first portion of the virtual walkthrough video. The second rendering video can be associated with a second portion of the virtual walkthrough video. Rendering the sequence of frames forwards and backwards can provide the plurality of frames to be viewed with a video player in either direction without the potential latency issues that can occur when playing videos backwards. For example, corresponding frames in the first portion and the second portion can be associated with one another to be quickly navigated to when a user selects an option to switch "walkthrough" (or playback) directions.

At 2310, the computing system can store the virtual walkthrough video in a database. The database can be a searchable database. In some implementations, the virtual walkthrough video can be indexed with information descriptive of a location and/or name for the environment. The virtual walkthrough video can be stored with an entity tag associated with the environment (e.g., a name of the restaurant, a name of the store chain, a name of the monument, a name of the street, etc.). The virtual walkthrough video can be stored in a database with a plurality of other prerendered virtual walkthrough videos. Additionally and/or alternatively, metadata associated with the virtual walkthrough video can be generated and stored. The metadata can include entity tags, location information, user-generated content that can be rendered, links, data associated with corresponding frames in the virtual walkthrough video, position data, view direction data, and/or data descriptive of instructions for providing the virtual walkthrough video for display.

In some implementations, the computing system can obtain a search query. The computing system can determine a geographic location associated with the virtual walkthrough video is associated with the search query and provide the virtual walkthrough video for display. The search query can include a text string. The text string can be associated with one or more entities. In some implementations, determining the geographic location associated with the virtual walkthrough video is associated with the search query can include determining the one or more entities is associated with the geographic location. The search query may include text data, image data, audio data, latent encoding data, and/or other data that can be embedded then searched to determine a virtual walkthrough video to display. The search query may be obtained with a virtual walkthrough interface, which can then search a prerendered video database to obtain the virtual walkthrough video.

Alternatively and/or additionally, the computing system can provide a map interface for display. The map interface can include map information associated with a geographic location. The geographic location can be associated with the environment. The computing system can obtain a selection of a virtual walkthrough user interface element, determine the virtual walkthrough video is associated with the geographic location, and provide the virtual walkthrough video for display.

Figure 24A:
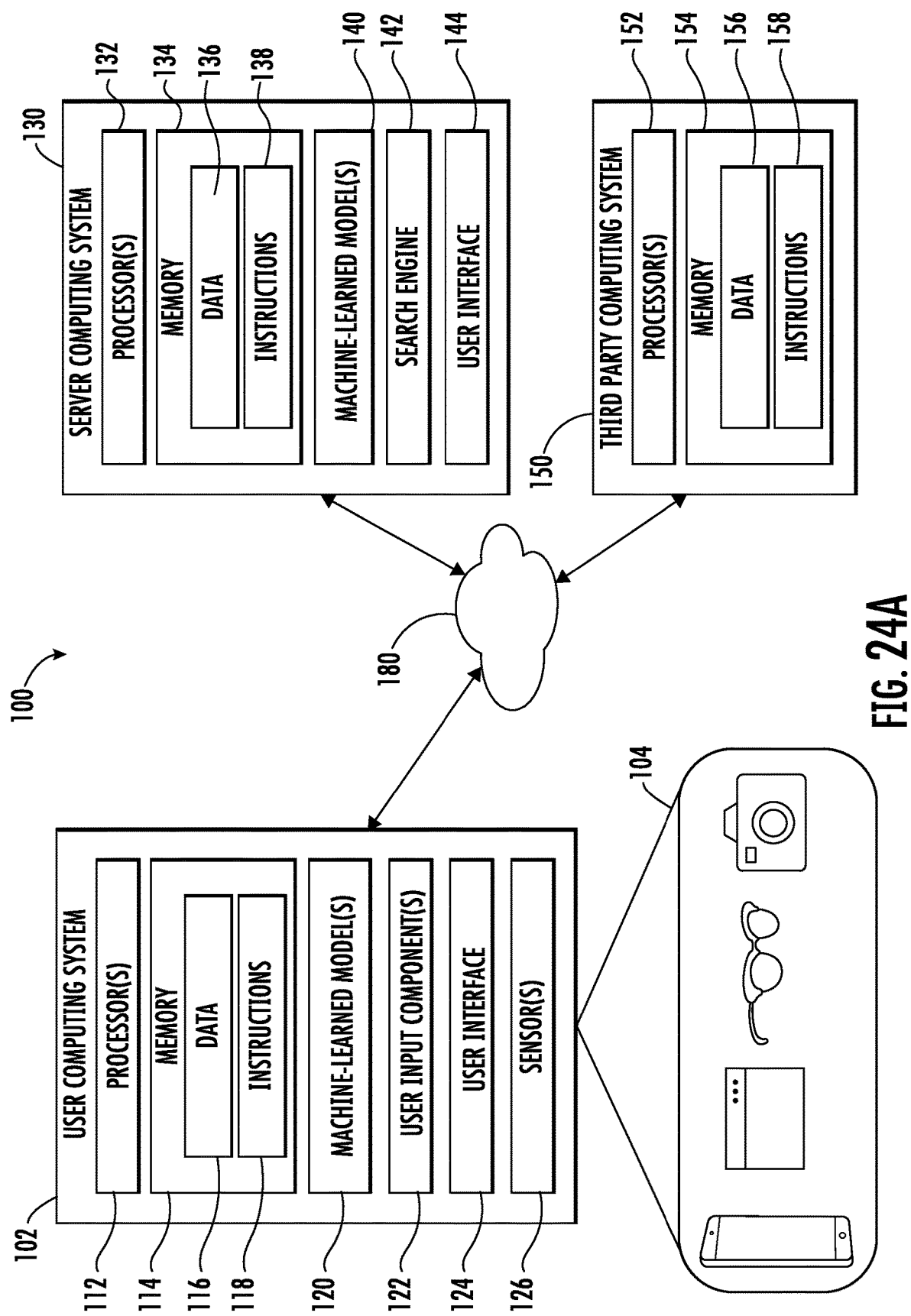
FIG. 24A depicts a block diagram of an example computing system that performs virtual walkthrough video generation and display according to example embodiments of the present disclosure.

FIG. 24A depicts a block diagram of an example computing system 100 that performs virtual walkthrough video generation and display according to example embodiments of the present disclosure. The system 100 includes a user computing system 102, a server computing system 130, and/or a third computing system 150 that are communicatively coupled over a network 180.

The user computing system 102 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing system 102 to perform operations.

In some implementations, the user computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing system 102 can implement multiple parallel instances of a single machine-learned model 120 (e.g., to perform parallel machine-learned model processing across multiple instances of input data and/or detected features).

More particularly, the one or more machine-learned models 120 may include one or more detection models, one or more classification models, one or more segmentation models, one or more augmentation models, one or more generative models, one or more natural language processing models, one or more optical character recognition models, and/or one or more other machine-learned models. The one or more machine-learned models 120 can include one or more transformer models. The one or more machine-learned models 120 may include one or more neural radiance field models, one or more diffusion models, and/or one or more autoregressive language models.

The one or more machine-learned models 120 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 120 can process image data, text data, audio data, and/or latent encoding data to generate output data that can include image data, text data, audio data, and/or latent encoding data. The one or more machine-learned models 120 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 140 can be included in or otherwise stored and implemented by the server computing system 130 that communicates with the user computing system 102 according to a client-server relationship. For example, the machine-learned models 140 can be implemented by the server computing system 140 as a portion of a web service (e.g., a viewfinder service, a visual search service, an image processing service, an ambient computing service, and/or an overlay application service). Thus, one or more models 120 can be stored and implemented at the user computing system 102 and/or one or more models 140 can be stored and implemented at the server computing system 130.

The user computing system 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 124, which may be associated with one or more applications. The one or more user interfaces 124 can be configured to receive inputs and/or provide data for display (e.g., image data, text data, audio data, one or more user interface elements, an augmented-reality experience, a virtual reality experience, and/or other data for display. The user interfaces 124 may be associated with one or more other computing systems (e.g., server computing system 130 and/or third party computing system 150). The user interfaces 124 can include a viewfinder interface, a search interface, a generative model interface, a social media interface, and/or a media content gallery interface.

The user computing system 102 may include and/or receive data from one or more sensors 126. The one or more sensors 126 may be housed in a housing component that houses the one or more processors 112, the memory 114, and/or one or more hardware components, which may store, and/or cause to perform, one or more software packets. The one or more sensors 126 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 102 may include, and/or pe part of, a user computing device 104. The user computing device 104 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 104. For example, a camera of a smartphone may be utilized to capture image data descriptive of the environment, and/or an overlay application of the user computing device 104 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 9B.

Additionally and/or alternatively, the server computing system 130 can include and/or be communicatively connected with a search engine 142 that may be utilized to crawl one or more databases (and/or resources). The search engine 142 can process data from the user computing system 102, the server computing system 130, and/or the third party computing system 150 to determine one or more search results associated with the input data. The search engine 142 may perform term based search, label based search, Boolean based searches, image search, embedding based search (e.g., nearest neighbor search), multimodal search, and/or one or more other search techniques.

The server computing system 130 may store and/or provide one or more user interfaces 144 for obtaining input data and/or providing output data to one or more users. The one or more user interfaces 144 can include one or more user interface elements, which may include input fields, navigation tools, content chips, selectable tiles, widgets, data display carousels, dynamic animation, informational popups, image augmentations, text-to-speech, speech-to-text, augmented-reality, virtual-reality, feedback loops, and/or other interface elements.

The user computing system 102 and/or the server computing system 130 can train the models 120 and/or 140 via interaction with the third party computing system 150 that is communicatively coupled over the network 180. The third party computing system 150 can be separate from the server computing system 130 or can be a portion of the server computing system 130. Alternatively and/or additionally, the third party computing system 150 may be associated with one or more web resources, one or more web platforms, one or more other users, and/or one or more contexts.

The third party computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the third party computing system 150 to perform operations. In some implementations, the third party computing system 150 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 102 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 100.

The central intelligence layer can communicate with a central device data layer. The central device data layer can be a centralized repository of data for the computing system 100. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 24B:
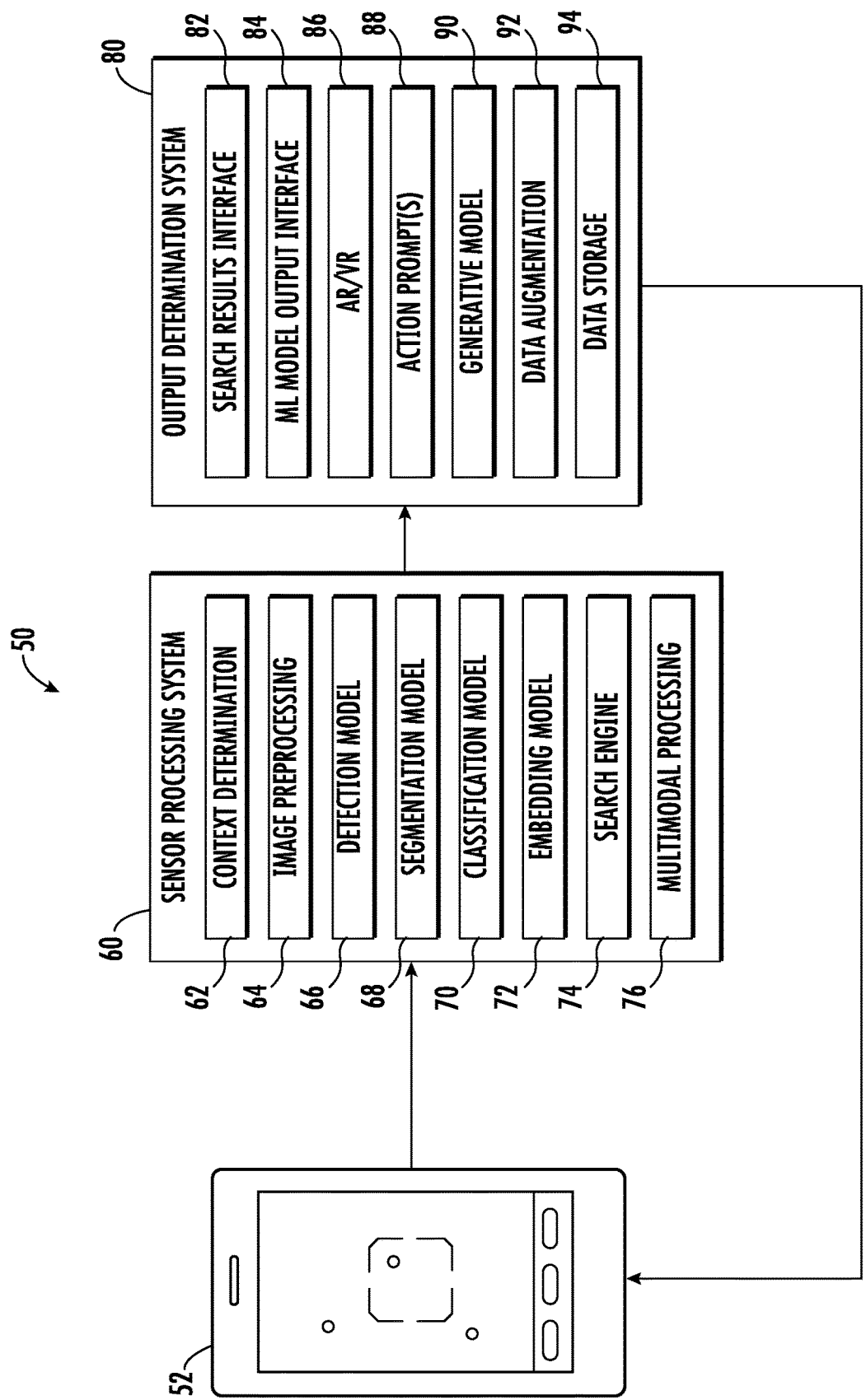
FIG. 24B depicts a block diagram of an example computing system that performs virtual walkthrough video generation and display according to example embodiments of the present disclosure.

FIG. 24B depicts a block diagram of an example computing system 50 that performs virtual walkthrough video generation and display according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings. For example, one or more images can be processed with the one or more embedding models 72 to generate one or more image embeddings in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to the provided user interface elements may condition and/or affect successive processing loops.

Figure 25:
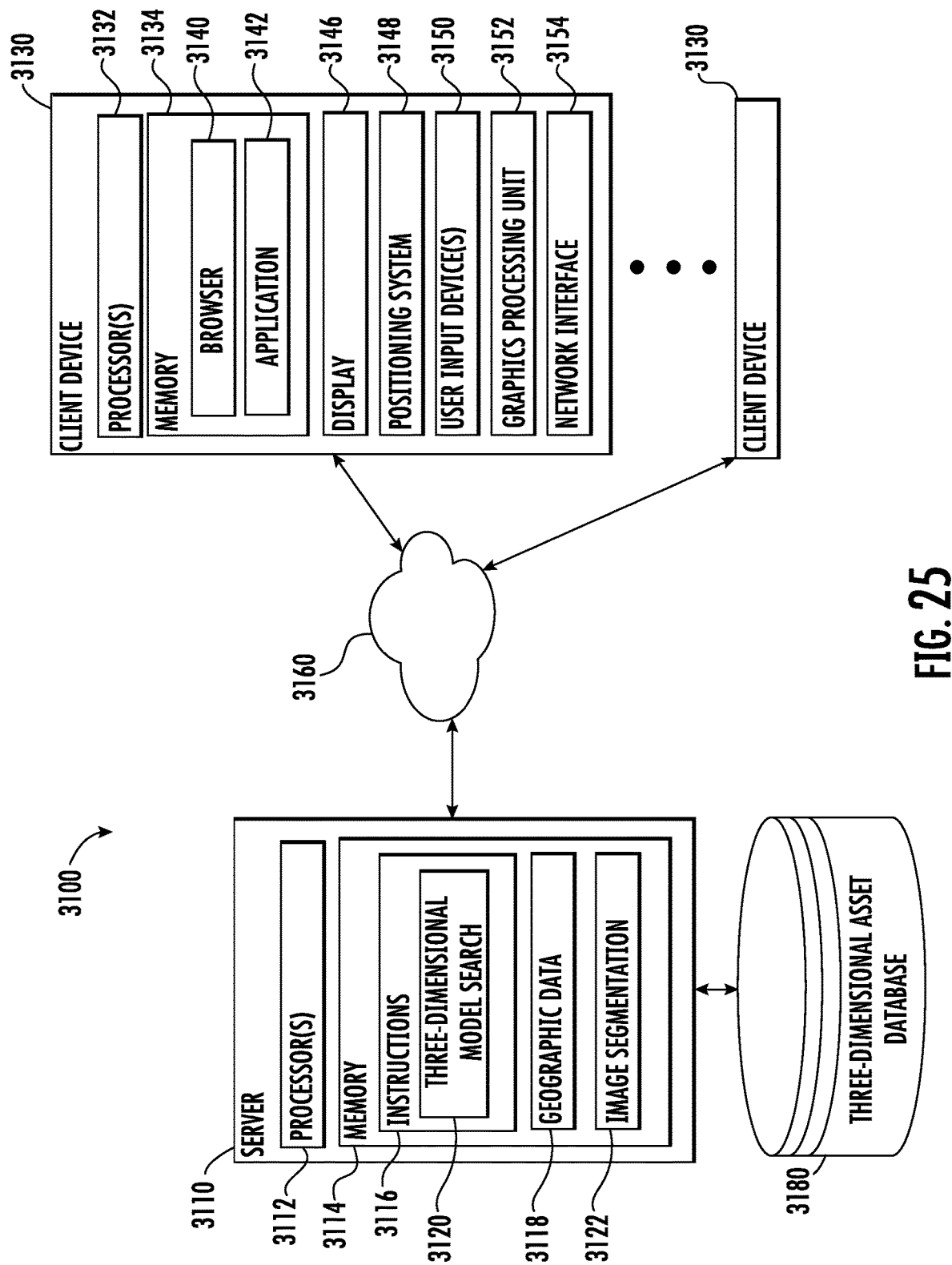
FIG. 25 depicts a block diagram of an example computing system that performs a location-based model search according to example embodiments of the present disclosure.

FIG. 25 depicts an exemplary computing system 3100 that can be used to implement a location-based model search according to aspects of the present disclosure. The system 3100 has a client-server architecture that includes a server 3110 that communicates with one or more client devices 3130 over a network 3160. However, the present disclosure can be implemented using other suitable architectures, such as a single computing device unconnected to a network.

The system 3100 includes a server 3110, such as, for example, a web server. The server 3110 can be one or more computing devices that are implemented as a parallel or distributed computing system. In particular, multiple computing devices can act together as a single server 3110. The server 3110 can have one or more processor(s) 3112 and a memory 3114. The server 3110 can also include a network interface used to communicate with one or more remote computing devices (e.g., client devices) 3130 over a network 3160.

The processor(s) 3112 can be any suitable processing device, such as a microprocessor, microcontroller, integrated circuit, or other suitable processing device. The memory 3114 can include any suitable computing system or media, including, but not limited to, non-transitory computer-readable media, RAM, ROM, hard drives, flash drives, or other memory devices. The memory 3114 can store information accessible by processor(s) 3112, including instructions 3116 that can be executed by processor(s) 3112. The instructions 3116 can be any set of instructions that when executed by the processor(s) 3112, cause the processor(s) 3112 to provide desired functionality.

In particular, the instructions 3116 can be executed by the processor(s) 3112 to implement a three-dimensional model search 3120. The three-dimensional model search 3120 can be configured to search for a three-dimensional model associated with a location to segment and output a location-specific three-dimensional model. In some implementations, the three-dimensional model search 3120 can be configured to access a three-dimensional asset database 3180 to retrieve the three-dimensional model, and the three-dimensional model can be segmented using the image segmentation element 3122 stored in the memory 3114 of the server computing system 3110. Alternatively and/or additionally, the search can be utilized to identify neural radiance field models and/or virtual walkthrough videos associated with a location, an entity, and/or other search criteria.

It will be appreciated that the term "element" can refer to computer logic utilized to provide desired functionality. Thus, any element, function, and/or instructions can be implemented in hardware, application specific circuits, firmware and/or software controlling a general purpose processor. In one implementation, the elements or functions are program code files stored on the storage device, loaded into memory and executed by a processor or can be provided from computer program products, for example computer executable instructions, that are stored in a tangible computer-readable storage medium such as RAM, hard disk or optical or magnetic media.

Memory 3114 can also include geographic data 3118 that can be retrieved, manipulated, created, or stored by processor(s) 3112. Geographic data 3118 can include geographic imagery (e.g., digital maps, satellite images, aerial photographs, street-level photographs, synthetic models, etc.), tables, vector data (e.g., vector representations of roads, parcels, buildings, etc.), point of interest data (e.g., locales such as islands, cities, restaurants, hospitals, parks, hotels, and schools), or other suitable geospatial data or related information. As an example, geographic data 3118 can be used to access information and data associated with a location and generate a rendering of a three-dimensional model of the surface of the Earth.

The geographic data 3118 can be stored in one or more databases. The one or more databases can be connected to the server 3110 by a high bandwidth LAN or WAN, or can also be connected to server 3110 through network 3160. The one or more databases can be split up so that they are located in multiple locales.

The server 3110 can exchange data with one or more client devices 3130 over the network 3160. Although two clients 3130 are illustrated in FIG. 24, any number of client devices 3130 can be connected to the server 3110 over the network 3160. The client devices 3130 can be any suitable type of computing device, such as a general purpose computer, special purpose computer, navigational device, laptop, desktop, integrated circuit, mobile device, smartphone, tablet, wearable-computing devices, a display with one or more processors coupled thereto and/or embedded therein, or other suitable computing device. Further, client device 3130 can be multiple computing devices acting together to perform operations or computing actions.

Similar to server 3110, a client device 3130 can include a processor(s) 3132 and a memory 3134. The memory 3134 can store information accessible by processor(s) 3132, including instructions that can be executed by processor(s) and data. As an example, memory 3134 can store a browser element 3140 and an application element 3142.

Browser element 3140 can provide instructions for implementing a browser. In particular, the user of client device 3130 can exchange data with server 3110 by using the browser to visit a website accessible at a particular web-address. The three-dimensional model search of the present disclosure can be provided as an element of a user interface of the website.

Application element 3142 can provide instructions for running a specialized application on client device 3130. In particular, the specialized application can be used to exchange data with server 3110 over the network 3160. Application element 3142 can include client-device-readable code for providing and implementing aspects of the present disclosure. For example, application element 3142 can provide instructions for implementing a mapping application or a virtual globe application.

The client device 3130 can include various user input devices 3150 for receiving information from a user, such as a touch screen, touch pad, data entry keys, speakers, mouse, motion sensor, and/or a microphone suitable for voice recognition. Further, the client device 3130 can have a display 3146 for presenting information, such as a rendering of a three-dimensional model in a three-dimensional environment.

The client device 3130 can also include a positioning system 3148 that can be used to identify the position of the client device 3130. The positioning system 3148 can be optionally used by the user to monitor the user's position relative to the rendering. The positioning system 3148 can be any device or circuitry for monitoring the position of the client device 3130. For example, the positioning device 3148 can determine actual or relative position by using a satellite navigation positioning system (e.g., a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

The client device 3130 can further include a graphics processing unit 3152. Graphics processing unit 3152 can be used by processor 3132 to render or depict three-dimensional imagery. In some embodiments, client device 3130 performs any and all three-dimensional rendering required for providing the three-dimensional environment.

The client device 3130 can include a network interface 3154 for communicating with server 3110 over network 3160. Network interface 3154 can include any components or configuration suitable for communication with server 3110 over network 3160, including, for example, one or more ports, transmitters, wireless cards, controllers, physical layer components, or other items for communication according to any currently known or future developed communications protocol or technology.

The network 3160 can be any type of communications network, such as a local area network (e.g., intranet), wide area network (e.g., Internet), or some combination thereof. The network 3160 can also include a direct connection between a client device 3130 and the server 3110. In general, communication between the server 3110 and a client device 3130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

The computing system can include one or more configurations to reduce computational cost and improve efficiency. For example, the systems and methods of the present disclosure provide a number of technical effects and benefits. As one example, the system and methods can train a neural radiance field model on raw noisy images. More specifically, the systems and methods can utilize unprocessed images to train a neural radiance field model. For example, in some implementations, the systems and methods can include training the neural radiance field model on a plurality of raw noisy images in a linear HDR color space. The neural radiance field model can then be utilized to generate a view rendering of a scene.

Another technical benefit of the systems and methods of the present disclosure is the ability to generate view renderings for low light scenes. For example, the neural radiance field models may be trained on data from the low light scene, and the resulting trained model can then be utilized for novel view rendering of the low light scene.

Another example technical effect and benefit relates to the reduction of computational cost and computational time. The systems and methods disclosed herein can remove the preprocessing step for training a neural radiance field model. The utilization of HDR images instead of LDR images can remove the processing steps for correcting raw images.

Additionally and/or alternatively, the systems and methods of the present disclosure provide a number of technical effects and benefits. As one example, the system and methods can train a view synthesis model. More specifically, the systems and methods disclosed herein can leverage street view data to train a view synthesis model to generate novel view synthesis renderings and three-dimensional reconstructions of an outdoor urban environment. The street view data can include street view images (e.g., panoramic images captured from a street or sidewalk perspective) and depth data (e.g., lidar data which can include three-dimensional point cloud data). The data can be pre-existing data collected by one or more map companies that collected the data for a map application. The images may be processed to remove moving objects, or occlusions, to correct exposure issues between images, and to segment the sky. The processing can allow the systems and methods to leverage the images for training the model to produce more accurate outputs with more uniform coloring. The images and the depth data can be utilized to evaluate multiple losses to ensure the predicted colors and densities are accurate to the ground truth and to real world geometry.

Another technical benefit of the systems and methods of the present disclosure is the ability to model large environments. More specifically, the systems and methods can train a view synthesis model to generate novel view synthesis renderings and/or three-dimensional reconstructions of large environments. The novel view synthesis renderings can include color predictions that may be more uniformly adjusted to provide more accurate contrast between colors despite varying light exposures between different training images. Additionally and/or alternatively, the use of depth data (e.g., lidar data) can allow for more accurate training for learning depths in large scale environments.

Another example technical effect and benefit relates to the reduction of computational cost and computational time. The systems and methods disclosed herein can allow for the training of view synthesis models for rendering outputs for large environments using pre-existing data collected for mapping purposes. In particular, the use of depth data in combination with the street view images can allow for learning a large environment without the need to collect new images and can allow for training using less images as the depth data losses can allow for accurate density predictions with less image data. Therefore, by performing training with fewer images, the number of training cycles overall can be reduced, thereby conserving computational resources such as processor usage, memory usage, network bandwidth usage, etc.

In some implementations, one or more technical benefits of the disclosure can include allowing users to easily and more accurately obtain an accurate representation of a state of a location under particular circumstances or conditions. For example, a user can easily and more accurately obtain an accurate representation of a state of an indoor and/or outdoor venue including a restaurant or park at a particular time of day, time of day, time of year, etc. For example, a user can easily and more accurately obtain an accurate representation of a state of an indoor or outdoor venue including a restaurant or park under certain environmental conditions (e.g., when it is sunny, when it is rainy, when it is windy, etc.). The systems and methods disclosed herein can be utilized to provide users with an accurate representation of a state of a location, virtually and via a display, without needing to travel to the location in person. Further, the user may also be provided with an accurate prediction of the state of a location at a certain time or under certain conditions, as defined by the user.

One or more technical benefits of the disclosure may include integrating fresh media content (e.g., user-generated media content and/or machine-generated media content) associated with a location with a preexisting 3D scene of a location. For example, the media content may be obtained subsequent to imagery which is used to form the 3D model forming the 3D scene of the location. Therefore, the integrated 3D scene represents an accurate and updated state of the location. Furthermore, various integrated 3D scenes may be generated to accurately portray the location according to various conditions. For example, the server computing system can be configured to select media content for integration based on information associated with the media content that matches the request of the user for an immersive view. For example, images of the interior of a restaurant taken in the morning when few customers are present would not be integrated in an integrated 3D scene which is generated for an immersive view of the restaurant at dinner. Therefore, the use of metadata and other descriptive content associated with the media content may be used to form the integrated 3D scene of the location in an accurate manner. Additionally and/or alternatively, image segmentation techniques and/or machine learning resources may be implemented to position or place dynamic objects extracted from media content in suitable locations within the integrated 3D scene of the location, to provide a state of the location in an accurate manner.

Thus, according to aspects of the disclosure, technical benefits such as resource savings and immersive view accuracy improvements may be achieved.

Neural radiance field model can be leveraged for a novel view synthesis to be provided to users in a virtual walk-through interface (and/or an immersive view interface). Neural Radiance Fields (NeRF) can be utilized for high quality novel view synthesis from a collection of posed input images. NeRF can use tone-mapped low dynamic range (LDR) as input. The images may have been processed by a lossy camera pipeline that smooths detail, clips highlights, and distorts the simple noise distribution of raw sensor data. The systems and methods disclosed herein can include a modified NeRF to train directly on linear raw images, preserving the scene's full dynamic range. By rendering raw output images from the resulting NeRF, the systems and methods can perform novel high dynamic range (HDR) view synthesis tasks. In addition to changing the camera viewpoint, the systems and methods can manipulate focus, exposure, and tone-mapping after the fact. Although a single raw image appears significantly noisier than a post processed one, the systems and methods can show that NeRF is highly robust to the zero-mean distribution of raw noise. When optimized over many noisy raw inputs (e.g., 25-200), NeRF can produce an accurate scene representation that renders novel views that outperform dedicated single and multi-image deep raw denoisers run on the same wide baseline input images. In some implementations, the systems and methods can reconstruct scenes from extremely noisy images captured in near darkness.

View synthesis methods (e.g., neural radiance fields (NeRF)) can utilize tone-mapped low dynamic range (LDR) images as input and directly reconstruct and render new views of a scene in LDR space. Inputs for scenes that are well-lit and do not contain large brightness variations may be captured with minimal noise using a single fixed camera exposure setting. However, images taken at nighttime or in any but the brightest indoor spaces may have poor signal-to-noise ratios, and scenes with regions of both daylight and shadow may have extreme contrast ratios that may rely on high dynamic range (HDR) to represent accurately.

The systems and methods (e.g., systems and methods including RawNeRF) can modify NeRF to reconstruct the scene in linear HDR color space by supervising directly on noisy raw input images. The modification can bypass the lossy post processing that cameras apply to compress dynamic range and smooth out noise in order to produce visually palatable 8-bit JPEGs. By preserving the full dynamic range of the raw inputs, the systems and methods (e.g., systems and methods including RawNeRF) can enable various novel HDR view synthesis tasks. The systems and methods can modify the exposure level and tone-mapping algorithm applied to rendered outputs and can create synthetically refocused images with accurately rendered bokeh effects around out-of-focus light sources.

Beyond the view synthesis applications, the systems and methods can show that training directly on raw data effectively turns RawNeRF into a multi-image denoiser capable of reconstructing scenes captured in near darkness. A camera post processing pipeline (e.g., HDR+) may corrupt the simple noise distribution of raw data, introducing significant bias in order to reduce variance and produce an acceptable output image. Feeding the images into NeRF can thus produce a biased reconstruction with incorrect colors, particularly in the darkest regions of the scene. The systems and methods can utilize NeRF's ability to reduce variance by aggregating information across frames, demonstrating that processing may be possible for RawNeRF to produce a clean reconstruction from many noisy raw inputs.

The systems and methods disclosed herein can assume a static scene and expects camera poses as input. Provided with the extra constraints, the systems and methods can be able to make use of three-dimensional multi-view consistency to average information across nearly all of the input frames at once. In some implementations, the captured scenes can each contain 25-200 input images, which can mean the systems and methods can remove more noise than feed-forward single or multi-image denoising networks that make use of 1-5 input images for each output.

The systems and methods can include training a neural radiance field model directly on raw images that can handle high dynamic range scenes as well as noisy inputs captured in the dark. The systems and methods may outperform NeRF on noisy real and synthetic datasets and can be a competitive multi-image denoiser for wide-baseline static scenes. The systems and methods can perform novel view synthesis applications by utilizing a linear HDR scene representation (e.g., a representation, which can include data descriptive of varying exposure, tone-mapping, and focus).

The systems and methods (e.g., the systems and methods that include RawNeRF) can include NeRF as a baseline for high quality view synthesis, can utilize low level image processing to optimize NeRF directly on noisy raw data, and can utilize HDR in computer graphics and computational photography to showcase new applications made possible by an HDR scene reconstruction.

Novel view synthesis can use a set of input images and their camera poses to reconstruct a scene representation capable of rendering novel views. When the input images are densely sampled, the systems and methods can use direct interpolation in pixel space for view synthesis.

In some implementations, view synthesis may include learning a volumetric representation rather than mesh-based scene representations. A NeRF system may directly optimize a neural volumetric scene representation to match all input images using gradient descent on a rendering loss. Various extensions may be utilized to improve NeRF's robustness to varying lighting conditions, and/or supervision may be added with depth, time-of-flight data, and/or semantic segmentation labels. In some implementations, view synthesis methods can be trained using LDR data jointly to solve for per-image scaling factors to account for inconsistent lighting or miscalibration between cameras. In some implementations, the systems and methods can include supervising with LDR images and can solve for exposure through a differentiable tone-mapping step to approximately recover HDR but may not focus on robustness to noise or supervision with raw data. The systems and methods may include denoising sRGB images synthetically corrupted with additive white Gaussian noise.

The systems and methods disclosed herein can leverage preservation of dynamic range, which can allow for maximum post processing flexibility, letting users modify exposure, white balance, and tone-mapping after the fact.

When capturing an image, the number of photons hitting a pixel on the camera sensor can be converted to an electrical charge, which can be recorded as a high bit-depth digital signal (e.g., 10 to 14 bits). The values may be offset by a "black level" to allow for negative measurements due to noise. After black level subtraction, the signal may be a noisy measurement $y_i$ of a quantity $x_i$ proportional to the expected number of photons arriving while the shutter is open. The noise results from both the physical fact that photon arrivals can be a Poisson process ("shot" noise) and noise in the readout circuitry that converts the analog electrical signal to a digital value ("read" noise). The combined shot and read noise distribution can be well modeled as a Gaussian whose variance is an affine function of its mean, which can imply that the distribution of the error $y_i - x_i$ is zero mean.

Color cameras can include a Bayer color filter array in front of the image sensor such that each pixel's spectral response curve measures either red, green, or blue light. The pixel color values may be typically arranged in 2×2 squares containing two green pixels, one red, and one blue pixel (e.g., a Bayer pattern), resulting in "mosaicked" data. To generate a full-resolution color image, the missing color channels may be interpolated using a demosaicing algorithm. The interpolation can correlate noise spatially, and the checkerboard pattern of the mosaic can lead to different noise levels in alternating pixels.

The spectral response curves for each color filter element may vary between different cameras, and a color correction matrix can be used to convert the image from this camera-specific color space to a standardized color space. Additionally and/or alternatively, because human perception can be robust to the color tint imparted by different light sources, cameras may attempt to account for the tint (e.g., make white surfaces appear RGB-neutral white) by scaling each color channel by an estimated white balance coefficient. The two steps can be typically combined into a single linear 3×3 matrix transform, which can further correlate the noise between color channels.

Humans may be able to discern smaller relative differences in dark regions compared to bright regions of an image. The fact can be exploited by sRGB gamma compression, which may optimize the final image encoding by clipping values outside [0,1] and may apply a nonlinear curve to the signal that dedicates more bits to dark regions at the cost of compressing bright highlights. In addition to gamma compression, tone-mapping algorithms can be used to better preserve contrast in high dynamic range scenes (where the bright regions are several orders of magnitude brighter than the darkest) when the image is quantized to 8 bits.

Tone-mapping can include the process by which linear HDR values are mapped to nonlinear LDR space for visualization. Signals before tone-mapping can be referred to as high dynamic range (HDR), and signals after may be referred to as low dynamic range (LDR). Of all post processing operations, tone-mapping may affect the noise distribution such that clipping completely discards information in the brightest and darkest regions, and after the non-linear tone-mapping curve the noise is no longer guaranteed to be Gaussian or even zero mean.

A neural radiance field (NeRF) model can include a neural network based scene representation that is optimized to reproduce the appearance of a set of input images with known camera poses. The resulting reconstruction can then be used to render novel views from previously unobserved poses. NeRF's multilayer perceptron (MLP) network can obtain a three-dimensional position and two-dimensional viewing direction as input and can output volume density and color. To render each pixel in an output image, NeRF can use volume rendering to combine the colors and densities from many points sampled along the corresponding three-dimensional ray.

Standard NeRF can obtain clean, low dynamic range (LDR) sRGB color space images with values in the range [0,1] as input. Converting raw HDR images to LDR images can include two consequences: (1) Detail in bright areas can be lost when values are clipped from above at one, and detail across the image is compressed by the tone-mapping curve and subsequent quantization to 8 bits, and (2) The per-pixel noise distribution can become biased (no longer zero-mean) after passing through a nonlinear tone-mapping curve and being clipped from below at zero.

The systems and methods disclosed herein can optimize NeRF directly on linear raw input data in HDR color space. The systems and methods can show that reconstructing NeRF in raw space can be much more robust to noisy inputs and allows for novel HDR view synthesis applications.

Since the color distribution in an HDR image can span many orders of magnitude, a standard L2 loss applied in HDR space will be completely dominated by error in bright areas and can produce an image that has muddy dark regions with low contrast when tone-mapped. The systems and methods can apply a loss that more strongly penalizes errors in dark regions to align with how human perception compresses dynamic range. One way to achieve the result can be by passing both the rendered estimate $\hat{y}$ and noisy observed intensity $y$ through a tone-mapping curve $\psi$ before the loss is applied:

$$L_\psi(\hat{y}, y) = \sum_i (\psi(\hat{y}_i) - \psi(y_i))^2. \tag{1}$$

In some implementations, in low-light raw images the observed signal $y$ can be heavily corrupted by zero-mean noise, and a nonlinear tone-map can introduce bias that changes the noisy signal's expected value ($E[\psi(y)] \neq \psi(E[y])$). In order for the network to converge to an unbiased result, the systems and methods may use a weighted L2 loss of the form $$L(\hat{y}, y) = \sum_i w_i (\hat{y}_i - y_i)^2. \tag{2}$$

The systems and methods can approximate the tone-mapped loss (1) in this form by using a linearization of the tone curve $\psi$ around each $\hat{y}_i$:

$$\tilde{L}_\psi(\hat{y}, y) = \sum_i [\psi'(sg(\hat{y}_i))(\hat{y}_i - y_i)]^2, \quad (3)$$

where sg(•) may indicate a stop-gradient that treats the argument as a constant with zero derivative, preventing the result from influencing the loss gradient during backpropagation.

A "gradient supervision" tone curve $\psi(z)=\log(y+\varepsilon)$ with $\varepsilon=10^{-3}$ can produce perceptually high quality results with minimal artifacts, which can imply a loss weighting term of $\psi'(sg(\hat{y}i))=(sg(\hat{y}i)+\varepsilon)^{-1}$ and final loss $$\tilde{L}_\psi(\hat{y}, y) = \sum_i \left(\frac{\hat{y}_i - y_i}{sg(\hat{y}_i) + \varepsilon}\right)^2. \quad (4)$$

The result can correspond exactly to the relative MSE loss used to achieve unbiased results when training on noisy HDR path-tracing data in Noise2Noise. The curve $\psi$ can be proportional to the $\mu$-law function used for range compression in audio processing, and may have been applied as a tone-mapping function when supervising a network to map from a burst of LDR images to an HDR output.

In some implementations, the systems and methods can include variable exposure training. In scenes with very high dynamic range (e.g., a 10-14 bit raw image) may not be sufficient for capturing both bright and dark regions in a single exposure. The systems and methods can address the potential issue by the "bracketing" mode included in many digital cameras, where multiple images with varying shutter speeds are captured in a burst, then merged to take advantage of the bright highlights preserved in the shorter exposures and the darker regions captured with more detail in the faster exposures.

The systems and methods can leverage variable exposures in RawNeRF. Given a sequence of images $I_i$ with exposure times $t_i$ (and all other capture parameters held constant), the systems and methods can "expose" RawNeRF's linear space color output to match the brightness in image $I_i$ by scaling it by the recorded shutter speed $t_i$. Varying exposures may not be precisely aligned using shutter speed alone due to sensor miscalibration. The systems and methods may add a learned per-color-channel scaling factor for each unique shutter speed present in the set of captured images, which can jointly optimize along with the NeRF network. The final RawNeRF "exposure" given a output color $\hat{y}_i$ from the network can then be $\min(\hat{y}_i{}^c \cdot t_i \cdot \alpha_{t_i}{}^c, 1)$, where c indexes color channels, and $\alpha_{t_i}{}^c$ is the learned scaling factor for shutter speed $t_i$ and channel c (we constrain $\alpha_{t_{max}}{}^c = 1$ for the longest exposure). The systems and methods may clip from above at 1 to account for the fact that pixels saturate in overexposed regions. The scaled and clipped value can be passed to the previously described loss (Equation 4).

The systems and methods disclosed herein may utilize the mip-NeRF codebase, which can improve upon the positional encoding used in the original NeRF method. Please see that paper for further details on the MLP scene representation and volumetric rendering algorithm. The network architecture can include a change that modifies the activation function for the MLP's output color from a sigmoid to an exponential function to better parameterize linear radiance values. The systems and methods can utilize the Adam optimizer with batches of 16 k random rays sampled across all training images and a learning rate decaying from $10^{-3}$ to $10^{-5}$ over 500 k steps of optimization.

Extremely noisy scenes may benefit from a regularization loss on volume density to prevent partially transparent "floater" artifacts. For example, the systems and methods may apply a loss on the variance of the weight distribution used to accumulate color values along the ray during volume rendering.

As the raw input data is mosaicked, the raw input data may include one color value per pixel. The systems and methods may apply the loss to the active color channel for each pixel, such that optimizing NeRF effectively demosaics the input images. Since any resampling steps may affect the raw noise distribution, the systems and methods may not undistort or downsample the inputs, and instead may train using the full resolution mosaicked images (e.g., 12 MP for the scenes). In some implementations, the systems and methods may utilize camera intrinsics to account for radial distortion when generating rays. The systems and methods may utilize full resolution post processed JPEG images to calculate camera poses.

The systems and methods disclosed herein can be robust to high levels of noise, to the extent that the system can act as a competitive multi-image denoiser when applied to wide-baseline images of a static scene. Additionally and/or alternatively, the systems and methods can utilize HDR view synthesis applications enabled by recovering a scene representation to preserve high dynamic range color values.

Deep learning methods for denoising images directly in the raw linear domain can include multi-image denoisers that can be applied to burst images or video frames. These multi-image denoisers can assume that there is a relatively small amount of motion between frames, but that there may be large amounts of object motion within the scene. When nearby frames can be well aligned, the methods can merge information from similar image patches (e.g., across 2-8 neighboring images) to outperform single image denoisers. NeRF can optimize for a single scene reconstruction that is consistent with the input images. By specializing to wide-baseline static scenes and taking advantage of 3D multi-view information, RawNeRF can aggregate observations from much more widely spaced input images than a typical multi-image denoising method.

For testing the system, the systems and methods can obtain a real world denoising dataset with 3 different scenes, each including 101 noisy images and a clean reference image merged from stabilized long exposures. The first 100 images can be taken handheld across a wide baseline (e.g., a standard forward-facing NeRF capture), using a fast shutter speed to accentuate noise. The systems and methods can then capture a stabilized burst of 50-100 longer exposures on a tripod and robustly merge them using HDR+ to create a clean ground truth frame. One additional tripod image taken at the original fast shutter speed can serve as a noisy input "base frame" for the deep denoising methods. All images may be taken with a mobile device at 12 MP resolution using the wide-angle lens and saved as 12-bit raw DNG files.

In some implementations, the systems and methods disclosed herein can RawNeRF can utilize just a camera pose, while other techniques may rely on the denoisers receiving the noisy test image.

Given a full 3D model of a scene, physically-based renderers can accurately simulate camera lens defocus effects by tracing rays refracted through each lens element, and the process can be extremely computationally expensive. In some implementations, the systems and methods can apply a varying blur kernel to different depth layers of the scene and composite them together. The systems and methods can apply the synthetic defocus rendering model to sets of RGBA depth layers precomputed from trained RawNeRF models (similar to a multiplane image). Recovering linear HDR color can be critical for achieving the characteristic oversaturated "bokeh balls" around defocused bright light sources.

Training the neural radiance field model can include a gradient-weighted loss. For example, the systems and methods can approximate the effect of training with the following loss $$L_\psi(\hat{y}, y) = \sum_i \psi(\hat{y}_i) - \psi(y_i))^2 \qquad (5)$$

while converging to an unbiased result. The results can be accomplished by using a locally valid linear approximation for the error term:

$$\psi(\hat{y}_i) - \psi(y_i) \approx \psi(\hat{y}_i) - (\psi(\hat{y}_i) + \psi'(\hat{y}_i)(y_i - \hat{y}_i)) \qquad (6)$$
$$= \psi'(\hat{y}_i)(\hat{y}_i - y_i).$$

The systems and methods can choose to linearize around $\hat{y}_i$ because, the noisy observation $y_i$, $\hat{y}_i$ tends towards the true signal value $x_i = E[y_i]$ over the course of training.

If a weighted L2 loss is used, then as the system is trained the network can have $\hat{y}_i \to E[y_i] = x_i$ in expectation (where $x_i$ is the true signal value). Therefore, the terms can be summed in the gradient-weighted loss:

$$\tilde{L}_\psi(\hat{y}, y) = \sum_i [\psi'(sg(\hat{y}_i))(\hat{y}_i - y_i)]^2 \qquad (7)$$

which can tend towards $\psi'(x_i)(\hat{y}_i - y_i)$ over the course of training. Additionally and/or alternatively, the gradient of the reweighted loss 7 can be a linear approximation of the gradient of the tone-mapped loss 5:

$$\nabla_\theta L_\psi(\hat{y}, y) = \sum_i \nabla_\theta (\psi(\hat{y}_i) - \psi(y_i))^2 \qquad (8)$$
$$= \sum_i 2(\psi(\hat{y}_i) - \psi(y_i))\psi'(\hat{y}_i)\nabla_\theta y_i \qquad (9)$$
$$\approx \sum_i 2(\psi'(\hat{y}_i)(\hat{y}_i - y_i)\psi'(\hat{y}_i)\nabla_\theta y_i \qquad (10)$$
$$= \sum_i 2(\psi'(sg(\hat{y}_i))(\hat{y}_i - y_i)\psi'(sg(\hat{y}_i))\nabla_\theta y_i \qquad (11)$$
$$= \nabla_\theta \tilde{L}_\psi(\hat{y}, y). \qquad (12)$$

In equation 10, the linearization from 6 can be substituted, and in equation 11, the systems and methods can exploit the fact that a stop-gradient has no effect for expressions that will not be further differentiated.

Additionally and/or alternatively, training can include the use of a weight variance regularizer. The weight variance regularizer can be a function of the compositing weights used to calculate the final color for each ray. Given MLP outputs $c_i$, $\sigma_i$ for respective ray segments $[t_{i-1}, t_i)$ with lengths $\Delta_i$ (see [3]), the weights can be $$w_i = (1 - \exp(-\Delta_i \sigma_i)) \exp\left(-\sum_{j<i} \Delta_j \sigma_j\right). \qquad (13)$$

If a piecewise-constant probability distribution $p_w$ is defined over the ray segments using the weights, then the variance regularizer can be equal to $$\mathcal{L}_w = \text{Var}_{X \sim p_w}(X) = E_{X \sim p_w}[(X - E[X])^2] \qquad (14)$$

Calculating the mean (expected depth):

$$E_{X \sim p_w}[X] = \sum_i \int_{t_{i-1}}^{t_i} \frac{w_i}{\Delta_i} t \, dt \qquad (15)$$
$$= \sum_i \frac{w_i}{\Delta_i} \frac{t_i^2 - t_{i-1}^2}{2} \qquad (16)$$
$$= \sum_i w_i \frac{t_i + t_{i-1}}{2}. \qquad (17)$$

The value can be denoted as $\bar{t}$. Calculating the regularizer:

$$\text{Var}_{X \sim p_w}(X) = E_{X \sim p_w}[(X - E[X])^2] \qquad (18)$$
$$= \sum_i \int_{t_{i-1}}^{t_i} \frac{w_i}{\Delta_i} (t - \bar{t})^2 dt \qquad (19)$$
$$= \sum_i \frac{w_i}{\Delta_i} \frac{(t_i - \bar{t})^3 - (t_{i-1} - \bar{t})^3}{3} \qquad (20)$$
$$= \sum_i w_i \frac{(t_i - \bar{t})^2 + (t_i - \bar{t})(t_{i-1} - \bar{t}) + (t_{i-1} - \bar{t})^2}{3} \qquad (21)$$

In some implementations, the systems and methods can apply a weight between $1 \times 10^{-2}$ and $1 \times 10^{-1}$ to $\mathcal{L}_w$ (relative to the rendering loss) (e.g., using higher weights in noisier or darker scenes that are more prone to "floater" artifacts). Applying the regularizer with a high weight can result in a minor loss of sharpness, which can be ameliorated by annealing its weight from 0 to 1 over the course of training.

The systems and methods may include scaling the loss by the derivative of the desired tone curve:

$$\psi'(sg(\hat{y}_i)) = \frac{1}{sg(\hat{y}_i) + \varepsilon} \qquad (22)$$

The systems and methods can perform a hyperparameter sweep over loss weightings of the form $(sg(\hat{y}_i)+)^{-p}$ for $\varepsilon$ and p and found that $\varepsilon = 1 \times 10^{-3}$ and p=1 produced the best qualitative results.

In some implementations, the systems and methods may utilize a reweighted L1 loss or the negative log-likelihood function of the actual camera noise model (using shot/read noise parameters from the EXIF data). Alternatively and/or additionally, RawNeRF models supervised with a standard unweighted L2 or L1 loss may tend to diverge early in training, particularly in very noisy scenes.

The systems and methods may utilize the unclipped sRGB gamma curve (extended as a linear function below zero and as an exponential function above 1) in the loss. Directly applying the log tone curve (rather than reweighting by its gradient) before the L2 loss can cause training to diverge.

The color correction matrix $C_{ccm}$ can be an XYZ-to-camera-RGB transform under the D65 illuminant, which can use the corresponding RGB-to-XYZ matrix:

$$C_{rgb-xyz} = \begin{bmatrix} 0.4124564 & 0.3575761 & 0.1804375 \\ 0.2126729 & 0.7151522 & 0.0721750 \\ 0.0193339 & 0.1191920 & 0.9503041 \end{bmatrix} \quad (23)$$

The systems and methods may use these to create a single color transform $C_{all}$ mapping from camera RGB directly to standard linear RGB space:

$$C_{all} = \text{rownorm}\left((C_{rgb-xyz}C_{ccm})^{-1}\right) \quad (24)$$

where rownorm normalizes each to sum to 1.

The systems and methods can use the standard sRGB gamma curve as a basic tone-map for linear RGB space data:

$$\gamma_{sRGB}(z) = \begin{cases} 12.92z & z \le 0.0031308 \\ 1.055z^{1/2.4} - 0.055 & z > 0.0031308 \end{cases} \quad (25)$$

To minimize the effect of image noise, the systems and methods can determine the average color value $y_{t_i}^c$ for each Bayer filter channel (R, G1, G2, B) over an entire 12 MP sensor. For example, the systems and methods can plot:

$$\frac{y_{t_i}^c}{t_i} \cdot \frac{t_{max}}{y_{t_{max}}^c} \quad (26)$$

which is the ratio of normalized brightness at speed $t_i$ to normalized brightness at the longest shutter speed $t_{max}$. In the case of perfect calibration, the plot may be equal to 1 everywhere since dividing out by shutter speed should perfectly normalize the brightness value. However, the quantity may decay for faster shutter speeds, the quantity may decay at different rates per color channel. In some implementations, a DSLR or mirrorless camera with a better sensor may be utilized.

The systems and methods can solve for an affine color alignment between each output and the ground truth clean image. For all methods but SID and LDR NeRF, the method can be performed directly in raw Bayer space for each RGGB plane separately. For SID and LDR NeRF (which output images in tone-mapped sRGB space), the method can be performed for each RGB plane against the tone-mapped sRGB clean image. If the ground truth channel is x and the channel to be matched is y, the systems and methods can compute $$a = \frac{\overline{xy} - \overline{x}\overline{y}}{\overline{x^2} - \overline{x}^2} = \frac{\text{Cov}(x, y)}{\text{Var}(x)}, \quad (27)$$

$$b = \overline{y} - a\overline{x} \quad (28)$$

to get the least-squares fit of an affine transform $ax+b \approx y$ (here $\overline{z}$ indicates the mean over all elements of z). The systems and methods can then apply the inverse transform as (y−b)/a to match the estimated y to x. In some implementations where matching happens in the raw domain, the systems and methods can postprocess (y−b)/a through our standard pipeline before calculating sRGB-space metrics.

To render defocused images, the systems and methods can utilize a specific synthetic defocus rendering model for particular tasks. To avoid prohibitively expensive rendering speeds, the systems and methods can first precompute a multiplane image representation from the trained neural radiance field model. The MPI can include a series of fronto-parallel RGBA planes (with colors still in linear HDR space), sampled linearly in disparity within a camera frustum at a central camera pose.

The systems and methods disclosed herein can be utilized for three-dimensional reconstruction and novel view synthesis for urban environments using data image and lidar data. In some implementations, the systems and methods can extend NERF to use lidar data. Additionally and/or alternatively, the systems and methods can be trained using panoramic images in combination with the lidar data. The systems and methods can include segmenting the sky and using LIDAR data for exposure control.

Novel view synthesis systems and methods can obtain a set of images/geometry information depicting a scene and generate novel views of the scene from arbitrary viewpoints. The systems and methods can leverage neural radiance fields.

Three-dimensional reconstruction systems and methods can obtain a set of images/geometry information depicting a scene and generate dense three-dimensional reconstructions (geometry) for the underlying scene. The goal can be to estimate the scene geometry accurately.

In some implementations, the input for the systems and methods can include a set of image panoramas and lidar points from a real-world scene. The data can be commonly captured from mapping platforms such as Street View. The systems and methods can use the data to train the view synthesis model, and the output can be an accurate three-dimensional reconstruction of the scene and an implicit model that can be used to render novel views.

The systems and methods can include three parts: First, the systems and methods can use an exposure correction network to compensate for the different exposures of the cameras. Secondly, the systems and methods can use semantic segmentation to find the pixels that correspond to the sky and can model the color of these pixels with a separate network. Finally, the systems and methods can use a combination of RGB and lidar losses for training a radiance field that is geometry aware.

In some implementations, the systems and methods can perform three-dimensional reconstruction and novel view synthesis from data captured by scanning platforms commonly deployed for world mapping in urban outdoor environments (e.g., Street View). Given a sequence of posed RGB images and lidar sweeps acquired by cameras and scanners moving through an outdoor scene, the systems and methods can produce a model from which three-dimensional surfaces can be extracted and novel RGB images can be synthesized. The systems and methods can extend Neural Radiance Fields (NERF), which can be demonstrated to synthesize realistic novel images for small scenes in controlled settings, with new methods for leveraging asynchronously captured lidar data, for addressing exposure variation between captured images, and for leveraging predicted image segmentations to supervise densities on rays pointing at the sky. Each of the three extensions can provide significant performance improvements in experiments on Street View data. The system can produce state-of-the-art three-dimensional surface reconstructions and can synthesize higher quality novel views in comparison to both traditional methods (e.g., COLMAP) and recent neural representations (e.g., Mip-NeRF).

The systems and methods disclosed herein can utilize neural scene representations for world mapping, with the goal of performing three-dimensional reconstruction and novel view synthesis from data commonly captured by mapping platforms such as Street View. The setting can feature large outdoor scenes, with many buildings and other objects and natural illumination from the sun. The systems and methods can focus on street-level mapping: a person carrying a camera rig with a lidar sensor placed on a backpack walking through a city. The camera can capture panoramas of the street scene while the lidar sensor reconstructs a three-dimensional point cloud.

Street-level mapping can be challenging for neural representations, as the area of interest covers a large area, usually hundreds of square meters. Moreover, the scenes can include a large variety of objects, both in terms of geometry and appearance (e.g., buildings, cars, signs, trees, vegetation). The camera locations can be biased towards walking patterns (e.g., walking a straight line) without focusing on any particular part of the scene. The bias can result in parts of the scene being observed by only a small number of cameras, in contrast to other datasets which can capture scenes uniformly with a large number of cameras. Furthermore, the sky can be visible in most street scenes, which can introduce an infinitely distant element that behaves differently than the solid structures near the cameras. The images can typically have highly varying exposures as the cameras use auto-exposure, and the illumination brightness may vary depending on the sun's visibility and position. Combined with auto white balance, the results can result in the same structure having different colors when observed from different cameras. Finally, the lidar points can have lower resolution in distant parts of the scene and can be even completely absent in some parts of the scene (e.g., for shiny or transparent surfaces).

The systems and methods can extend a NeRF model in three ways to tailor the model to the unique features of the Street View setting and to tackle the challenges above. First, the system can incorporate lidar information in addition to RGB signals. By carefully fusing these two modalities, the system can compensate for the sparsity of viewpoints in such large scale and complex scenes. In some implementations, the system can introduce a series of lidar-based losses that allow accurate surface estimation both for solid structures like buildings and for volumetric formations such as trees/vegetation. Second, the system can automatically segment sky pixels and can define a separate dome-like structure to provide a well-defined supervision signal for camera rays pointing at the sky. Third, the model can automatically compensate for varying exposure by estimating an affine color transformation for each camera.

During experiments with real world data from Street View, the experiments can show that these three NeRF extensions significantly improve over the state-of-the-art both in the quality of synthesized novel views (+19% PSNR) and three-dimensional surface reconstructions (+0.35 F-score).

Neural radiance fields can fit a coordinate-based neural network with parameters $\theta$ to describe a volumetric scene from a set of posed images $\{I_i\}_{i=1}^{N}$; i.e., with known intrinsic and extrinsic calibration. To render an image, NeRF can use ray marching to sample the volumetric radiance field and can composite the sampled density and color to render the incoming radiance of a particular ray. Additionally and/or alternatively, NERF can supervise the training of $\theta$ by an L2 photometric reconstruction loss:

$$\mathcal{L}_{rgb}(\theta) = \sum_i \mathbb{E}_{r \sim I_i}[\|C(r) - C_i^{gt}(r)\|_2^2], \quad (29)$$

where $C_i^{gt}(r)$ can be the ground truth color of ray r passing through a pixel in image i, and the color C(r) can be computed by integrating the weighted volumetric radiance within the ray's near and far bounds $t_n$ and $t_f$:

$$C(r) = \int_{t_n}^{t_f} w(t) \cdot c(t) \, dt, \quad (30)$$

$$\{c(t): \text{radiance}\}$$

and r(t)=o+td can represent a ray with camera origin o oriented as d, with volume rendering integration weights:

$$w(t) = \exp\left(-\int_{t_n}^{t} \sigma(s) \, ds\right) \cdot \sigma(t), \quad (31)$$

$$\begin{cases} \exp\left(-\int_{t_n}^{t} \sigma(s) \, ds\right): \text{visibility of } r(t) \text{ from } o \\ \sigma(t): \text{density at } r(t) \end{cases}$$

while the intermediate features z(t), the volumetric density $\sigma(t)$ and view-dependent radiance fields c(t) can be stored within the parameters $\theta$ of fully connected neural networks:

$$z(t) = z(r(t); \theta): \mathbb{R}^3 \to \mathbb{R}^z, \quad (32)$$

$$\sigma(t) = \sigma(z(t); \theta): \mathbb{R}^z \to \mathbb{R}^+, \quad (33)$$

$$c(t) = c(z(t), d; \theta): \mathbb{R}^z \times \mathbb{R}^3 \to \mathbb{R}^3. \quad (34)$$

As the scenes can be observed at different distances, the systems and methods can use the integrated positional encoding for three-dimensional points r(t) and the original positional encoding for the viewing direction d.

The systems and methods disclosed herein can reconstruct three-dimensional surfaces and synthesize novel views of urban spaces from data commonly collected for autonomous driving and world mapping applications. The systems and methods disclosed herein can leverage a variety of different datasets from a variety of different databases. The following includes several references to particular datasets; however, other datasets may be utilized to train and/or test the view synthesis models. For example, the experiments on the systems and methods can include experiments on Trekker data from Street View.

Street View data can be captured for large parts of the world, and thus can provide opportunities for visualization and geometry analysis applications at scale. However, Street View can differ from other three-dimensional scene reconstruction datasets such as Phototourism in several crucial ways. First, the number of images can be captured for a particular scene, which can be significantly smaller than those found for popular landmarks. The processing can result in limited diversity of viewpoints. Second, the panoramic captures can be often accompanied by lidar sensors which provide accurate, but sparse, depth information.

Street view imagery can be collected by multiple fisheye cameras attached to a trekker capturing rig. Each camera can be calibrated with estimated intrinsic parameters and poses relative to the trekker. In some implementations, images can be collected from each camera at approximately 2 Hz as the trekker moves through the world. Images can be posed automatically within a global coordinate system using structure-from-motion and GPS information, allowing the system to assemble camera rays with origin o and direction d corresponding to each pixel.

Real world urban scenes may have moving objects whose positions change as images are captured over time (pedestrians, cars, bicyclists, etc.). If unaddressed, these objects can result in trained NeRFs that produce ghosting and blurring. Because dynamics can be often tied to semantics, the system can run a pre-trained semantic segmentation model on every image, and can then mask pixels of people, which can be the most prominent moving category.

In addition to imaging sensors, the trekker can contain time-of-flight VLP16 lidar sensors, which actively emit light to measure distances to surfaces. Unlike the imaging data which represents dense samples of incoming light, the lidar data can be a swept sequence of timestamped three-dimensional line segments represented by an origin and termination position. A single lidar segment can indicate that during the timestamp, the space traversed by an emitted ray may not intersect an opaque surface. The system can make a simplifying assumption that most surfaces detected by lidar are stationary like buildings and roads, such that the system can ignore the timestamp information and can assume that empty space is empty throughout the entire capture. The assumptions can allow the system to model lidar rays similar to camera rays, with origin $o_\ell$, direction $d_\ell$, and termination distances $z_\ell$.

The systems and methods disclosed herein can define an Urban Radiance Field (URF) with scene-level neural network parameters as well as per-image exposure parameters $\{\beta_i\}$. Given the image and lidar data for a scene, the system can optimize a URF by minimizing the following loss:

$$\underset{\theta, \{\beta_i\}}{\operatorname{argmin}} \mathcal{L}_{rgb}(\theta, \{\beta_i\}) + \mathcal{L}_{seg}(\theta) + \mathcal{L}_{depth}(\theta) + \mathcal{L}_{sight}(\theta).$$

In some implementations, the loss function can include one or more photometric-based losses. The photometric loss term can be similar to the NeRF equation (29), but the system can also depend on estimated per-image exposure parameters $\{\beta_i\}$:

$$\mathcal{L}_{rgb}(\theta, \{\beta_i\}) = \sum_i \mathbb{E}_{r \sim I_i} \left[ \|C(r; \beta_i) - C_i^{gt}(r)\|_2^2 \right]. \tag{35}$$

Alternatively and/or additionally, the systems and methods can modify the volume rendering equation in two ways:

$$C(r; \beta_i) = \int_{t_n}^{t_f} w(t) \cdot \Gamma(\beta_i) \cdot c(t) dt + c_{sky}(d), \tag{36}$$

$$\begin{cases} \Gamma(\beta_i) \text{: exposure compensation} \\ c_{sky}(d) \text{: sky modeling.} \end{cases}$$

In some implementations, the systems and methods can include exposure compensation. Images acquired by mapping systems can be captured with auto white balance and auto exposure which complicates the computation of $\mathcal{L}_{rgb}$ in (29). The issue can be addressed using latent codes, learned separately for each image, that map image-independent scene radiance to an image-dependent radiance. One shortcoming with such an approach can be that modeling exposure variations with a per-image latent code can be overparameterized as the system can allow the latent codes to compensate for non-exposure related errors. Instead, in (36) the system can perform an affine mapping of the radiance predicted by the shared network where the affine transformation is a 3×3 matrix decoded from the per-image latent code $$\beta_i \in \mathbb{R}^B : \Gamma(\beta_i) = \Gamma(\beta_i; \theta) : \mathbb{R}^B \to \mathbb{R}^{3 \times 3}. \tag{37}$$

The mapping can model white balance and exposure variations with a more restrictive function, and thus can be less likely to cause unwanted entanglement when the scene radiance parameters θ and the exposure mappings β are optimized jointly.

Additionally and/or alternatively, the systems and methods disclosed herein can include sky modeling. Outdoor scenes can include sky regions where rays never intersect any opaque surfaces, and thus the NeRF model can obtain a weak supervisory signal in those regions. To address the sky issue, the view synthesis model can therefore include a spherical radiance (environment) map represented as a coordinate-based neural network, $$c_{sky}(d) = c_{sky}(d; \theta) : \mathbb{R}^3 \to \mathbb{R}^3, \tag{38}$$

to provide a direction-dependent background color for those regions. To modulate which rays utilize the environment map, the system can run a pre-trained semantic segmentation model for each image to detect pixels likely to be sky: $S_i = S(I_i)$, where $S_i(r) = 1$ if the ray r goes through a sky pixel in image i. The system can then use the sky mask to define an additional loss that encourages at all point samples along rays through sky pixels to have zero density:

$$\mathcal{L}_{seg}(\theta) = \mathbb{E}_{r \sim I_i} \left[ S_i(r) \int_{t_n}^{t_f} w(t)^2 dt \right]. \tag{39}$$

In some implementations, whenever $S_i(r) = 1$, the system may force the $c_{sky}$ to explain the pixel for ray r in (36).

In addition to or alternatively to the photometric-based losses, the loss function can include one or more lidar losses. Since lidar data can be available in the training data, the system may use the lidar data to supervise training of the model. The system can be given a collection of L lidar samples D={ $()_{\ell=1}^L$ }, each corresponding to a ray $r(z) = o_\ell + z \, d_\ell$, and the associated three-dimensional measurement $p_\ell = r(z_\ell)$. In some implementations, the systems and methods can break the losses into two different types: (1) supervising the expected depth value, and (2) supervising the free space along the line-of-sight from the lidar sensor to the observed position.

For example, the loss function can include a loss term for expected depth. The system can start by supervising the expected depth from a volumetric rendering process (i.e., optical depth) to match the depth of the lidar measurement:

$$\mathcal{L}_{depth}(\theta) = \mathbb{E}_{r \sim D}\left[\int_{t_n}^{t_f}(w(t) \cdot t - z)^2 dt\right], \quad (40)$$

$\{w(t) \cdot t: \text{optical depth}.$

Additionally and/or alternatively, the loss function can include a loss term for line-of-sight priors. For points that are observed by a lidar sensor, a reasonable assumption can be that a measured point p corresponds to a location on a non-transparent surface, and that atmospheric media may not contribute to the color measured with respect to a lidar ray $r_\ell = r(z_\ell)$. Hence, the system can expect that the radiance may be concentrated at a single point along the ray, and therefore that a single point can be responsible for the observed color. In other words, with reference to (30):

$$C(r_\ell) \equiv c(r_\ell) \text{ if } w(t) = \delta(t), \quad (13)$$

where $S(\cap)$ is the continuous Dirac function. The system can convert this constraint via the penalty method into a loss:

$$\mathcal{L}_{sight}(\theta) = \mathbb{E}_{r \sim D}\left[\int_{t_n}^{t_f}(w(t) - \delta(z))^2 dt\right], \quad (41)$$

and to make this numerically tractable, the system can replace the Dirac with a kernel $K_\epsilon(x)$ that integrates to one (i.e., a distribution) that has a bounded domain parameterized by $\epsilon$. The system can choose $$K_\epsilon(x) = \mathcal{N}\left(0, \left(\frac{\epsilon}{3}\right)^2\right),$$

with $\mathcal{N}$ being a truncated Gaussian, and can then split the ray integral into three intervals with three corresponding losses:

$$\mathcal{L}_{sight}(\theta) = \mathcal{L}_{empty}(\theta) + \mathcal{L}_{near}(\theta) + \mathcal{L}_{dist}(\theta), \quad (42)$$

$$\begin{cases}\mathcal{L}_{empty}(\theta): t \in [t_n, z - \epsilon] \\ \mathcal{L}_{near}(\theta): t \in [z - \epsilon, z + \epsilon] \\ \mathcal{L}_{dist}(\theta): t \in [z + \epsilon, t_f]\end{cases}$$

The second term in the breakdown above can be:

$$\mathcal{L}_{near}(\theta) = \mathbb{E}_{r \sim D}\left[\int_{z-\epsilon}^{z+\epsilon}(w(t) - K_\epsilon(t-z))^2 dt\right], \quad (43)$$

which encourages the representation to increase volumetric density in the neighborhood of p, thereby allowing training to converge more quickly. In some implementations, as $K_\epsilon(x)$ has bounded support in $[z-\epsilon; z+\epsilon]$, the first term can be simplified to:

$$\mathcal{L}_{empty}(\theta) = \mathbb{E}_{r \sim D}\left[\int_{t_n}^{z-\epsilon} w(t)^2 dt\right], \quad (44)$$

which can require that the portion of space between the ray origin and the lidar point p (i.e., the line-of-sight) may not contain any three-dimensional surface. The line of sight information can be a key ingredient in "volume carving" techniques. The last term can have a similar form:

$$\mathcal{L}_{dist}(\theta) = \mathbb{E}_{r \sim D}\left[\int_{z+\epsilon}^{t_f} w(t)^2 dt\right]; \quad (45)$$

however, because the term's purpose can be to ensure that w(t) sums to one, and because NeRF's volume rendering equation may require that w(t) sums to no more than one, the term can be safely dropped during training. The choice of a smooth kernel $K_\epsilon(x)$ can be critical, as it guarantees continuity across the transition between losses at z–$\epsilon$. Additionally and/or alternatively, selecting a suitable value can play an important role in the reconstruction accuracy.

The system can discover that employing a small E hinders performance, especially in the early training phases, and note that a similar behavior has also been observed in somewhat related methods that anneal the bandwidth of importance sampling over time. In the disclosed network, the system can adopt an exponential decay strategy for E.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for generating a virtual walkthrough video, the method comprising:
    obtaining, by a computing system comprising one or more processors, one or more neural radiance field models associated with an environment, wherein the one or more neural radiance field models were trained to generate view renderings of the environment, wherein the environment is associated with a geographic location;

processing, by the computing system, a plurality of positions with the one or more neural radiance field models to generate a plurality of view synthesis renderings of the environment, wherein the plurality of positions are associated with a plurality of locations within the environment, and wherein the plurality of view synthesis renderings are descriptive of the environment from the plurality of positions;

generating, by the computing system, a virtual walkthrough video based on the plurality of view synthesis renderings of the environment, wherein the virtual walkthrough video is descriptive of a sequence of views of the environment, wherein generating, by the computing system, the virtual walkthrough video based on the plurality of view synthesis renderings of the environment comprises:

generating, by the computing system, a first rendering video based on rendering the sequence of views of the environment in a first direction;

generating, by the computing system, a second rendering video based on rendering the sequence of views of the environment in a second direction; and generating, by the computing system, the virtual walkthrough video by combining the first rendering video and the second rendering video; and storing, by the computing system, the virtual walkthrough video in a database, wherein storing the virtual walkthrough video comprises indexing the virtual walkthrough video with the geographic location associated with the environment.

2. The method of claim 1, further comprising:
obtaining, by the computing system, a search query;
determining, by the computing system, the search query is associated with the geographic location;
in response to determining the search query is associated with the geographic location, obtaining, by the computing system, the virtual walkthrough video from the database based on the geographic location; and
providing, by the computing system, the virtual walkthrough video for display.

3. The method of claim 2, wherein the search query comprises a text string, wherein the text string is associated with one or more entities; and
wherein determining the geographic location associated with the virtual walkthrough video is associated with the search query comprises: determining the one or more entities is associated with the geographic location.

4. The method of claim 1, further comprising:
providing, by the computing system, a map interface for display, wherein the map interface comprises map information associated with the geographic location;
obtaining, by the computing system, a selection of a virtual walkthrough user interface element;
determining, by the computing system, the virtual walkthrough video is associated with the geographic location; and
providing, by the computing system, the virtual walkthrough video for display.

5. The method of claim 1, wherein the first rendering video is associated with a first portion of the virtual walkthrough video, and wherein the second rendering video is associated with a second portion of the virtual walkthrough video.

6. The method of claim 1, wherein processing, by the computing system, the plurality of positions with the one or more neural radiance field models to generate the plurality of view synthesis renderings of the environment comprises:
for each position of the plurality of positions:
processing, by the computing system, the position with the one or more neural radiance field models to generate a plurality of directional view synthesis renderings, wherein the plurality of directional view synthesis renderings are associated with a plurality of view directions for the position; and
generating, by the computing system, a respective view synthesis rendering for the position by stitching the plurality of directional view synthesis renderings to generate a panoramic image rendering for the position.

7. The method of claim 1, further comprising:
obtaining, by the computing system, a plurality of images of the environment;
training, by the computing system, one or more neural radiance field models based on the plurality of images, wherein training, by the computing system, the one or more neural radiance field models based on the plurality of images comprises:
determining, by the computing system, a plurality of respective scene positions and a plurality of respective scene view directions for the plurality of images based on comparing feature location and feature sizes between images;
processing, by the computing system, one or more respective scene positions of the plurality of respective scene positions and one or more respective scene view directions of the plurality of respective scene view directions with the one or more neural radiance field models to generate one or more predicted view synthesis renderings, wherein the one or more predicted view synthesis renderings comprise one or more predicted color values and one or more predicted opacity values;
evaluating, by the computing system, a loss function that evaluates a difference between the one or more predicted view synthesis renderings and one or more respective images of the plurality of images; and
adjusting, by the computing system, one or more parameters of the one or more neural radiance field model based at least in part on the loss function.

8. The method of claim 1, further comprising:
obtaining, by the computing system, a plurality of images of the environment;
processing, by the computing system, the plurality of images with a segmentation model to generate a plurality of segmented images, wherein the segmentation model generates segmentation masks for segmenting occlusions from an image;
generating, by the computing system, replacement data for the plurality of segmented images, wherein the replacement data is descriptive of predicted pixels for replacing masked regions of the plurality of segmented images; and
generating, by the computing system, a plurality of augmented images based on the plurality of segmented images and the replacement data, wherein the one or more neural radiance field models are trained on the plurality of augmented images.

9. The method of claim 1, wherein the one or more neural radiance field models were trained on a plurality of images of the environment and lidar data for the environment, wherein training comprises evaluating a depth loss based on the lidar data.

10. A computing system for providing a virtual walkthrough interface, the system comprising:
one or more processors; and
one or more non-transitory computer-readable media that collectively store instructions that, when executed by the one or more processors, cause the computing system to perform operations, the operations comprising:
obtaining one or more neural radiance field models, wherein the one or more neural radiance field models were trained to generate view renderings of one or more rooms;
processing a plurality of positions with the one or more neural radiance field models to generate a plurality of view synthesis renderings of the one or more rooms, wherein the plurality of positions are associated with a plurality of locations within the one or more rooms, and wherein the plurality of view synthesis renderings are descriptive of the one or more from the plurality of positions;
generating a forward-directional video based on the plurality of view synthesis renderings of the one or more rooms, wherein the forward-directional video is descriptive of a first sequence of views associated with traveling in a first direction through the one or more rooms;
generating a backward-directional video based on the plurality of view synthesis renderings of the one or more rooms, wherein the backward-directional video is descriptive of a second sequence of views associated with traveling in a second direction through the one or more rooms, wherein the second direction is opposite of the first direction;
generating a multi-directional video based on the forward-directional video and the backward-directional video, wherein the multi-directional video is descriptive of the first sequence of views and the second sequence of views; and
providing a virtual walkthrough interface for the one or more rooms by providing an interface for navigating through the multi-directional video.

11. The system of claim 10, wherein the operations further comprise:
determining a walkthrough path based on processing a plurality of images of the one or more rooms; and
determining the plurality of positions based on the walkthrough path.

12. The system of claim 11, wherein determining the walkthrough path based on processing the plurality of images of the one or more rooms comprises:
processing the plurality of images to determine a plurality of room landmarks associated with features of interest in the one or more rooms; and
generating the walkthrough path based on the plurality of room landmarks.

13. The system of claim 11, wherein determining the plurality of positions based on the walkthrough path comprises:
determining a plurality of points on the walkthrough path, wherein the plurality of points comprise varying spacing based on regions of interest within the one or more rooms.

14. The system of claim 10, wherein navigating through the multi-directional video comprises scrubbing through the multi-directional video.

15. The system of claim 10, wherein the one or more rooms are associated with a restaurant, and wherein the virtual walkthrough interface is provided in a knowledge panel for the restaurant in a search results interface.

16. The system of claim 10, wherein generating the multi-directional video based on the forward-directional video and the backward-directional video comprises:
determining a plurality of frame associations between the forward-directional video and the backward-directional video, wherein each of the plurality of frame associations is descriptive of corresponding frames associated with a same position in the one or more rooms;
generating multi-directional metadata based on the plurality of frame associations, wherein the multi-directional metadata is descriptive of the corresponding frames, and wherein the multi-directional metadata is configured to provide instructions for the virtual walkthrough interface to navigate to different portions of the multi-directional video based on a walkthrough direction and the plurality of frame associations; and
generating the multi-directional video by stitching the forward-directional video and the backward-directional video and embedding the multi-directional metadata.

17. One or more non-transitory computer-readable media that collectively store instructions that, when executed by one or more computing devices, cause the one or more computing devices to perform operations, the operations comprising:
obtaining a plurality of images of an environment;
determining a plurality of image-capture positions and a plurality of image-capture view directions associated with the plurality of images;
training one or more neural radiance field models based on the plurality of images, the plurality of image-capture positions, and the plurality of image-capture view directions, wherein the one or more neural radiance field models are trained to generate view renderings of the environment;
processing a plurality of positions with the one or more neural radiance field models to generate a plurality of view synthesis renderings of the environment, wherein the plurality of positions are associated with a plurality of locations within the environment, wherein the plurality of view synthesis renderings are descriptive of the environment from the plurality of positions, and wherein the plurality of view synthesis renderings comprise a plurality of three-hundred and sixty degree view renderings, wherein the plurality of three-hundred and sixty degree view renderings are generated by generating a plurality of direction-based view renderings for a position and stitching the plurality of direction-based view renderings together to generate a panoramic image;
generating a virtual walkthrough video based on the plurality of view synthesis renderings of the environment, wherein the virtual walkthrough video is descriptive of a sequence of views of the environment; and
storing the virtual walkthrough video in a database, wherein storing the virtual walkthrough video comprises indexing the virtual walkthrough video with a geographic location associated with the environment.

18. The one or more non-transitory computer-readable media of claim 17, wherein the virtual walkthrough video is descriptive of a sequence of views of the environment rendered in a forward progressing sequence and a backwards progressing sequence.

19. The one or more non-transitory computer-readable media of claim 17, wherein the virtual walkthrough video comprises a three-hundred and sixty degree view video, wherein the virtual walkthrough video is formatted to be selectively cropped by a video player to provide one or more video directions for display during playback.

20. A computer-implemented method for providing a virtual walkthrough interface, the method comprising:
    obtaining, by a computing system comprising one or more processors, a location-based query, wherein the location-based query is associated with obtaining information associated with a particular location;
    obtaining, by the computing system, a virtual walkthrough video associated with the particular location based on the location-based query, wherein the virtual walkthrough video was generated by generating a plurality of view renderings with a neural radiance field model, and wherein the virtual walkthrough video is descriptive a sequence of views of an environment associated with the location rendered in a forward progressing sequence and a backwards progressing sequence, wherein the forward progressing sequence is associated with a first portion of the virtual walkthrough video, and wherein the backwards progressing sequence is associated with a second portion of the virtual walkthrough video;
    providing, by the computing system, playback of a first set of frames of the virtual walkthrough video;
    obtaining, by the computing system and during display of a particular frame in the first portion of the virtual walkthrough video, a navigation input, wherein the navigation input is descriptive of a request to perform a virtual walkthrough in an opposite direction;
    determining, by the computing system, a corresponding frame in the second portion of the virtual walkthrough video, wherein the corresponding frame is associated with the particular frame; and
    providing, by the computing system, playback of a second set of frames of the virtual walkthrough video starting with the corresponding frame.

21. The method of claim 20, wherein the particular frame and the corresponding frame are associated with a same position in the environment.

22. A computing system for providing a virtual walkthrough interface, the system comprising:
    one or more processors; and
    one or more non-transitory computer-readable media that collectively store instructions that, when executed by the one or more processors, cause the computing system to perform operations, the operations comprising:
        obtaining a location-based query, wherein the location-based query is associated with obtaining information associated with a particular location;
        obtaining a virtual walkthrough video associated with the particular location based on the location-based query, wherein the virtual walkthrough video was generated by generating a plurality of view synthesis renderings with a neural radiance field model, and wherein the plurality of view synthesis renderings comprise a plurality of three-hundred and sixty degree view renderings;
    providing a virtual walkthrough associated with a first view direction by cropping the plurality of three-hundred and sixty degree view renderings of the virtual walkthrough video to display a first portion of the plurality of three-hundred and sixty degree view renderings associated with the first view direction;
    obtaining a view direction input, wherein the view direction input is descriptive of a request to adjust a focal direction to a second view direction; and
    providing the second view direction for display by cropping the plurality of three-hundred and sixty degree view renderings of the virtual walkthrough video to display a second portion of the plurality of three-hundred and sixty degree view renderings associated with the second view direction.

* * * * *